US011130200B2

(12) United States Patent
Rieske et al.

(10) Patent No.: US 11,130,200 B2
(45) Date of Patent: Sep. 28, 2021

(54) COMBINED LASER TREATMENT OF A SOLID BODY TO BE SPLIT

(71) Applicant: Siltectra GmbH, Dresden (DE)

(72) Inventors: Ralf Rieske, Dresden (DE); Marko Swoboda, Dresden (DE); Jan Richter, Dresden (DE)

(73) Assignee: Siltectra GmbH, Dresden (DE)

( * ) Notice: Subject to any disclaimer, the term of this patent is extended or adjusted under 35 U.S.C. 154(b) by 456 days.

(21) Appl. No.: 16/086,533

(22) PCT Filed: Mar. 22, 2017

(86) PCT No.: PCT/EP2017/056789
§ 371 (c)(1),
(2) Date: Sep. 19, 2018

(87) PCT Pub. No.: WO2017/167614
PCT Pub. Date: Oct. 5, 2017

(65) Prior Publication Data
US 2019/0099838 A1 Apr. 4, 2019

(30) Foreign Application Priority Data

Mar. 22, 2016 (DE) ...................... 10 2016 003 556.0
Dec. 12, 2016 (DE) ...................... 10 2016 014 821.7
Dec. 12, 2016 (WO) ................. PCT/EP2016/080667

(51) Int. Cl.
*B23K 26/38* (2014.01)
*B23K 26/40* (2014.01)
(Continued)

(52) U.S. Cl.
CPC .......... *B23K 26/38* (2013.01); *B23K 26/0736* (2013.01); *B23K 26/0823* (2013.01);
(Continued)

(58) Field of Classification Search
None
See application file for complete search history.

(56) References Cited

U.S. PATENT DOCUMENTS 5,148,446 A * 9/1992 Radich ............... B23K 26/1476
359/511
6,787,732 B1 9/2004 Jack
(Continued)

FOREIGN PATENT DOCUMENTS

CN 1998071 A 7/2007
CN 102271858 A 12/2011
(Continued)

OTHER PUBLICATIONS

International Search Report Translation of corresponding PCT application—PCT/EP2017/056789.
(Continued)

*Primary Examiner* — Geoffrey S Evans
(74) *Attorney, Agent, or Firm* — Murphy, Bilak & Homiller, PLLC

(57) ABSTRACT

A method for producing a solid body layer having a domed or curved shape at least in sections includes: irradiating a surface of the solid body by laser beams emitted from a laser application device to produce a modified region within the solid body that includes modifications having an extension in a longitudinal direction of the solid body, the longitudinal extension extending orthogonally to the irradiated solid body surface, wherein the modifications are configured to guide a crack for detaching the solid body layer upon application of an external force; and enlarging the extension of the modified region in the longitudinal direction to increase stress produced by the modified region in unmodified material of the solid body, wherein enlarging the extension of the modified region in the longitudinal direction (Continued)

increases the probability of spontaneous splitting of the solid body layer from the solid body without application of the external force.

22 Claims, 31 Drawing Sheets

(51) Int. Cl.
    *B23K 26/36*     (2014.01)
    *B23K 26/53*     (2014.01)
    *B23K 26/073*     (2006.01)
    *B23K 26/08*     (2014.01)
    *C03B 33/04*     (2006.01)
    *C03B 33/09*     (2006.01)

(52) U.S. Cl.
    CPC .............. *B23K 26/36* (2013.01); *B23K 26/40* (2013.01); *B23K 26/53* (2015.10); *C03B 33/04* (2013.01); *C03B 33/091* (2013.01)

(56) References Cited

U.S. PATENT DOCUMENTS

| | | | |
|---|---|---|---|
| 7,763,541 B2 | 7/2010 | Okuda et al. | |
| 10,576,585 B1 | 3/2020 | Donofrio et al. | |
| 2003/0197909 A1* | 10/2003 | Beyer | B23K 26/1494 359/509 |
| 2005/0048738 A1* | 3/2005 | Shaheen | B23K 26/18 438/458 |
| 2006/0258047 A1* | 11/2006 | Nishiwaki | B23K 26/40 438/107 |
| 2007/0020884 A1 | 1/2007 | Wang et al. | |
| 2009/0242010 A1 | 10/2009 | Herner | |
| 2010/0289189 A1 | 11/2010 | Lichtensteiger et al. | |
| 2011/0039356 A1 | 2/2011 | Ando et al. | |
| 2012/0234887 A1 | 9/2012 | Henley et al. | |
| 2013/0180665 A2* | 7/2013 | Gomez | C03B 33/04 156/712 |
| 2013/0248500 A1* | 9/2013 | Shreter | B23K 26/0006 219/121.67 |
| 2013/0292691 A1 | 11/2013 | Henley et al. | |
| 2013/0344686 A1* | 12/2013 | Fukuyo | B28D 5/0011 438/463 |
| 2014/0038392 A1 | 2/2014 | Yonehara et al. | |
| 2014/0197419 A1 | 7/2014 | Henley et al. | |
| 2015/0340541 A1 | 11/2015 | Koehler et al. | |
| 2018/0277515 A1 | 9/2018 | Homma et al. | |
| 2019/0084080 A1 | 3/2019 | Fujita et al. | |
| 2019/0088624 A1 | 3/2019 | Kurosawa et al. | |

FOREIGN PATENT DOCUMENTS

| | | | |
|---|---|---|---|
| CN | 103380482 A | 10/2013 | |
| CN | 103459082 A | 12/2013 | |
| CN | 107820453 A | 3/2018 | |
| DE | 102012001620 A1 | 8/2013 | |
| DE | 102013007672 A1 | 11/2014 | |
| DE | 102014214940 A1 | 2/2015 | |
| DE | 102014014486 A1 | 4/2015 | |
| DE | 102014002600 A1 | 8/2015 | |
| DE | 102015217288 A1 | 3/2016 | |
| DE | 102015004603 A1 | 10/2016 | |
| EP | 1806202 | 7/2007 | |
| FR | 2980279 A1 | 3/2013 | |
| JP | 2005277136 A | 10/2005 | |
| JP | 2006245498 A | 9/2006 | |
| JP | 2007142114 A | 6/2007 | |
| JP | 2009061462 A | 3/2009 | |
| JP | 2009140958 A | 6/2009 | |
| JP | 2009140959 A | 6/2009 | |
| JP | 2012109341 A | 6/2012 | |
| JP | 2013158778 A | 8/2013 | |
| JP | 2013161820 A | 8/2013 | |
| JP | 2013223886 A | 10/2013 | |
| JP | 2014527709 A | 10/2014 | |
| JP | 2016015463 A | 1/2016 | |
| JP | 2016043558 A | 4/2016 | |
| JP | 2016197699 A | 11/2016 | |
| KR | 20130100491 A | 9/2013 | |
| KR | 20130143433 A | 12/2013 | |
| KR | 20140062428 A | 5/2014 | |
| TW | 200933703 A | 8/2009 | |
| WO | 2010072675 A2 | 7/2010 | |
| WO | 2012108056 A1 | 8/2012 | |
| WO | WO-2013084877 A1 * | 6/2013 | ............ B28D 1/221 |
| WO | 2014177721 A1 | 11/2014 | |

OTHER PUBLICATIONS

Written Opinion of corresponding PCT application—PCT/EP2017/056789.

* cited by examiner

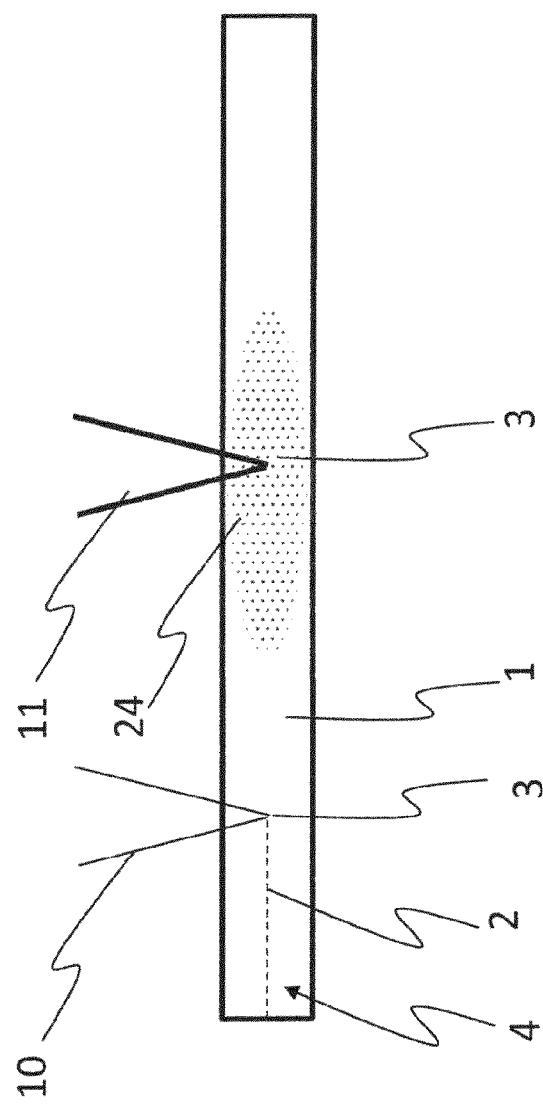

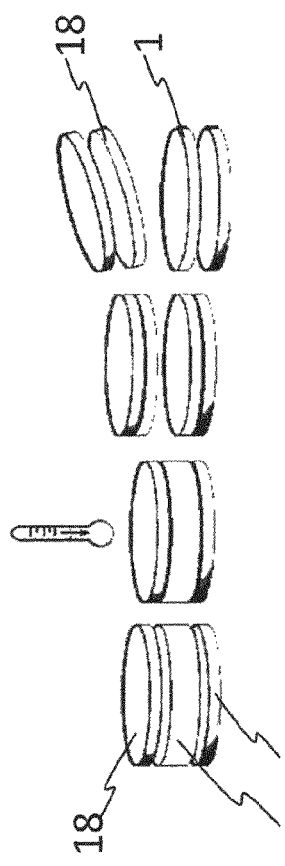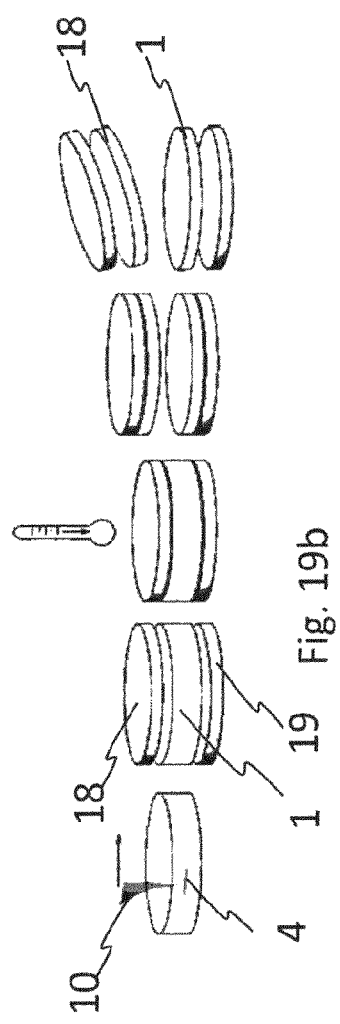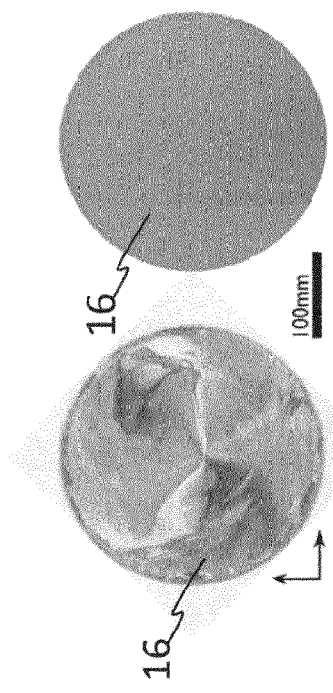

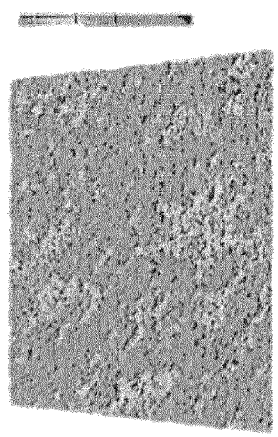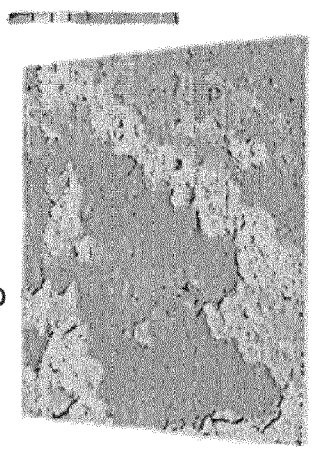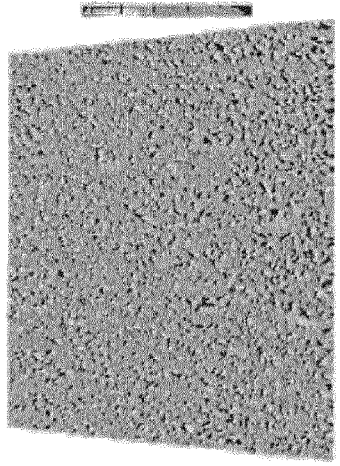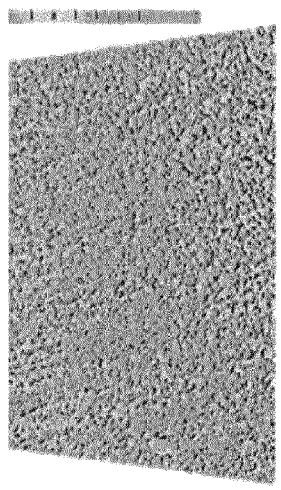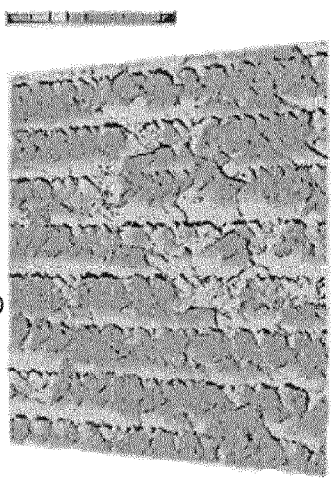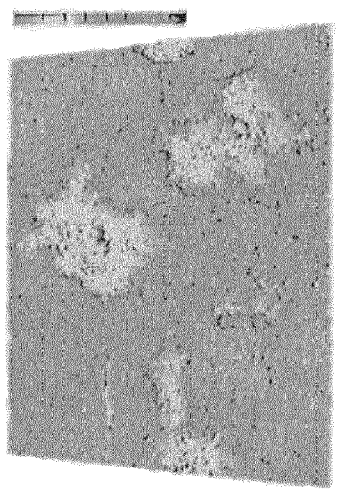

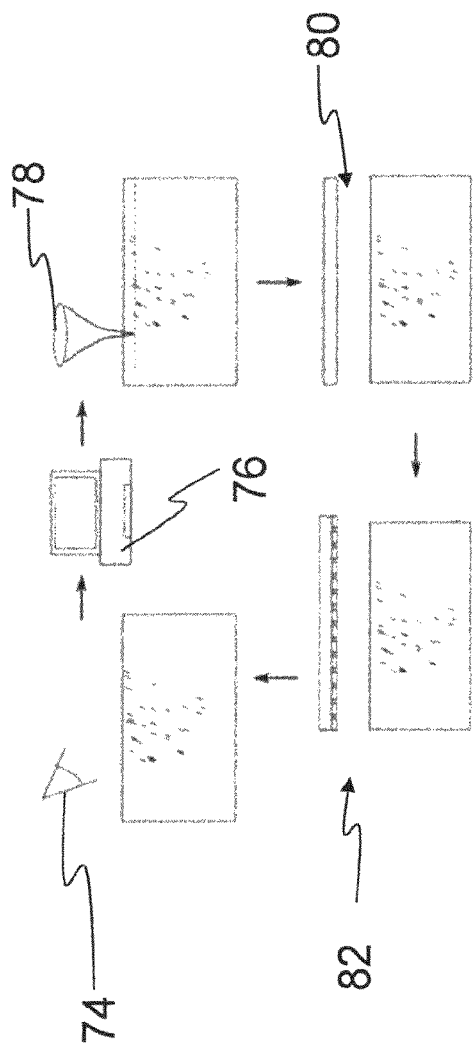
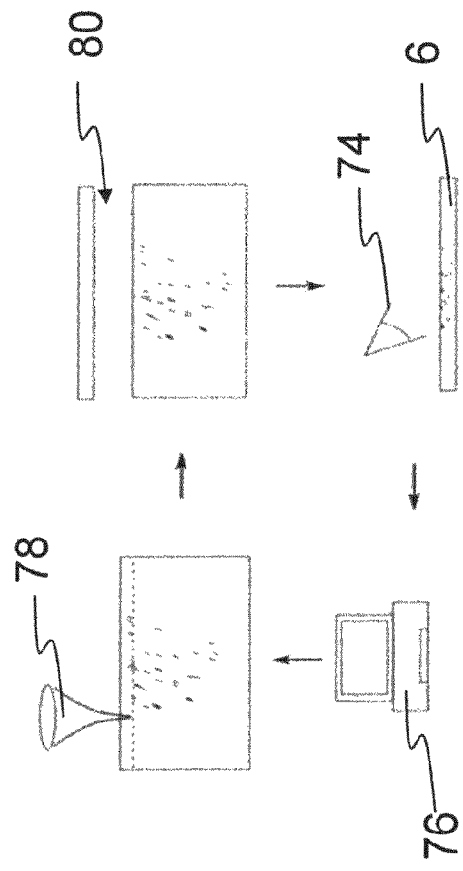
Fig. 26a
Fig. 26b

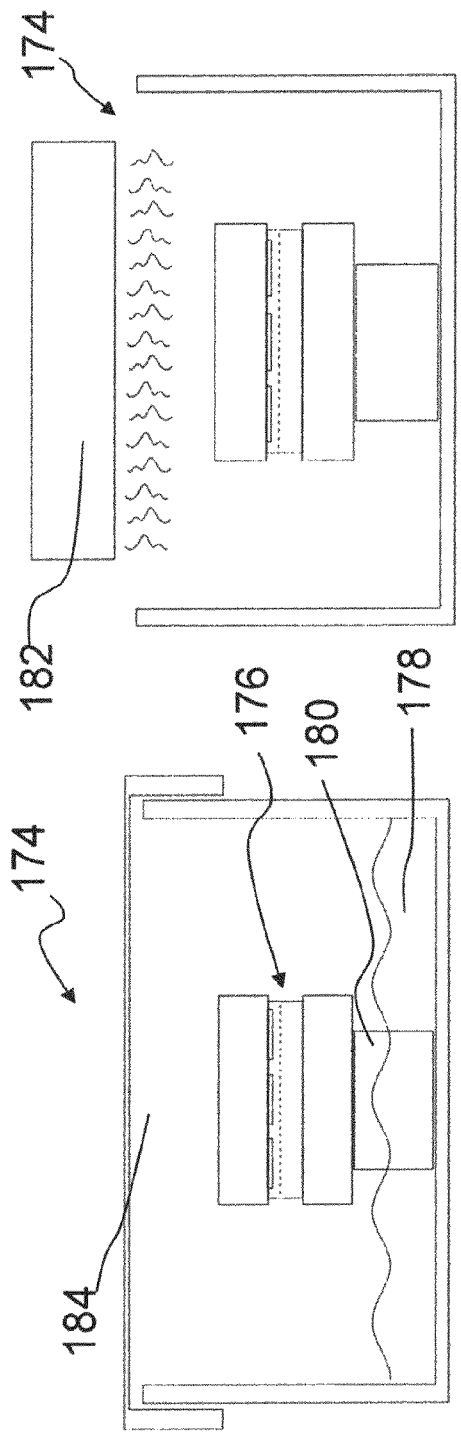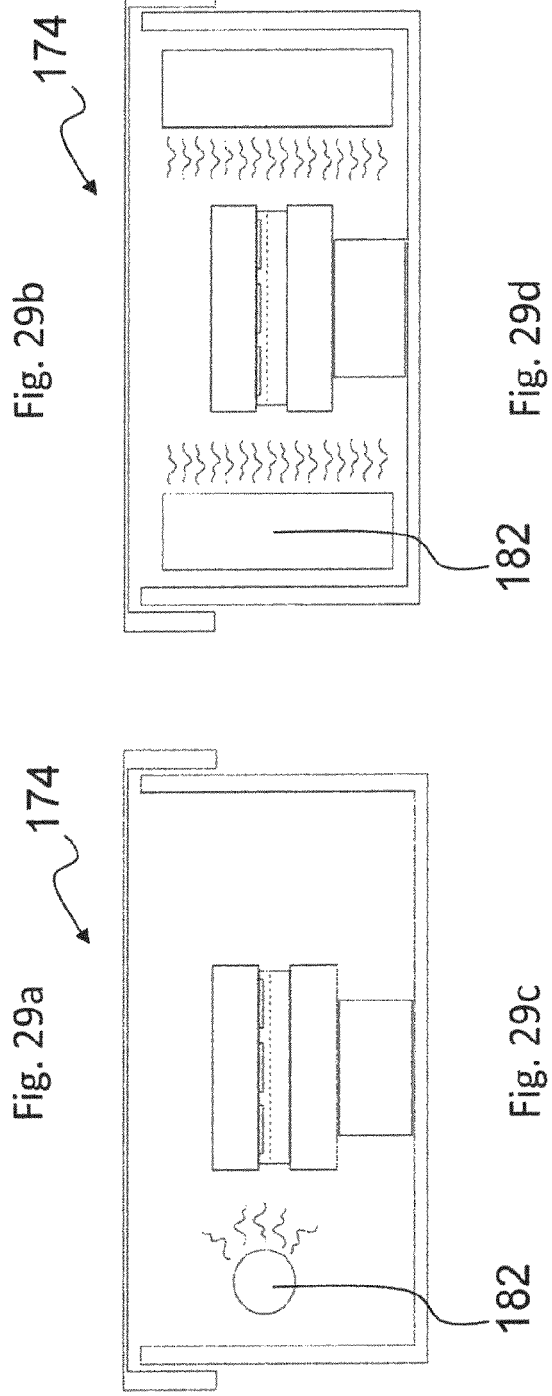

COMBINED LASER TREATMENT OF A SOLID BODY TO BE SPLIT

TECHNICAL FIELD

The present invention relates to a method for detaching at least one solid body layer from a solid body and to a method for producing at least one solid body layer which is domed or curved at least in sections.

BACKGROUND

Semiconductor materials are grown, for example, in large cylinders of crystalline materials, so-called ingots, whilst industrial processes frequent require wafer material having different thickness and surface quality. Wafering of brittle semiconductor materials is frequently carried out using diamond or slurry-based wire sawing processes. These sawing processes not only result in cutting gap loss of potentially valuable material but also surface roughness and under the surface, damage to the crystal. These aspects of wafering using sawing processes necessitate required polishing and grinding steps in the wafer manufacturing process, which results in additional damage and process costs.

In order to address these problems in conventional wafering and thinning of semiconductors, so-called kerf-less technologies have been developed which promise a reduction in cutting gap losses—if not elimination of these losses as well as damage under the surface and grinding processes steps. In particular, externally applied so-called spalling processes use stresses—frequently temperature-induced to separate crystalline materials along crystal plane with well-defined thickness. Spalling can be accomplished with nickel-chromium alloys, silver aluminium paste, epoxy resin, aluminium and nickel. Kerf-free wafering techniques have the potential to drastically reduce damage in semiconductor fabrication processes. Stress-based detachment methods such as so-called spalling (or splitting) use externally applied stresses in order to separate crystalline materials along their crystallization planes with well-defined thickness. After spalling however, substrates show so-called Wallner lines which originate from the crack propagation in the crystal.

Spalling was made possible by using differences in the thermal coefficients of expansion between a brittle material and a polymer adhering to the surface of the material. Cooling of the associated materials below the glass transition temperature of the polymer induces stresses which result in the separation of material along a crack plane. An advantage of this special method compared with other types of spalling is that as a result of the cooling process no increased diffusion of undesired chemical components takes place through the material in contrast to high-temperature processes which are also used for spalling.

However, spalling processes tend to be limited in their control of the wafer thickness achieved and it is complex to adjust the vertical location of the crack propagation. Furthermore during spalling very prominent patterns of Wallner lines are formed on the surface. This pattern consists of strip-shaped grooves and elevations which originate from the crack propagation in the semiconductor material and make it possible to deduce the crack dynamics in the substrate. Usually the crack begins at a certain point at the edge and then propagates rapidly from the edge of the substrate. Wallner lines of conventional spalling surfaces substantially increase the resulting surface roughness, frequently up to the point beyond which additional polishing or grinding steps are required before the further processing and production of circuits on the substrate.

SUMMARY

A process step using a laser system which takes place before the actual spalling process was introduced as a solution to eliminate the Wallner patterns. This method is designated as laser-assisted spalling (laser-assisted spalling—LAS). Here the horizontal plane of the crack propagation is defined by the processing plane of the material with short laser pulses and high numerical aperture of the optics. Since the laser photon energy is selected below the material band gap energy, the material is thus transparent to the laser radiation so that a deep penetration into the material can be achieved. By translation of the focusing optics along the optical axis, the plane of the laser modification can be arbitrarily specified and is defined by the focal plane of the focusing optics which can be adjusted with micrometer precision.

It is the object of the present invention to improve the known fabrication method, in particular to make it more efficient or speed it up.

The present invention therefore preferably relates to a method for producing modifications in a solid body, wherein by means of the modifications a crack guiding region or detachment plane is provided for guiding a crack in order to detach a solid body portion, in particular a solid body layer, from the solid body. Preferably the method according to the invention comprises at least the steps: moving the solid body relative to a laser application device, successively producing laser beams by means of the laser application device in order to produce respectively at least one modification, wherein the laser application device is adjusted for the defined focusing of the laser beams and/or for adaptation of the laser energy, in particular continuously, depending on at least one parameter, in particular on a plurality of parameters.

Thus, preferably a position-dependent laser power adjustment is made for adaptation to inhomogeneities of the samples or the solid or the substrate.

Depending on the method of manufacture, for example, doping inhomogeneities occur in the solid body which can be advantageously compensated by means of the said solution. Example: the doping of silicon carbide (SiC) is produced during gas-phase separation of SiC by blowing on doping gas ($N_2$), in this case, a doping spot which is clearly visible with the eye is formed. For successful laser modification (sufficient damage particularly preferably without inducing cracks) these inhomogeneities frequently require different laser parameters than the average laser parameters for otherwise homogeneously assumed workpieces/samples. For the majority of samples the process parameters are robust (i.e. process window sufficiently large) in order to successfully modify with average laser parameters for average homogeneous samples. For larger local deviations of material properties, locally adapted laser parameters must be used. Thus, in-line adaptations or adaptation with prior knowledge are feasible.

This solution is advantageous since some materials (for example: SiC) have local refractive index and other material property differences (e.g. absorption, transmission, scattering) which can be compensated by means of a position-dependent adjustment of the laser action. Preferably individual or several material properties: absorption, transmission, scattering, refractive index, etc. are used in each case as possible parameters. Position-dependent means here that a relative movement of the solid body to be treated is made with respect to the laser application device. It is therefore feasible here that the laser application device and/or the solid body are moved. The at least one parameter is preferably recorded before the application of the laser beams to the solid body in the course of an analysis step. The variation of the parameter over the irradiation surface and/or over the volume of the solid body upon which the radiation acts is preferably held retrievably in readiness in data form in the form of property profile data and is particularly preferably used for actuating the laser application device for position-dependent laser application to the solid body. In addition, it is feasible that a moving device on which the solid body is arranged, in particular a X/Y table or a rotary table is actuated or operated depending on the property profile data. Alternatively it is feasible that the property profile data are generated and evaluated in real time, i.e. are used directly for actuating the laser application device and/or the moving device.

In-line adaptations are therefore preferably based on variations which can be detected in real time (with sensor input before processing position). Particularly suitable are contactless unilateral (i.e. reflective instead of transmissive) measurement methods such as, for example, spectral reflection. For adaptations with previous knowledge preferably a laser system is required which reads in a card with correction factors K(x, y) as previous knowledge before the processing and locally (x, y) adjusts laser parameters with the aid of this. The samples are preferably provided during fixing preferably on the moving device, in particular the chuck/carrier, preferably with exact orientation so that this previous knowledge can be registered with the chuck/carrier in the machine. For adaptation of the local energy density, for example, a power tracking, adapted writing pattern (other perforation density) or multiple overruns with different writing patterns are suitable.

According to a further preferred embodiment, an additional or alternative parameter is the degree of doping of the solid body material which is preferably determined by analysis of back-scattered light (preferably Raman scattering), wherein the back-scattered light has a different wavelength or a different wavelength range from emitted light defined for triggering the back-scattering, wherein the back-scattered light is back-scattered from the predefined location or from the predefined region, wherein a Raman instrument is part of the device and the degree of doping is determined by means of the Raman instrument, wherein one or more or all of these parameters are preferably detected by means of a common detection head, in particular at the same time. Raman spectroscopy is preferably also used in glasses, sapphire and aluminium oxide ceramics. The Raman method is advantageous since it measures in the depth of the material but only from one side, requires no high transmission and outputs the charge carrier density/doping which can be correlated with the laser parameters by a fit to the Raman spectrum.

An additional or alternative parameter according to a further preferred embodiment of the present invention is the degree of doping of the solid at a predetermined location or in a predetermined region, in particular inside the solid body, in particular at a distance from the solid body surface. Preferably the degree of doping is linked to location information in such a manner that a treatment map is produced or a spatially resolved treatment instruction is provided, which predefines or predefine in a position-dependent manner the laser parameters, in particular laser focus and/or laser energy, and/or further machine parameters, in particular the advance speed.

According to a further preferred embodiment of the present invention, the degree of doping is determined by analysis of the back-scattered light with an inelastic scattering (Raman scattering), wherein the back-scattered light has a different wavelength or a different wavelength range than emitted light defined to trigger the backscattering, wherein the back-scattered light is back-scattered from the predefined location or from the predefined region.

This embodiment is advantageous since in the laser process, in particular on SiC (but also other materials) the process must be guided in a position-adapted manner (e.g. different laser energy etc.). It was identified according to the invention that, for example, in the case of SiC in particular the doping is crucial for this since this changes the transparency of the material for the processing wavelength and a higher degree of doping necessitates a higher laser energy.

According to a further preferred embodiment of the present invention, the degree of doping is determined by means of an ellipsometric measurement (e.g. Müller matrix ellipsometry with back side reflection). The ellipsometric measurement is preferably based on an optical transmission of the material.

According to a further preferred embodiment of the present invention, the degree of doping is determined by means of a purely optically calibrated transmission measurement, wherein the calibration is brought about by means of Hall measurement and four-point measurement. This method can also determine the doping/number of free charge carriers in the material which can then determine the laser energy required for the process.

According to a further preferred embodiment of the present invention, the degree of doping is determined by means of an eddy current measurement, wherein preferably conductivity differences in the solid material are determined and evaluated.

In eddy current measurements or when using eddy current sensors or in eddy current measurement technology, preferably a transmitting and receiving coil is used to detect local conductivity differences. A high-frequency electromagnetic primary alternating field is generated in the transmitting coil. Then eddy currents (locally flowing currents) are induced in the conductive material, which in turn produce a secondary oppositely directed electromagnetic alternating field. The superposition of these fields can be measured, separated and evaluated. Various quality features (layer thickness, layer resistance, material homogeneity) of principally thin conducting layers but also of bulk material can thus be measured. In a transmission arrangement (sample between transmitting and receiving coil), optimal resolutions are achieved but the arrangement of both coils on a sample side for reflection measurements is also possible. Through adapted design of the coils and choice of frequency, various penetration depths and sensitivities can be used.

In principle, there are therefore a large number of measurement methods with which in principle the doping can be measured. A rapid, contactless, non-destructive method is important here.

According to a further preferred embodiment of the present invention, a first parameter is the average refractive index of the material of the solid body or the refractive index of the material of the solid body in the region of the solid body which has to be traversed to produce a defined modification of laser beams or the transmission of the solid body at defined points of the solid body and preferably for a defined solid body depth. According to a further preferred embodiment of the present invention, a second parameter is the processing depth in the region of the solid body which has to be traversed to produce a defined modification of laser beams. According to a further preferred embodiment of the present invention, the first parameter is determined by means of a refractive index determining means, in particular by means of spectral reflection and/or the second parameter is determined by means of a topography determining means, in particular by means of a confocal chromatic distance sensor. According to a further preferred embodiment of the present invention, data relating to the first parameter and relating to the second parameter are provided in a data storage device and supplied to a control device at least before generating the modifications, wherein the control device adjusts the laser application device depending on the respective location of the modification to be produced.

The present invention relates to a method for detaching at least one solid body layer from a solid body, wherein by means of the modifications a crack guiding region is provided for guiding a crack in order to detach a solid body portion, in particular a solid body layer, from the solid body. According to the invention, the method preferably comprises at least the steps: moving the solid body relative to a laser application device, successively producing laser beams by means of the laser application device in order to produce respectively at least one modification, wherein the laser application device is adjusted for the defined production of modifications depending on at least one parameter, in particular the transmission of the solid body at defined locations and for a defined solid body depth, wherein inhomogeneities of the solid body on the surface or in the region of the affected surface and/or in the volume of the solid body or in the region of the affected volume of the solid body are compensated by the adjustment of the laser application device, detaching the solid body layer from the solid body. In the region of the affected volume here preferably describes the regions through which the laser radiation penetrates. Preferably this region extends around the laser radiation in the radial direction by up to 1 mm or up to 0.5 mm or up to 0.1 mm.

According to a further preferred embodiment of the present invention, data relating to the parameter or to a plurality of parameters are provided in a data storage device and are supplied to a control device at least before generating the modifications, wherein the control device adjusts the laser application device depending on the respective location of the modification to be produced.

According to a further preferred embodiment of the present invention, the laser beams for generating modifications have more energy in regions with low transmission than in regions with high transmission, wherein the laser application device preferably comprises a means or an adjusting device, in particular an acousto-optic modulator, for adjusting the laser beam energy.

According to a further preferred embodiment of the present invention, the solid body layer is detached from the solid body along the crack guiding region as a result of the production of modifications or the solid body is acted upon thermally, in particular cooled, after the production of modifications and as a result of the thermal action the solid body layer is detached from the solid body along the crack guiding region, or a polymer layer is arranged or produced on the solid body, wherein the polymer layer is preferably arranged or produced on a surface of the solid body layer to be detached, wherein the polymer layer is acted upon thermally, in particular cooled, wherein the polymer layer undergoes a change in its strength in response to the thermal action, with the result that as a result of the change in strength of the polymer layer, mechanical stresses are obtained in the solid body, wherein the mechanical stresses bring about a crack propagation along the crack guiding region in order to detach the solid body layer from the solid body.

The present invention preferably relates to a method for producing a detachment region in a solid body for detaching a solid body portion, in particular a solid body layer, from the solid body, wherein the solid body portion to be detached is preferably thinner than the solid body reduced by the solid body portion. Preferably the method according to the invention comprises at least the steps: providing a solid body to be treated, wherein the solid body consists of a chemical compound; providing a laser light source; applying laser radiation of the laser light source to the solid body, wherein the laser beams penetrate into the solid body over a surface of the solid body portion to be detached and/or wherein the laser radiation temperature controls in a defined manner a predefined portion of the solid body inside the solid body to form a detachment region or a plurality of partial detachment regions. Preferably the temperature produced in the predefined portion of the solid body by the laser beams is so high that the material forming the predefined portion undergoes modifications in the form of a predetermined material conversion. Particularly preferably the modifications bring about a pressure rise in the solid body.

Additionally or alternatively the present invention relates to a method for detaching at least one solid body layer from a solid body. This detachment method in this case preferably comprises at least the steps: providing a solid body to be treated, wherein the solid body consists of a chemical compound; providing a laser light source; applying laser radiation of the laser light source to the solid body, wherein the laser beams penetrate into the solid body over a surface of the solid body portion to be detached, wherein the laser radiation temperature controls in a defined manner a predefined portion of the solid body inside the solid body to form a detachment region or a plurality of partial detachment regions. Preferably the temperature produced in the predefined portion of the solid body by the laser beams is so high that the material forming the predefined portion undergoes modifications in the form of a predetermined material conversion. Particularly preferably the modifications bring about a pressure rise in the solid body.

In this case, the solid body layer is preferably detached from the solid body as a result of the pressure rise along the crack guiding region due to propagation of a crack.

According to a further preferred embodiment, the laser beams penetrate into the solid body in the longitudinal direction of the solid body or inclined at an angle of up to 60° with respect to the longitudinal direction of the solid body over an, in particular flat, surface which is preferably part of the solid body layer. The crack guiding region is preferably formed from several layers of modifications, wherein the layers are produced spaced apart from one another or offset in the longitudinal direction, and/or at least a plurality of the modifications have an extension in the longitudinal direction which is between 1 and 50 µm or between 5 µm and 50 µm and/or the laser beams for producing the modifications are introduced into the solid body in such a manner than the numerical aperture is less than 0.8, in particular less than or equal to 0.5.

The present invention further relates to a method for producing at least one solid body layer which is domed or curved at least in sections. According to the invention, the method comprises at least the steps: moving the solid body relative to a laser application device, successively producing laser beams by means of the laser application device in order to produce respectively at least one modification inside the solid body, wherein as a result of the modifications a crack guiding region is provided for guiding a crack in order to detach a solid body portion, in particular a solid body layer, from the solid body, wherein the modifications bring about a pressure rise in the solid body, wherein the solid body layer is detached from the solid body due to the propagation of a crack as a result of the pressure rise along the crack guiding region, wherein at least a portion of the modifications as part of the solid body layer is separated from the solid body, wherein the solid body layer is converted into a curved or domed shape as a result of the modifications, wherein the further surface portion of the solid body layer resulting from the crack guiding region is therefore convexly shaped at least in sections. According to a further preferred embodiment of the present invention, the laser beams penetrate into the solid body in the longitudinal direction of the solid body or inclined at an angle of up to 60° with respect to the longitudinal direction of the solid body over an, in particular flat, surface which is preferably part of the solid body layer and the crack guiding region is preferably formed from several layers of modifications, wherein the layers are produced spaced apart from one another or offset in the longitudinal direction, and/or at least a plurality of the modifications have an extension in the longitudinal direction which is between 1 and 50 µm or between 5 µm and 50 µm and/or the laser beams for producing the modifications are introduced into the solid body in such a manner than the numerical aperture is less than 0.8, in particular less than or equal to 0.5.

The present invention further relates to a method for detaching at least one solid body layer or solid body layer, in particular a solid body wafer from a solid body or donor substrate. The method according to the invention preferably comprises at least the steps: providing a solid body, producing modifications inside the solid body by means of laser beams, wherein as a result of the modifications a detachment region or crack guiding region is predefined along which the solid body layer is detached from the solid body, removing material of the solid body, in particular to produce a circumferential recess, wherein the removal of material takes place in the longitudinal direction of the solid body, wherein the detachment region is exposed as a result of the removal of material.

Detaching the solid body layer from the solid body. Preferably the solid body layer is detached from the solid body whereby the solid body is weakened by the modifications in the crack guiding region in such a manner that the solid body layer becomes detached from the solid body as a result of the removal of material, or after the removal of material such a number of modifications is produced that the solid body is weakened in the crack guiding region in such a manner that the solid body layer becomes detached from the solid body or a stress generating layer is produced or arranged on an in particular flat surface of the solid body aligned at an inclination to the circumferential surface and as a result of a thermal action on the stress generating layer, mechanical stresses are generated in the solid body, wherein a crack for detaching a solid body layer is produced as a result of the mechanical stresses, which crack propagates along the modifications starting from the surface of the solid body exposed by the removal of material or the solid body is acted upon thermally, in particular cooled after the production of the modifications and as a result of the thermal action, the solid body layer is detached from the solid body along the crack guiding region.

Consequently, the step of arranging or producing a receiving layer on the solid body preferably has the feature that the receiving layer comprises or consists of a polymer material, in particular polymethyl siloxane or an elastomer or an epoxy resin or a combination thereof and as a result of a thermal action on the receiving layer to produce, in particular mechanically, crack propagation stresses in the solid body, the polymer material undergoes a glass transition, wherein as a result of the crack propagation stresses a crack propagates in the solid body along the crack guiding region.

According to a further preferred embodiment of the present invention, the receiving layer comprises in terms of weight at least for the most part and preferably completely a polymer material or consists thereof, wherein the glass transition of the polymer material lies between −100° C. and 0° C., in particular between −85° C. and 10° C. or between −80° C. and −20° C. or between −65° C. and −40° C. or between −60° C. and −50° C.

The receiving layer preferably consists of a polymer hybrid material or comprises such a material, which particularly preferably forms a polymer matrix, wherein a filler is located in the polymer matrix, wherein the polymer matrix preferably is a polymethylsiloxane matrix and wherein the mass fraction of the polymer matrix in the polymer matrix material is preferably 80% to 99% and particularly preferably 90% to 99%.

The receiving layer is preferably prepared as prefabricated film and coupled to the solid body, in particular stuck on or bonded on.

According to the invention, a polymer hybrid material for use in a splitting method is therefore specified in which at least two solid body partial pieces are produced from a solid body starting material. The polymer hybrid material according to the invention comprises a polymer matrix and at least one first filler embedded therein. Insofar as hereinafter there is talk of a or the filler, this should at the same time also include the possibility of a plurality of fillers. For example, the filler can comprise a mixture of different materials, e.g. metal particles and inorganic fibres. Any polymer or a mixture of different polymers can be used as polymer matrix with the aid of which the stresses required for a splitting of the solid body starting material can be produced. For example, the polymer matrix can be configured as an elastomer matrix, preferably as a polydiorganosiloxane matrix, particularly preferably as a polydimethyl siloxane matrix. Such polymer materials can be used particularly easily as matrix material combined with fillers, since as a result of the variable degree of cross-linking the properties can be flexibly adjusted and adapted to the respective filler and the solid body starting material to be split. According to one embodiment, the mass fraction of the polymer matrix in the polymer hybrid material can be 80% to 99%, preferably 90% to 99%.

The first filler can be of an organic or inorganic nature and consist both of a chemical element and also of a chemical compound or a substance mixture, for example an alloy.

The first filler is constructed in such a way that it acts as reactant, initiator, catalyst or promotor during the detachment of the polymer hybrid material from the solid body partial piece after the splitting and thereby results in a faster detachment of the polymer hybrid material from the solid body partial piece after the splitting compared with a polymer material without a first filler.

The specific chemical composition and configuration of the first filler and its mass fraction is in this case in particular dependent on the specific material of the polymer matrix, which is to be detached, the solvent used for this purpose and the reactants used. Furthermore the material of the solid body starting material and the dimensions of the solid body starting material to be split also play a role.

The specific fraction of the first filler in the polymer matrix is strongly dependent on the material of the filler and its mode of action. On the one hand, the polymer matrix despite filler must still fulfil its task of producing stresses. On the other hand, the fraction of the first filler must be sufficiently high to achieve the desired influencing of the polymer removal. The person skilled in the art can determine the respectively optimal mass fraction of the first filler in the course of simple concentration-dependent tests.

In order to improve the mechanical properties, a further filler, such as for example pyrogenic silicic acid in the form of an inorganic network in the polymer can make an additional contribution. In addition to these strong interactions in the form of the network, less strong interactions due to purely hydrodynamic reinforcements can also contribute to the improvement. For example, a targeted increase in the viscosity may be mentioned here, which enables an improved processing in the splitting method and can thus contribute to improved manufacturing tolerances. Furthermore, as a result of this interaction a reduction in the internal degrees of freedom with regard to a structural reorientation with increasing reinforcement is made difficult. This results in a desired reduction in the glass transition temperature of the polymer used in the polymer hybrid material, which enables the advantage of a lower temperature in the splitting method. According to the invention, the first filler in a polymer hybrid material is used to accelerate the detachment of the polymer hybrid material from the solid body partial piece, which is obtained by splitting by means of a splitting method in which a solid body starting material is split into at least two solid body partial pieces.

The first filler can be distributed in the polymer matrix in such a manner that the mass fraction of the first filler, starting from the outer, i.e. lower boundary surface of the polymer hybrid material, which is connected to the solid body starting material during the splitting method, decreases in the direction of a further boundary surface of the polymer hybrid material arranged parallel to the lower boundary surface. This means that the mass fraction of the filler near the solid body starting material or partial piece is larger than in the remaining regions of the polymer hybrid material. This distribution of the first filler enables a particularly effective removal of the polymer hybrid material after the separation since the first filler is located close to the boundary surface to the solid body partial piece and can develop its action there. At the same time, the remaining regions of the polymer hybrid material have fewer or even no fractions of the first filler so that the function of the polymer is influenced as little as possible.

In one embodiment, the polymer hybrid material is constructed in layer form, wherein only one layer facing the solid body starting material comprises the first filler whereas the remaining polymer hybrid material is free from the first filler. Furthermore, a lower region of the polymer hybrid material, which is directly adjacent to its lower boundary surface can be free from the first filler. Thus, a sequence of regions can be obtained as follows: a region without first filler is initially located adjacent to the solid body starting material, followed by a region having a high proportion of first filler and a region having a low proportion of first filler or without first filler.

These and all the regions described hereinafter can be configured in the form of layers, i.e. the region extends predominantly parallel to the boundary surface of the solid body starting material on which the polymer hybrid material is applied and has a longitudinal and transverse extension at least in the region of this boundary surface. A lower region without first filler can be provided in particular for the case where the first filler causes a deterioration in the adhesion of the polymer hybrid material to the solid body starting material. In order to avoid this, firstly a region without filler is provided which is followed by a region having a high proportion of first filler so that the first filler can fulfil its function. A lower layer without first filler can for example have a thickness between 10 μm and 500 μm, for example 100 μm.

Furthermore, an upper region of the polymer hybrid material which directly adjoins its upper boundary surface can be free from the first filler. The upper boundary surface should be understood here as that which delimits the polymer hybrid material opposite to the lower boundary surface and to the solid body starting material towards the surroundings. Upper and lower boundary surface can be arranged parallel to one another.

Such an upper region without first filler can in particular be provided when the first filler disadvantageously influences the heat transfer between surroundings and polymer hybrid material, for example when the cooling of the polymer hybrid material would be delayed.

The first filler can comprise a material or consist of a material that can react with a reactant, preferably an oxidizing agent to release a gaseous product.

By this means cavities can be generated in the polymer matrix, which enable more rapid access of the reactants and solvents to the polymer matrix and any existing sacrificial layer and additionally bring about a more rapid removal of educts and dissolved components.

As a result of the generation of gaseous reaction products, additional driving forces can be introduced which further assist the removal of the polymer hybrid material. The formation of additional cavities and the production of gaseous reaction products accelerates the removal of the polymer and therefore contributes to an increase in the overall yield of the splitting method. By variation of the proportion of first filler, the cavity density in the boundary region between solid body partial piece and polymer hybrid material or between sacrificial layer and polymer hybrid material can be specifically influenced.

The first filler can comprise a metal, in particular aluminium iron, zinc and/or copper or consist of a metal, in particular the aforesaid metals. "Consisting of" includes all the presently mentioned materials, which can contain technologically induced impurities or technologically induced additives which for example are used to the production of the fillers or the distribution or binding thereof to the polymer matrix.

Metal fillers can react with oxidizing agents such as, for example, hydrochloric acid, nitric acid, citric acid, formic acid or sulfaminic acid with the release of a gaseous product and are thereby removed from the polymer hybrid material.

For example, aluminium reacts with concentrated hydrochloric acid to form solvatized metal ions and hydrogen according to the following equation: 6 HCl+2 Al+12 H$_2$O ! 2 [AlCl$_3$*6 H$_2$O]+3 H$_2$.

Similarly the reaction of zinc as filler by reaction with concentrated hydrochloric acid results in the formation of five additional cavities: Zn+2 HCl!ZnCl$_2$+H$_2$. In the said examples, additional driving forces are introduced by the generation of hydrogen which further assist the removal of the polymer hybrid material. In addition, the first filler can improve the thermal conductivity inside the polymer hybrid material, for example by the first filler having a higher thermal diffusivity than the polymer of the polymer matrix. This can be the case for example when a further advantages for the case where the first filler comprises a metal lies in the improved thermal diffusivity inside the polymer hybrid material. Due to an improved thermal diffusivity, the stresses produced for the splitting of the solid body starting material by means of cooling can be generated more effectively as a result, i.e. more rapidly and with low consumption of coolant. This can increase the overall yield of the splitting method.

Furthermore a second filler can be provided in the polymer hybrid material which enhances the adhesion of the polymer hybrid material on the solid body starting material compared to a polymer hybrid material without second filler. Preferably the adhesion is enhanced compared to a polymer material without filler.

For example, the second filler can comprise a filler which can be activated by means of plasma. The plasma activation results in new surface species, which can be created so that a stronger interaction with the surface of the solid body starting material results and as a result the adhesion of the polymer hybrid material is improved.

The type of surface species which can be achieved by the plasma treatment is primarily dependent on the process control of the plasma process. For example, during the plasma treatment gases such as nitrogen, oxygen, silane or chlorosilane can be added so that for example polar groups are formed, which can interact more strongly with the surface of the solid body starting material.

The second filler can be distributed in the polymer matrix so that the mass fraction of the second filler increases in the direction of the lower boundary surface. For example the polymer hybrid material can contain the second filler merely in a region adjacent to the lower boundary surface wherein the region can also configured as a layer in the sense of the aforesaid definition.

This enables the arrangement of the second filler preferably in the vicinity of the boundary surface between polymer hybrid material and solid body starting material whereby the adhesion is improved and thus a greater transmission of force into the solid body starting material to be split is made possible. For example the second filler can comprise core-shell polymer particles.

Preferred in this case are particles whose polymer composition differs from the polymer matrix of the polymer hybrid material in that in particular the surface, i.e. the shell of the core-shell particles can be activated more strongly, e.g. by means of low-temperature plasma.

Examples for this are core-shell particles comprising a polysiloxane core with an acrylate shell or comprising a nanoscale silicate core with an epoxy shell or comprising a rubber particle core with an epoxy shell or comprising a nitrirubber particle core with an epoxy shell. The second filler can be activated by means of low-temperature plasma, e.g. cold plasma. For example the plasma can be produced by means of a dielectric barrier discharge (DBE). In this case, electron densities in the range of $10^{14}$ to $10^{16}$ m$^{-3}$ can be produced. The average temperature of the "cold" non-equilibrium plasma (plasma volume) produced by DBE is about 300±40 K at ambient pressure. The average temperature of the non-thermal plasma produced by DBE is about 70° C. at ambient pressure.

During the DBE treatment, the surface is for example exposed to unipolar or bipolar pulses having pulse durations of a few microseconds to a few tens of nanoseconds and amplitudes in the single-digit to two-digit kilovolt range. In this case, no metal electrodes in the discharge space and therefore no metal impurities or electrode wear is to be expected.

In addition a high efficiency is advantageous since no charge carriers need to escape or enter at the electrodes.

Dielectric surfaces can be modified and chemically activated at low temperatures. The surface modification can be accomplished for example by an interaction and reaction of the surface species by ion bombardment. Furthermore, process gases such as, for example, nitrogen, oxygen, hydrogen, silane or chlorosilane, e.g. SixHyEz with E=F, Cl, Br, I, O, H and x=0 to 10, z=0 to 10, $SiH_4$, $Si(EtO)_4$ or $Me_3SiOSiMe_3$, can be added during a plasma treatment in order to produce specific chemical groups on the surface. The second filler can furthermore be activated by means of corona treatment, flame treatment, fluorination, ozonation or UV treatment or excimer irradiation. As a result of such activation, for example, polar groups are generated on the surface of the second filler, which can interact with the surface of the solid body starting material and thus improve the adhesion. The polymer hybrid material can further additionally comprise a third filler compared to a polymer hybrid material having a first filler or to a polymer hybrid material having a first and a second filler. This third filler has a higher thermal diffusivity and/or a higher elastic modulus compared to the polymer of the polymer matrix.

For example the elastic modulus of the polymer under low-temperature conditions lies in the lower single-digit gigapascal range (about 1-3 GPa) whereas for example metal fillers have an elastic modulus in the two-digit to three-digit gigapascal range. With a correspondingly high filler fraction, a percolating filler network is possible, which enables an improved "force coupling-in" into the solid body starting material.

The percolation is substantially influenced by the degree of volume filling of the respective fillers (e.g. 0.1 vol. %, 1 vol. % to 10 vol. % according to aspect ratio). With increasing introduction of force, the viscoelastic layer structure of the polymer structure can be immersed and a plurality of percolation paths become effective. Here improved heat transfers are made possible since improved contact of the fillers with the surface of the solid body starting material can occur.

The mechanical stability of the polymer hybrid material is also achieved more rapidly at low temperatures. Overall this results in a lower standard deviation of the corresponding structure property profile such as, for example, breaking stress and breaking strain of the polymer hybrid material and thus results in an increase in the overall yield of the splitting method. The spatially resolved property profile variations (stress peaks in the polymer hybrid material) and therefore in the solid body are smaller, which results in a higher overall yield of the splitting method and better quality of the solid body partial pieces produced.

The third filler can bring about an improved heat transfer between surroundings and polymer hybrid material and a faster heat conduction inside the polymer hybrid material so that the polymer hybrid material can be cooled more rapidly and the splitting method can be carried overall more rapidly and therefore more effectively.

Due to an increase in the elastic modulus, higher stresses can be produced for the splitting of the solid body starting material so that solid body starting materials for which a particularly high stress is required can also be split.

In addition, the third filler can also be used to influence the coefficient of thermal expansion. The aim here is the largest possible difference between the coefficients of thermal expansion of the polymer hybrid material and the solid body starting material to be split in order to be able to achieve the necessary stresses for the splitting. Preferably the third filler has a high coefficient of thermal expansion, i.e. an expansion coefficient which is higher than that of the polymer matrix. For example the coefficient of thermal expansion of the third filler can be more than 300 ppm/K.

The third filler can thus be distributed in the polymer matrix so that the mass fraction of the third filler increases in the direction of the upper boundary surface in order to enable a more rapid heat transfer in particular at the boundary surface to the surroundings.

The third filler can comprise a metal, in particular aluminium, iron, zinc and/or copper or consist of one of the said metals. Metals are generally characterized by a high thermal conductivity and thermal diffusivity.

The fillers described (first, second, third filler) can be present distributed in particulate form in the polymer matrix, wherein the particle size can lie in the μm and nm range relative to at least one dimension of the particle. In addition to a spherical shape, the filler particles can also have different configurations, for example a rod-shaped or disk-shaped shape.

The filler particles can have all particular distributions, for example, monomodal or bimodal, in particular monodisperse or broad. The fillers can be bound both physically, e.g. by embedding in the polymer network and also chemically. Furthermore, one or more of the described fillers can comprise inorganic or organic fibres, for example carbon, glass, basalt or aramid fibres or consist of these if the previously described functions can be reconciled with these. Optionally a further filler can also be added which comprises the said fibres or consists of such.

Fibres usually have highly anisotropic properties. By means of a direction-dependent positioning of the filler in the polymer hybrid material, it is possible to specifically influence the stresses required for splitting the solid body starting material. This can help to increase the overall yield of the splitting method. An additional advantage exists in the case where an organic or inorganic filler is used as fibrous material having a highly anisotropic structure without an improvement in the mechanical properties inside the polymer hybrid material being able to be achieved.

The fillers described can additionally comprise core-shell particles or consist of these. Additionally or alternatively a further filler comprising or consisting of core-shell particles can be provided in the polymer hybrid material.

In addition to an improved activatability, the use of core-shell polymer particles also allows new configuration of energy-absorbing mechanisms which can overall result in an increase in impact strength and fracture toughness, in particular an increase in the low-temperature impact strength of the polymer hybrid material when used in the splitting method and thus can also help towards a higher overall yield of the splitting method. For example, a mechanical destruction of a film made of a polymer hybrid material can occur with a lower probability so that the possibility of reusing the film can be favoured.

For example, by preventing crack propagation as a result of core-shell polymer particles, destruction of the film in the splitting method is prevented and ways for reuse are opened up.

In this case, elastomer particles obtained can undergo a plastic deformation and form cavities whereby further additional energy can be absorbed. Also an additional energy absorption by the shear flow of the matrix can be compensated which overall improves the mechanical properties. Core-shell particles are characterized in that a usually spherical core of one material is surrounded by a shell of a second material. The shell can either completely surround the core or can be transmitting. The materials can be both inorganic materials such as, for example, metals or organic materials, such as for example polymers. For example, two different metals can be combined. However, it is also possible to surround the core made of a polymer with a shell made of a metal or a second polymer.

Core-shell particles make it possible to combined the properties of the first and second material. For example, the size and density of the filler particles can be specified by means of an inexpensive polymer core whilst the metal shell can react as described above. As a result of their frequently monodisperse particle size distribution, the properties of the core-shell particles can also be precisely predicted and adjusted.

Furthermore, one or more fillers (first, second and/or third filler) can comprise carbon in the form of industrial soot (carbon black), graphite, chopped carbon fibres, carbon nanofibres, preferably in the form of carbon nanotubes (CNT) such as, for example, multi-walled carbon nanotubes (MWCNT) and single-walled carbon nanotubes (SWCNT), or consist of these, The carbon nanotubes consist of cylindrical graphite layers which are constructed of a different number of cylinders.

If these tubes consist only of one cylinder, they are designated as single-walled carbon nanotubes (SWCNT). If two or more cylinders are present, either double-walled (DWCNT) or multi-walled carbon nanotubes (MWCNT) are formed. These can preferably be nested concentrically inside one another.

According to various embodiments, the third filler can comprise MWCNTs or consist of these since these have a particularly high thermal conductivity (>3000 W*(m*K)−1) and at the same time a very high tearing strength in the range of 5-60 GPa. The high mechanical stability is shown here in high tearing values, extreme elasticity and a very good resilience of the filler.

The basis for this are the sp2 hybridized strong σ-C—C-bonds associated with a delocalized p-orbital ss πbond to three neighbouring carbon atoms. Deflections up to 90° are possible here.

Even higher property values can be achieved with SWCNT (elastic modulus: 410 GPa to 4150 GPa vs. graphite: 1000 GPa, SWCNT: thermal conductivity about 6000 W*(m*K)−1). However, an inferior performance/cost ratio is shown here compared with MWCNT. The cylinder diameters of MWCNT are typically in the range from 1 nm to 100 nm, preferably from 5 to 50 nm, with a length from 500 nm to 1000 μm.

According to further embodiments, the third filler can comprise MWCNT and at the same time the second and/or first filler can comprise carbon black of consist of this since an improvement in the thermal conductivity (e.g. up to 200 W*(m*K)−1) can also be achieved. Since the use of for example carbon black has a significantly lower tearing strength with values of <0.4 GPa, a combination of two or more fillers is possible and can result in an improvement in the overall split yield and an improvement in the overall costs in the splitting method. 20 In this case, the average diameter of the soot particles (carbon black) lie in the range from 5 nm to 500 nm, preferably from 20 nm to 200 nm, particularly preferably from 40 nm to 100 nm.

Furthermore, the fillers can be silicic acid, for example, pyrogenic silicic acid or consist of this. 25 Additionally or alternatively a further filler comprising or consisting of silicic acid can be provided in the polymer hybrid material.

Pyrogenic silicic acid can form a three-dimensional network and thereby contribute to the improvement in the mechanical stability. Thus, such a filler can be used for the targeted adjustment of the mechanical properties of the polymer hybrid material. One or more of said fillers (first, second, third filler) can consist of the same material if this can be reconciled with the function ascribed to them. For example, both the first and also the third filler can comprise aluminium or consist of aluminium. Aluminium can be used as described as above both for generating cavities and therefore for accelerating the detachment of the polymer hybrid material from the solid body partial piece and also to increase the thermal diffusivity. Such a configuration simplifies the production process since it can be sufficient to add only one or two fillers to fulfil all the functions.

First and second as well as optionally third filler can also consist of different materials. This enables an individual and therefore better adaption of the filler to the desired function.

A film according to the invention comprises a polymer hybrid material as described above. The film can have a thickness of, for example, 0.5 to 5 mm. A polymer hybrid material or a film according to the invention is applied to at least this surface so that a corresponding composite structure is obtained. The applied polymer hybrid material or the applied film are designated hereinafter as receiving layer. The thickness of such a receiving layer can, for example be between 0.5 mm and 5 mm, in particular between 1 mm and 3 mm. Optionally the polymer hybrid material or the film can be applied to several exposed surfaces, in particular to surfaces arranged parallel to one another.

The thermal action preferably involves a cooling of the receiving layer below 10° C. and particularly preferably below 0° C. and further preferably below −10° C. or below −40° C.

The cooling of the receiving layer is most preferably accomplished in such a manner that at least a part of the receiving layer undergoes a glass transition. The cooling here can be a cooling to below −100° C. which can be effected, for example by means of liquid nitrogen. This embodiment is advantageous since the receiving layer depending on the temperature change contracts and/or undergoes a glass transition and the forces thereby produced are transferred to the solid body starting material, with the result that mechanical stresses can be produced in the solid body which result in the triggering of a crack and/or in the propagation of a crack, wherein the crack initially propagates along the first detachment plane for cleaving the solid body layer.

In a further step the polymer hybrid material or the film is removed from the solid body partial piece, for example by a chemical reaction, a physical detachment process and/or mechanical removal.

The process of detachment of the polymer hybrid material from the solid body partial piece can take place at moderate ambient temperature e.g. in the range from 20° C. to 30° C., preferably in the higher temperature range from 30° C. to 95° C., e.g. from 50° C. to 90° C., or however also in a lower temperature range between 1° C. and 19° C.

The increased temperature range can enable a shortening of a chemical detachment reaction as a result of an increase in the reaction rate, e.g. in the case of using a sacrificial layer between the polymer hybrid material and the solid body. When a sacrificial layer is used, the detachment can take place in an aqueous solution, advantageously with a pH in the range of 2-6. According to various embodiments, for example, the detachment process can take place in the form of a treatment with a solution from a suitable apolar solvent, wherein moderate ambient temperatures in the range from 1° C. to 50° C. are preferred and from 20° C. to 40° C. are particularly preferred.

A particular advantage here is the detachment without any action of temperature on the film. Advantageously aliphatic and aromatic hydrocarbons such as, for example, toluene, n-pentane, n-hexane but also halogenized solvents such as, for example, carbon tetrachloride can be used. In this case, additional forces can be introduced into the polymer hybrid material to be detached and the boundary surface to the solid body partial piece since a very strong reversible swelling of the polymer hybrid material can occur due to the solvent treatment, with the result that the detachment is overall simplified.

According to further embodiments, a combination with the above-described detachment mechanism of the sacrificial layer and treatment with a suitable apolar solvent can take place—also without any action of temperature on the film. The material is removed here preferably in the longitudinal direction of the solid body.

The present invention further relates to a method for detaching at least one solid body layer or solid body layer, in particular a solid body wafer from a solid body or donor substrate. The method according to the invention preferably comprises at least the steps: providing a solid body, producing modifications inside the solid body by means of laser beams, wherein a detachment region or crack guiding region is predefined by the modifications along which a detachment of the solid body layer from the solid body takes place, removing material of the solid body, in particular to produce a circumferential recess, wherein the removal of material takes place in the longitudinal direction of the solid body, wherein the detachment region is exposed by the removal of material.

Detaching the solid body layer from the solid body. Preferably the detachment of the solid body layer from the solid body is accomplished such that the solid body is weakened by the modifications in the crack guiding region in such a manner that the solid body layer is detached from the solid body as a result of the removal of material or after the removal of material such a number of modifications is produced that the solid body is weakened in the crack guiding region in such a manner that the solid body layer becomes detached from the solid body or a stress-generating layer is produced or arranged on an in particular flat surface of the solid body aligned at an inclination to the circumferential surface and as a result of a thermal action on the stress generating layer, mechanical stresses are generated in the solid body, wherein a crack for detaching a solid body layer is produced as a result of the mechanical stresses, which crack propagates along the modifications starting from the surface of the solid body exposed by the removal of material or the solid body is acted upon thermally, in particular cooled after the production of the modifications and as a result of the thermal action, the solid body layer is detached from the solid body along the crack guiding region.

The detachment from the solid body can furthermore be achieved using other methods for introducing an external force. In particular, sound waves and especially ultrasonic waves can be used in order to produce a sufficient application of force to the workpiece. Other forces are tensile forces comparable with opening force presses, targeted local applications of force (hammer and chisel) as well as gravitational forces exerted via an opposing rotational force from the front and rear side of the workpiece. This external application of force connects the microcracks produced by the laser radiation and thus enables a complete detachment of the solid body along the laser plane.

According to a further preferred embodiment of the present invention, the removal of material takes place starting from an exposed, in particular flat surface of the solid body, in particular parallel to the circumferential surface of the solid body, in the longitudinal direction of the solid body and spaced apart from the circumferential surface of the solid body at least in sections.

According to a further preferred embodiment of the present invention, the removal of material takes place in the form of a trench running continuously at least in sections, wherein the trench is spaced apart from the circumferential surface preferably by at least 30 µm or at least 100 µm or at least 500 µm or at least 1 mm and preferably extends parallel thereto.

According to a further preferred embodiment of the present invention, after detachment of the solid body layer, at least the solid body portion of the solid body formed between the trench and the circumferential surface, is removed at least in sections, in particular by the thickness of the previously detached solid body layer or solid body layers, in particular is ground, lapped, etched or polished. According to a further preferred embodiment of the present invention, the removal of material is brought about by means of laser ablation or water jet cutting or etching.

The present invention further relates to a method for producing a detachment region in a solid body for detachment of a solid body portion, in particular a solid body layer, from the solid body, wherein the solid body portion to be detached is preferably thinner than the solid body reduced by the solid body portion. Preferably the method according to the invention comprises at least the steps: providing a solid body, adjusting a flow behaviour of a gas, in particular air located between the solid body and the laser application device, in order to prevent accumulations of dust in the region of the laser radiation, and/or producing modifications inside the solid body by means of laser beams of a laser application device, wherein a detachment region or crack guiding region is predefined by the modifications along which a detachment of the solid body layer from the solid body takes place.

Furthermore, the present invention also relates to a method for detaching at least one solid body layer or solid body layer, in particular a solid body wafer, from a solid body or donor substrate. Preferably the method according to the invention comprises at least the steps: providing a solid body, adjusting a flow behaviour of a gas, in particular air located between the solid body and the laser application device, in particular in the region of the radiation course, in order to prevent accumulations of dust in the region of the laser radiation, producing modifications inside the solid body by means of laser beams of a laser application device, wherein a detachment region or crack guiding region is predefined by the modifications along which a detachment of the solid body layer from the solid body takes place.

Detaching the solid body layer from the solid body, wherein in particular the solid body is preferably weakened by the modifications in the crack guiding region in such a manner that the solid body layer is detached from the solid body as a result of the removal of material or after the removal of material such a number of modifications is produced that the solid body is weakened in the crack guiding region in such a manner that the solid body layer becomes detached from the solid body or a stress generating layer is produced or arranged on an in particular flat surface of the solid body aligned at an inclination to the circumferential surface and as a result of a thermal action on the solid body layer, mechanical stresses are generated in the solid body, wherein a crack for detaching a solid body layer is produced as a result of the mechanical stresses, which crack propagates along the modifications starting from the surface of the solid body exposed by the removal of material or the solid body is acted upon thermally, in particular cooled after the production of the modifications and as a result of the thermal action, the solid body layer is detached from the solid body along the crack guiding region.

According to a further preferred embodiment of the present invention, the adjustment of the flow behaviour is made by supplying a fluid, in particular ionized gas, in the region of the beam course between an objective and the solid body or the adjustment of the flow behaviour is made by producing a negative pressure, in particular a vacuum in the region of the beam course between an objective and the solid body.

The present invention further relates to a method for detaching at least one solid body layer or solid body layer, in particular a solid body wafer, from a solid body or donor substrate, at least comprising the steps: providing a solid body, wherein the solid body has at least one coating whose refractive index is different from the refractive index of the surface of the solid body on which the coating is arranged, or wherein a coating is produced on the solid body whose refractive index is different from the refractive index of the surface of the solid body on which the coating is arranged, producing modifications inside the solid body by means of laser beams of a laser application device, wherein a crack guiding region is predefined by the modifications along which a detachment of the solid body layer from the solid body is accomplished.

Detaching the solid body layer from the solid body, wherein the solid body is preferably weakened by the modifications in the crack guiding region in such a manner that the solid body layer is detached from the solid body as a result of the removal of material or after the removal of material such a number of modifications is produced that the solid body is weakened in the crack guiding region in such a manner that the solid body layer becomes detached from the solid body or a stress generating layer is produced or arranged on an in particular flat surface of the solid body aligned at an inclination to the circumferential surface and as a result of a thermal action on the stress generating layer, mechanical stresses are generated in the solid body, wherein a crack for detaching a solid body layer is produced as a result of the mechanical stresses, which crack propagates along the modifications starting from the surface of the solid body exposed by the removal of material or the solid body is acted upon thermally, in particular cooled after the production of the modifications and as a result of the thermal action, the solid body layer is detached from the solid body along the crack guiding region.

According to a further preferred embodiment of the present invention, the coating will be or is produced by means of spin coating, wherein the coating comprises nanoparticles, in particular of at least one material selected from the list at least consisting of silicon, silicon carbide, titanium oxide, glass, in particular quartz glass or $Al_2O_3$.

According to a further preferred embodiment of the present invention, a plurality of coatings are arranged or produced above one another, wherein the refractive indices differ from one another, preferably a first coating which is arranged or produced on the solid body has a larger refractive index than an additional coating which is produced on the first coating.

The coatings are therefore preferably selected and produced or arranged in such a manner that the refractive index of the respective layer becomes smaller or decreases with the distance of the respective layer from the solid body. Thus in the case of a coating: 1. solid body, 2. first coating, 3. second coating, 4. third coating, the refractive index of the solid body is preferably greater than the refractive index of the first coating and the refractive index of the first coating is preferably greater than the refractive index of the second coating and the refractive index of the second coating is preferably greater than the refractive index of the third coating. The steps between the refractive indices can run continuously or discontinuously here. Furthermore the different coatings can have different thicknesses. However, it is feasible here that two or three or more of the coatings have the same thickness. Preferably a coating has a thickness in the range between 50-400 nm in each case. This means that, for example, the first coating can have a thickness (or average thickness) of 100 nm. The thicknesses of the second coating and the third coating can thus be substantially the same or completely the same wherein at least one of the coatings and preferably both have a different thickness. Thus, the second coating can, for example, have a thickness (or average thickness) of 150 nm. Furthermore, the third coating can be thicker or thinner than the first coating and/or than the second coating and can for example have a thickness (or average thickness) of 75 nm, 110 nm or 300 nm.

The present invention further relates to a method for producing a detachment region in a solid body for detaching a solid body portion, in particular a solid body layer, from the solid body, wherein the solid body portion to be detached is preferably thinner than the solid body reduced by the solid body portion. Preferably the method according to the invention comprises at least the steps: providing a solid body, producing modifications inside the solid body by means of laser beams of a laser application device, wherein a crack guiding region is predefined by the modifications along which a detachment of the solid body layer from the solid body is accomplished, wherein the laser radiation is incident on the solid body at the Brewster angle or with a deviation in the range from −5° to +5° from the Brewster angle.

The present invention further relates to a method for detaching at least one solid body layer or solid body layer, in particular a solid body wafer, from a solid body or donor substrate. The method according to the invention in this case at least comprises the steps: providing a solid body, producing modifications inside the solid body by means of laser beams of a laser application device, wherein a crack guiding region is predefined by the modifications along which a detachment of the solid body layer from the solid body is accomplished, wherein the laser radiation is incident on the solid body at the Brewster angle or with a deviation in the range from −5° to +5° from the Brewster angle, detaching the solid body layer from the solid body. Preferably the detachment of the solid body layer from the solid body takes place along the crack guiding region, wherein the solid body is weakened in the crack guiding region as a result of the modifications in such a manner that the solid body layer is detached from the solid body as a result of the removal of material or after the removal of material such a number of modifications is produced that the solid body is weakened in the crack guiding region in such a manner that the solid body layer is detached from the solid body or a stress generating layer is produced or arranged on an in particular flat surface of the solid body aligned at an inclination to the circumferential surface and as a result of a thermal action on the stress generating layer, mechanical stresses are generated in the solid, wherein a crack for detaching a solid body layer is produced as a result of the mechanical stresses, which crack propagates along the modifications starting from the surface of the solid body exposed by the removal of material or the solid body is acted upon thermally, in particular cooled after the production of the modifications and as a result of the thermal action, the solid body layer is detached from the solid body along the crack guiding region.

The laser radiation here and preferably in all the embodiments described herein is preferably polarized radiation.

According to a further preferred embodiment of the present invention, a compensating device, in particular an optical element such as a diffractive optical element or a continuous wedge is provided to compensate for a spherical aberration in the laser application device resulting from the Brewster angle irradiation.

The present invention further relates to a method for detaching at least one solid body layer from a solid body, wherein due to modifications a crack guiding region is predefined for guiding a crack for detaching a solid body portion, in particular a solid body layer, from the solid body. Preferably the method comprises at least individual ones or several or all the steps mentioned hereinafter: moving the solid body relative to a laser application device, successively producing laser beams by means of the laser application device to produce respectively at least one modification, detaching the solid body layer from the solid body.

According to a further preferred embodiment of the present invention, the solid body is weakened in the crack guiding region as a result of the modifications in such a manner than the solid body layer is detached from the solid body as a result of the removal of material or after the removal of material such a number of modifications is produced that the solid body is weakened in the crack guiding region in such a manner that the solid body layer is detached from the solid body or a stress generating layer is produced or arranged on an in particular flat surface of the solid body aligned at an inclination to the circumferential surface and as a result of a thermal action on the stress generating layer, mechanical stresses are generated in the solid, wherein a crack for detaching a solid body layer is produced as a result of the mechanical stresses, which crack propagates along the modifications starting from the surface of the solid body exposed by the removal of material or the solid body is acted upon thermally, in particular cooled after the production of the modifications and as a result of the thermal action, the solid body layer is detached from the solid body along the crack guiding region.

According to a further preferred embodiment of the present invention, the laser application device is adjusted for the defined generation of modifications depending on at least one parameter, namely the transmission of the solid body at defined points and for a defined solid body depth and/or the modifications bring about a pressure rise in the solid body, wherein the solid body layer is detached from the solid body as a result of the pressure rise along the crack guiding region due to a crack propagation, wherein preferably at least one portion of the modifications as part of the solid body layer is detached from the solid body and wherein the solid body layer is preferably converted into a curved or domed form as a result of the modifications, wherein the further surface portion of the solid body layer resulting from the crack guiding region is therefore convexly shaped at least in sections and/or the solid body has at least one coating whose refractive index is different from the refractive index of the surface of the solid on which the coating is arranged or wherein a coating is produced on the solid, whose refractive index is different from the refractive index of the surface of the solid on which the coating is arranged and/or wherein the laser radiation is incident on the solid body at the Brewster angle or with a deviation in the range from −5° to +5° from the Brewster angle, additionally or alternatively it is feasible here that the method comprises one or more of the steps mentioned hereinafter: removing material of the solid body, in particular to produce a circumferential recess, wherein the material is removed in the longitudinal direction of the solid body, wherein the crack guiding region is exposed as a result of the removal of material and/or adjusting a flow behaviour of a gas, in particular air, located between the solid body and the laser application device, in particular in the region of the radiation course, to prevent accumulations of dust in the region of the laser radiation.

According to a further preferred embodiment of the present invention, the method according to the invention further comprises the step of producing a composite structure by arranging or producing layers and/or components on or above an initially exposed surface of the solid body, wherein the exposed surface is part of the solid body layer to be detached.

The modifications to form the detachment plane are particularly preferably produced before producing the composite structure.

Thus, according to the invention, the production of a laser modification layer in the solid body or substrate, which defines the subsequent thin plane or the detachment plane, takes place before the processing of the components. The further processes to construct or produce layers and/or to produce components (lithography etc.) then take place thereafter.

The layers and/or components which together with the solid body layer form the composite structures are preferably produced by means of lithograph, in particular coating with, for example, metal compounds, varnishing, optical exposure (e.g. scanning through a photomask), developing the photovarnish (in particular at low temperatures such as temperatures below 70° C., in particular below 50° C. or below 30° C. or below ambient temperature or below 20° C. or below 5° C. or below 0° C.), etching structures. In order to produce a circuit, in particular a finished circuit, individual one or several or all of these processes, in particular lithography processes can be repeated more than 10 times or up to 10 times or more than 20 times or up to 20 times or more than 40 times or up to 40 times or more than 80 times or up to 80 times.

The solid body remaining after detachment of the solid body layer preferably has a thickness which is greater than, in particular a multiple greater than the thickness of the detached solid body layer. The solid body material is preferably a semiconductor material or comprises a semiconductor material.

It is to be understood here that "on or above" a surface of the solid body layer to be detached can also be understood in such a manner that in the case of a high-temperature step preceding the laser treatment to produce the modifications, a coating of the surface produced by the high-temperature method can be accomplished, on which the further layer or further layers and/or components to produce the composite structure are arranged or produced. The composite structure is by definition only produced after the laser treatment, a multilayer arrangement possibly present before the laser treatment is not mentioned as composite structure in the course of this patent application but as multilayer arrangement.

Thinning means here the reduction in the thickness of the solid body which is preferably a wafer by the material portion which in customary methods of manufacture of solid bodies provided with components, in particular wafers, would be milled or polished away.

According to a further preferred embodiment of the present invention, before producing the detachment plane the solid body is treated using at least one high-temperature method, wherein the high-temperature method is executed with a temperature between 70° C. and the melting point or evaporation temperature of the material of the solid body.

Thus, the execution of the laser step on a partially processed wafer forms another possibility, according to the invention this is particularly preferably carried out after the high-temperature steps but before the remaining processes. This solution is advantageous since all the structures which can damaged by the laser method are not yet formed.

In this case, parameters of the laser method can be optimized in such a manner that the stress in the solid body is minimized as far as possible, e.g. by gentle multiple action on the solid body, through greater line spacings and decreasing energies for each traverse.

The laser process is preferably carried out depending on the crystallographic orientation of the substrate, i.e. the laser modification is particularly preferably guided as far as possible so that microcracks formed in the course of the treatment neither impede the lithography nor run out supercritically from the modification plane and can result in loss of substrate after the initiation of the detachment crack. In this case, for example in SiC first lines can be guided parallel to the flat and parallel to the preferred crack direction in order to define a crack plane before in a second step lines in the 90° direction thereto finally initiate the cracks and define the dividing plane.

It is most advantageous to carry out the high-temperature steps before producing the detachment plane since a significant increase in temperature above 70° C. is associated with an increased mobility of doping atoms, atoms of metallic contaminants and dislocations or other crystal structure defects. If the detachment plane were now to have been produced or partially produced before the high-temperature step, microcracks produced as a result can for example extend or grow further into the solid body layer to be separated, with the result that more material must be removed and therefore greater losses would occur.

According to a further preferred embodiment of the present invention, the at least one high-temperature method is an epitaxy method, a doping method or a method using plasma. High-temperature methods are understood as all methods, in particular material-depositing methods which are carried out at a temperature above 70° C. The resulting temperature is preferably less than 2000° C. or less than the melting or evaporation temperature of the solid body material. Preferably a multilayer arrangement of solid body material and the one or at least one produced or arranged layer is produced by the high-temperature method.

According to a further preferred embodiment of the present invention, at least one layer is produced on the solid body by the high-temperature method, wherein the at least one generated layer has predefined parameters, wherein at least one predefined parameter specifies a maximum degree of refraction and/or absorption and/or reflection and/or charge carrier generation by the photoeffect of laser light waves, wherein the degree of refraction and/or absorption and/or reflection and/or charge carrier generation by the photoeffect is less than 5% and preferably less than 1% and particularly preferably less than 0.1%. This embodiment is advantageous since interactions of all metal elements of the circuit with laser light are prevented. As a result of interactions between a metal layer or metal components and laser light or laser radiation, the metal layer and/or the components, in particular electrical line connections can be damaged.

Furthermore, this embodiment solves the further problem that during introduction of the laser plane when metal structures or components (e.g. greater than 20 nm longitudinal extension or extension in the laser penetration direction) are arranged or produced on the substrate, wherein the laser process is disturbed either by back reflections at the structures or by the substrates themselves since, for example, the transmission is not ideal. Since a multiphoton process is preferably used to produce the material modifications, the focus in the material must preferably be very precise, in particular ideal, in order to enable the required high intensities with at the same time as far as possible undisturbed wavefronts. This advantage therefore also favours a laser treatment before the processing or production of the final structures, in particular layers and/or components.

According to a further preferred embodiment of the present invention, the modifications are preferably produced by means of a multiphoton excitation, in particular a two-photon excitation or a multiphoton excitation (with more than two photons).

Preferably initially at least a plurality of base modifications are produced on an in particular curved line, running homogeneously at least in sections, in particular in the homogeneously running section. These base modifications are preferably produced with or depending on predefined process parameters. The predefined process parameters preferably comprise at least the pulse duration, pulse energy, pulse spacing within a line, spacing of the lines with respect to one another, depth and/or numerical aperture. Preferably at least one value of these process parameters and preferably several values or all the values of these process parameters or more than two values of these process parameters is specified depending on the crystal lattice stability of the solid body. The value is particularly preferably selected so that the crystal lattice remains intact around the respective base modifications, i.e. preferably wherein further trigger modifications are produced to trigger subcritical cracks, enters by less than 20 μm or less than 10 μm or less than 5 μm or less than 1 μm.

According to a further preferred embodiment of the present invention, trigger modifications are produced for initiating subcritical cracks, wherein at least one process parameter for generating trigger modifications is different from at least one process parameter for generating base modifications, preferably a plurality of process parameters are different from one another. Additionally or alternatively, the trigger modifications can be produced in a direction which is inclined to or spaced apart from the course direction of the line along which the base modifications are generated, wherein the subcritical cracks preferably propagate less than 5 mm, in particular less than 4 mm or less than 3 mm or less than 2 mm or less than 1 mm or less than 0.5 mm. An inclined alignment can here correspond, for example to an angle between 5° and 90°, preferably an angle between 85° and 90° and particularly preferably an angle of 90°.

This is a threshold process which is triggered when a critical intensity (i.e. power/area) is exceeded. That is, short pulses require less energy/pulse, higher numerical aperture concentrates the energy onto a smaller point, therefore requires lower energy to reach the threshold intensity.

A greater depth usually means absorption losses which is why the energy must be adapted again. Example SiC: NA=0.4, 180 μm depth, 3 ns pulse length, pulse energy about 7 μJ, at 350 μm depth rather 9 μJ.

In general, harder materials are required (sapphire, aluminium oxide ceramic, SiC, GaN), greater pulse overlap in the lines, i.e. smaller pulse spacings (<=1 μm), in return the line spacings tend to be selected to be greater (e.g. >5 μm) whereas softer materials such as GaAs and Si tend to require larger pulse spacings (>1 μm) and smaller line spacings (<5 μm).

Example sample SiC—with fs pulses: pulse energy around 800 nJ, pulse spacing 50 nm and larger up to 200 nm, line pattern as follows: 30 lines with 1 μm spacing, then 20 μm gap, then another 30 lines, then 96 μm gap and then from the front, crossed by 30 lines, 20 μm gap and 30 line (still with 1 μm spacing between the lines), then 300 μm gap and then another 30/20/30 line block. depth 180 μm, degree of doping of SiC (characterized by surface resistance >21 mOhm cm), pulse length 400 fs, numerical aperture 0.65.

According to a preferred embodiment, the solid body material is silicon, wherein the numerical aperture lies between 0.5 and 0.8, in particular 0.65, the irradiation depth is between 200 μm and 400 μm, in particular 300 μm, the pulse spacing is between 1 μm and 5 μm, in particular 2 μm, the line spacing is between 1 μm and 5 μm, in particular 2 μm, the pulse duration is between 50 ns and 400 ns, in particular 300 ns and the pulse energy is between 5 μJ and 15 μJ, in particular 10 μJ.

According to a preferred embodiment, the solid body material is SiC, wherein the numerical aperture lies between 0.5 and 0.8, in particular 0.4, the irradiation depth is between 100 μm and 300 μm, in particular 180 μm, the pulse spacing is between 0.1 μm and 3 μm, in particular 1 μm, the line spacing is between 20 μm and 100 μm, in particular 75 μm, the pulse duration is between 1 ns and 10 ns, in particular 3 ns and the pulse energy is between 3 μJ and 15 μJ, in particular 7 μJ.

Example sample aluminium oxide ceramic: pulse spacing 500 nm, line spacing 10 μm, pulse duration 3 ns, pulse energy 22 μJ, NA=0.4.

Example sample sapphire: lines written three times at 0°, 45°, 90° to the flat, in each case with 1.5 μm line spacing, pulse spacing 300 nm, pulse energy in first pass 350 nJ, in second pass 300 nJ and in third pass 250 nJ with an NA of 0.65 and a pulse duration of 250 fs.

In general, the surface roughness decreases with shorter pulses, better surfaces can be produced with femtosecond pulses (roughnesses below 3 μm) than with nanosecond pulses (tends to be over 3 μm), in return the process is expensive and lasts longer. Picosecond pulses form a middle route. The advantage of shorter pulses is that the phase conversion takes place athermally, i.e., coupling is accomplished between laser pulse and crystal lattice, so that fewer vibrations (phonons) are excited—the process therefore takes place colder overall. In return, larger regions must be amorphized (phase conversion) so that the critical stress is built up which initiates the cracks.

According to a further preferred embodiment of the present invention, the subcritical cracks propagate between 5 μm and 200 μm, in particular between 10 μm and 100 μm or between 10 μm and 50 μm or between 10 μm and 30 μm or between 20 μm and 100 μm or between 20 μm and 50 μm or between 20 μm and 30 μm in the solid. This embodiment is advantageous since a smaller crack propagation requires less expenditure on reworking. The subcritical cracks propagate along the crystal lattice boundaries but since the crystal lattice of the solid body is inclined with respect to the detachment plane, in particular at an angle between 2° and 6°, a surface having a sawtooth-shaped profile is the result. The wider the cracks propagate, the larger is the distance between the valleys and peaks of this sawtooth-shaped surface, with the result that more material must be removed if a surface roughness of less than 80 nm or less than 50 nm or between 20 nm and 50 nm is to be produced.

According to a further preferred embodiment of the present invention, the crack propagation of the subcritical cracks therefore proceeds with respect to the direction of incidence of the laser beams in a direction inclined differing from an angle of 90°, in particular the crack propagation direction is preferably inclined between 93° and 95°, in particular precisely 94° with respect to the emission direction.

According to a further preferred embodiment of the present invention, the sections tear between the regions of several lines in which the subcritical cracks have propagated, as a result of the stresses or the introduction of the external force, which are produced for example due to the glass transition or the ultrasound treatment. This embodiment is advantageous since as a result of the previously caused preliminary damage inside the solid body, in particular as a result of the subcritical cracks, the required stresses can be significantly lower. Further the crack is guided very precisely.

According to a further preferred embodiment of the present invention, the receiving layer is arranged or produced on a surface of the solid body which lies opposite the surface of the solid body on which the layers and/or components are arranged to form the composite structure.

Preferably the modifications are each produced using laser pulses which are shorter than 3 ns, in particular shorter than 2 ns or 1 ns. Particularly preferably the time duration of the individual laser pulses lies between 50 ps and 1500 ps or between 50 ps and 1200 ps or between 50 ps and 1000 ps, in particular between 50 ps and 900 ps or between 50 ps and 700 ps or between 50 ps and 500 ps or between 50 ps and 300 ps or between 300 ps and 900 ps or between 500 ps and 900 ps or between 700 ps and 900 ps or between 300 ps and 500 ps or between 500 ps and 700 ps or between 300 ps and 700 ps or shorter than 900 ps or shorter than 700 ps or shorter than 500 ps or shorter than 300 ps or shorter than 100 ps or shorter than 50 ps.

The use of the words "substantially" preferably defines in all cases in which these words are used in the framework of the present invention a deviation in the range of 1%-30%, in particular of 1%-20%, in particular of 1%-10%, in particular of 1%-5%, in particular of 1%-2%, from the specification which would be given without using these words. Individual or all representations of the figures described hereinafter should preferably be seen as design drawings, i.e. the dimensions, proportions, functional relationship and/or arrangements obtained from the figure or figures preferably correspond precisely or preferably substantially to those of the apparatus according to the invention or the product according to the invention. Further advantages, aims and properties of the present invention are explained with reference to the following description of the appended drawings in which apparatuses according to the invention are shown as an example. Elements of the apparatus and methods according to the invention which agree at least substantially with regard to their function can be characterized in the figures with the same reference numbers, wherein these components or elements need not be numbered or explained in all the figures. The invention is described in detail hereinafter purely as an example with reference to the appended figures.

BRIEF DESCRIPTION OF THE DRAWINGS

In the figures as an example:

FIG. 1 shows schematically the compensation for material properties by adaptation of the laser action depending on local property differences of the material;

FIG. 19a shows schematically the progress of the cold split method;

FIG. 19b shows schematically the progress of the laser assisted spalling method;

FIG. 19c shows a photograph of an exposed surface of a solid body layer according to the method 19a;

FIG. 19d shows a photograph of an exposed surface of a solid body layer according to the method 19b;

FIGS. 20a-f SEM photographs of surfaces;

FIG. 26a shows a feed forward process according to the invention and

FIG. 26b shows a feedback process according to the invention.

DETAILED DESCRIPTION

Figure 2B:
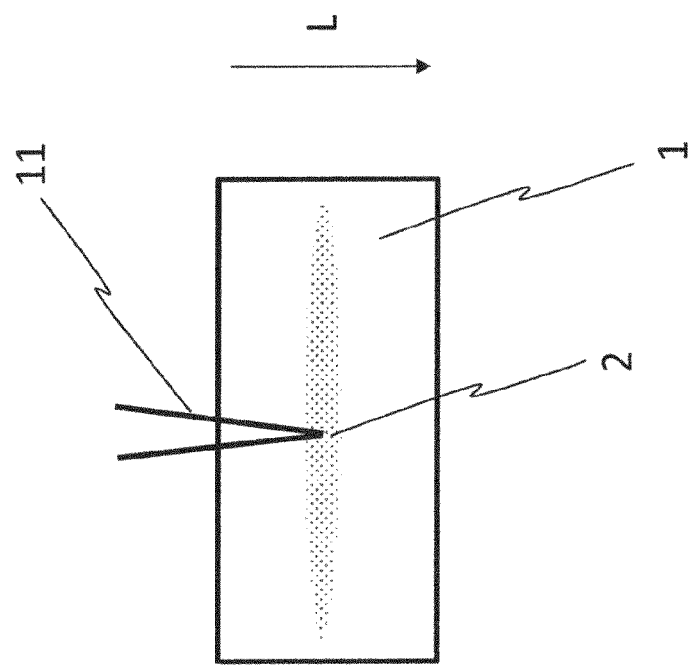
FIG. 2b shows schematically the production of a modification, which has a significantly stronger extension in the longitudinal direction of the solid body compared with the modification from FIG. 2a and after splitting of the solid body layer has the result that the solid body layer curves or bends.

FIG. 1 shows schematically a structure for executing a method for detaching at least one solid body layer 14 from a solid body 1. Due to the modifications 2 a crack-guiding region 4 for guiding a crack for detaching a solid body portion 14, in particular a solid body layer, from the solid body 1 is predefined. Since the laser beams 10, 11 are shown at various locations of the solid body 1, it is apparent that the solid body 1 is moved relative to a laser application device 8. The laser beams 10 and 11 shows thus represent situations at different times. In principle, the laser beams 10 are produced by means of the laser application device 8 to produce respectively at least one modification 2, wherein the laser application device 8 is adjusted for the defined production of modifications depending on at least one parameter, namely the transmission of the solid body 1 at defined locations and for a defined solid body depth. In the diagram according to FIG. 1 the laser beams 10, 11 thus represent laser beams having different properties or having at least one different property. The property changed from laser beam 10 to laser beam 11 takes account of the changed material properties in the respective affected region of the solid body 1. In the case shown for example, the laser beam 11 acts on a region of the solid body 1, which has a changed transmission, which for example can result from a doping spot.

Preferably after the modifications 2 have been produced the solid body layer 14 is detached from the solid body 1 according to the diagram in FIG. 19b.

Figure 2A:
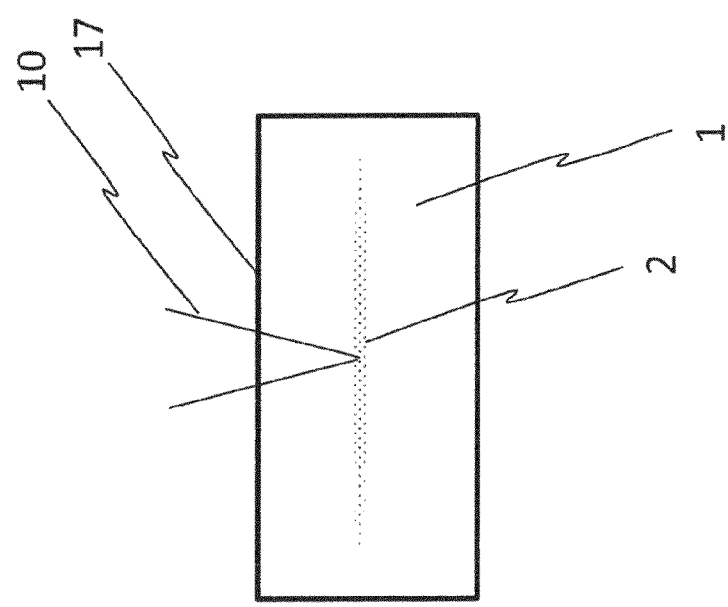
FIG. 2a shows schematically the production of a modification, which is sufficient to guide a crack.

FIG. 2a shows a situation in which modifications 2 having a first extension are produced in the longitudinal direction L of the solid body 1. The longitudinal extension L here preferably extends orthogonally or substantially orthogonally to the irradiated surface 17 of the solid body, wherein the irradiated surface 17 of the solid body 1 is part of the solid body layer 14 after detachment of the solid body layer 14. This particularly preferably relates to all the embodiments described in this step. The modifications 2 produced according to FIG. 2a are sufficient for guiding a crack for detaching the solid body layer 14.

FIG. 2b shows a modification according to which the modifications 2 produced have a greater extension in the longitudinal direction L compared with FIG. 2a. Additionally or alternatively, a plurality of, in particular two or three or more than two or three layers of modifications 2 can be produced at least in sections.

This is advantageous since as a result of a larger than necessary extension of the laser layer in the beam direction (depth or solid body length) the stress produced by the laser layer in the unmodified material can be increased. Thus, preferably more material can make a phase transformation or be amorphized or modified in another way than is necessary for the polymer split (cf. FIG. 19b). This increased stress serves to promote the spontaneous splitting of the material (without polymer). The laser parameters or laser beam parameters or parameters with which the laser application device is configured—for the spontaneous splitting and the polymer process—can differ appreciably as a result.

A greater extension of the laser layer here results in a higher pressure in the solid body with the result that the spontaneous splitting probability is increased. Furthermore, this embodiment is advantageous since a solid body layer 14 can be produced as a bent or curved solid body layer 14. Thus, this method can preferably also be used for producing at least one solid body layer 14 which is curved or bent at least in sections. In order to produce a curved or bent solid body layer (or bent or curved wafer), the method here preferably comprises at least the steps: moving the solid body 1 relative to the laser application device 8, successively producing laser beams 10 by means of the laser application device 8 in order to produce respectively at least one modification 2 inside the solid body, wherein as a result of the modifications 2 a crack guiding region 4 is provided for guiding a crack in order to detach a solid body portion 14, in particular a solid body layer, from the solid body 1, wherein the modifications bring about a pressure rise in the solid body 1, wherein the solid body layer 14 is detached from the solid body 1 due to the propagation of a crack as a result of the pressure rise along the crack guiding region 4, wherein at least a portion of the modifications 2 as part of the solid body layer 14 is separated from the solid body 1, wherein the solid body layer 14 is converted into a curved or domed shape as a result of the modifications 2, wherein the further surface portion of the solid body layer 14 resulting from the crack guiding region 4 is therefore convexly shaped at least in sections.

Figure 3:
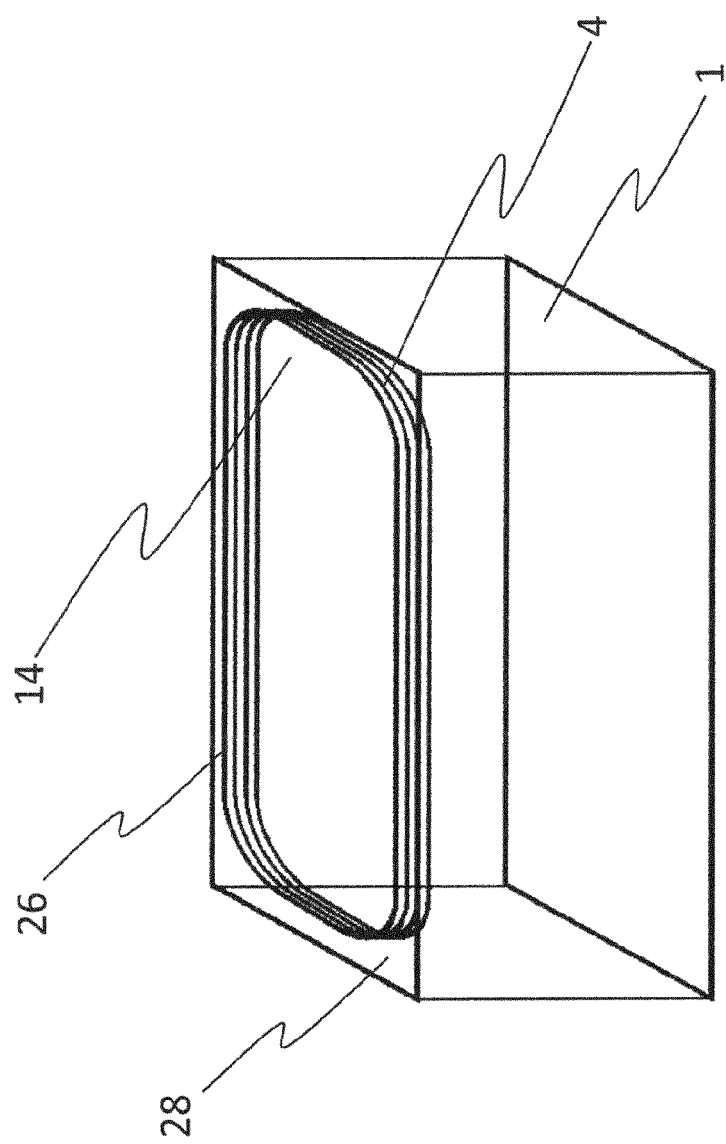
FIG. 3 shows schematically the production of a trench in a solid body wherein the trench is preferably spaced apart from the outer circumferential surface of the solid body.

FIG. 3 shows an arrangement according to which preferably after a crack guiding region 4 has been produced in the solid body 1, a trench 26 is produced at least in sections and preferably circumferentially starting from the irradiated surface 17 in the longitudinal direction L of the solid body 1. After producing the trench 26, the solid body layer 14 can be detached from the solid body by producing further modifications 2 by means of laser beams 10, which are preferably also introduced via the irradiated surface 17. Alternatively a stress generating layer 18 is preferably arranged or produced on the region enclosed or surrounded or delimited by the trench 26, in particular on the surface of the subsequent solid body layer 14.

The stress generating layer preferably consists of a polymer material, in particular PDMS and in a further step is acted upon thermally, in particular cooled, in particular below its glass transition temperature at least in sections and particularly preferably completely. This preferably relates to all the embodiments described herein in which a stress generating layer is used or deployed.

As a result of the stress generation, a crack detaches the solid body layer 14 from the remaining solid body 1.

Preferably a surface treatment of the solid body 1 takes place in a further step. Preferably the frame 28 obtained between the trench 26 and the circumferential surface and/or the surface of the solid body 1 exposed by the detachment of the solid body layer 14 is smoothed, in particular ground, lapped, polished or etched.

Preferably the frame 28 and the exposed surface are treated in such a manner, in particular by cutting treatment that the surfaces lie in the same plane.

Thus, a method for detaching at least one solid body layer, in particular a solid body wafer 14 from a solid body or donor substrate 1 is provided, which preferably comprises at least the steps mentioned hereinafter: providing a solid body 1, producing modifications 2 inside the solid body 1 by means of laser beams 10, wherein as a result of the modifications 2 a detachment region or crack guiding region 4 is predefined along which the solid body layer 14 is detached from the solid body 1, removing material of the solid body 1, in particular to produce a circumferential recess 12, wherein the removal of material takes place in the longitudinal direction of the solid body, wherein the detachment region is exposed as a result of the removal of material, and detaching the solid body layer 14 from the solid body.

This is advantageous since a laser treatment as far as the edge is problematical and therefore the solid body layer 14 produced also has very homogeneous properties in its edge zone. The basic concept presented here thus preferably comprises a laser ablation/grinding/removal of material from above to produce a notch or a trench, with the result that the previously produced laser layer is opened or exposed. Finally the solid body layer 14 or the target wafer is removed with the stress generating layer 18. The remaining edge or frame 28 can then be ground away again during a further surface preparation. Thus, the laser layer can be exposed and edge effects avoided during the polymer splitting by ablation from above, in particular be water jet cutting or laser ablation.

Figure 4B:
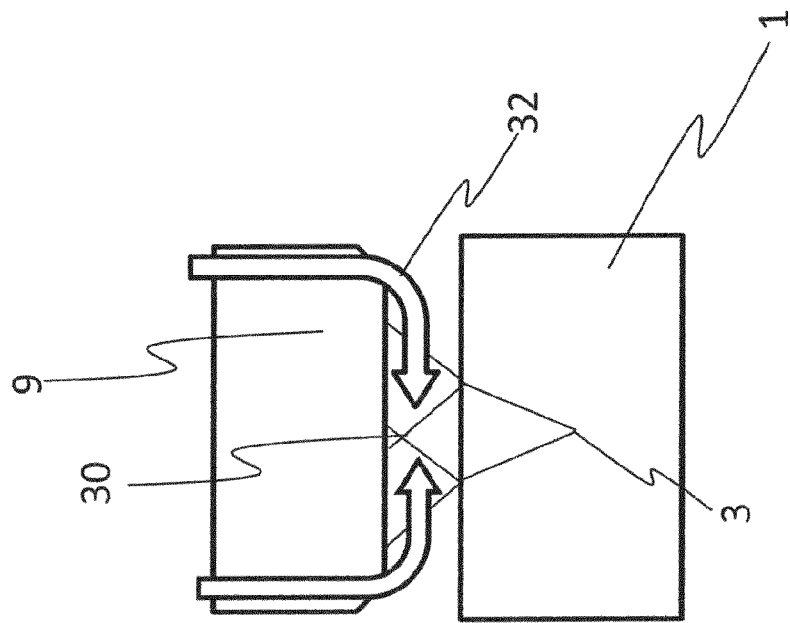
FIG. 4b shows schematically an arrangement in which a flushing, in particular by means of gas such as for example ionized gas is provided, which removes particles from the point of intersection of the reflected beams.
Figure 4A:
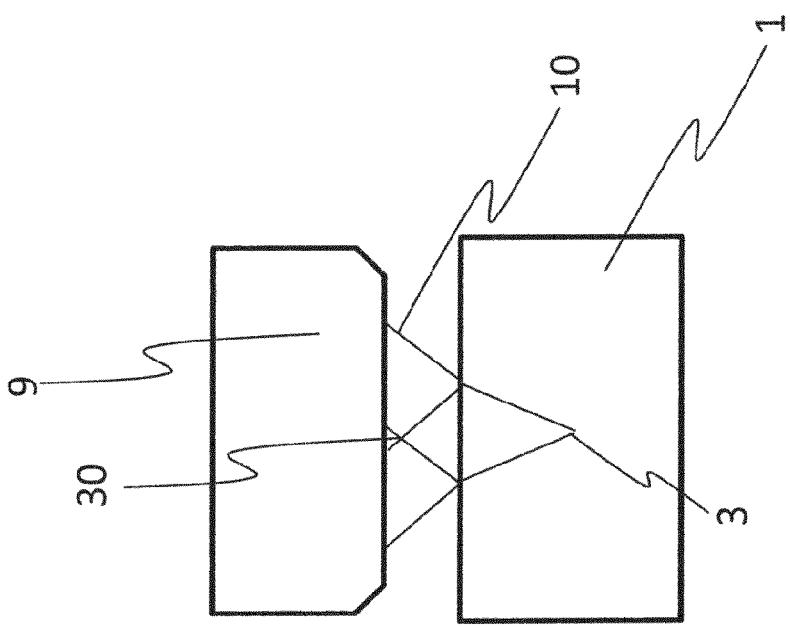
FIG. 4a shows schematically an arrangement in which particles such as, for example, dust collect in the course of the laser radiation, in particular at the point of intersection of the reflected beams.

FIG. 4a shows an arrangement in which particles such as, for example, dust collect at the point of intersection of the reflected radiation characterized by the reference number 30 and thus negatively influence the production of modifications.

FIG. 4b shows an arrangement in which a flushing device 32 or flushing is provided. Thus, a fluid, in particular a gas and preferably an ionized gas is thus fed to the intersection point 30 in order to flush away particles collecting at the intersection point 30 by means of the fluid flow.

Thus, a method for detaching at least one solid body layer, in particular a solid body wafer 14 from a solid body or donor substrate 2 is provided which preferably comprises at least the steps mentioned hereinafter: providing a solid body 1, adjusting a flow behaviour of a gas, in particular air located between the solid body and the laser application device 8, in particular in the region of the radiation course, in order to prevent accumulations of dust in the region of the laser radiation, producing modifications 2 inside the solid body 1 by means of laser beams 10 of a laser application device 8, wherein a detachment region or crack guiding region is predefined by the modifications 2 along which a detachment of the solid body layer 14 from the solid body 1 takes place and detaching the solid body layer 14 from the solid body 1. This solution is advantageous since high laser intensities statically charge dust and this dust can be flushed out by the flushing, in particular with ionized gas, from the region between the objective and the workpiece. The gas flushing thus drives the dust out from the intermediate space between the objective 9 of the laser application device 8 and the workpiece or solid body 1. Additionally or alternatively the fluid flow, in particular the gas flow can be guided through the objective to produce a cooling effect towards absorbed power. Thus, the objective is preferably configured to guide a fluid, in particular the flushing fluid.

Furthermore or addition, a compensation of spherical aberrations at the objective can be accomplished. This changes the focus on the surface (incorporation of the material which has been passed through with a different refractive index), with the result that the focus in air deteriorates and thus has a lower intensity which in turn results in a lower particle suction effect or dust suction effect. Additionally or alternatively reduced reflection at the surface can be brought about. This can be brought about, for example by application of specific layers or coatings, in particular by spin coating, and/or by Brewster irradiation with polarized light.

Figure 5:
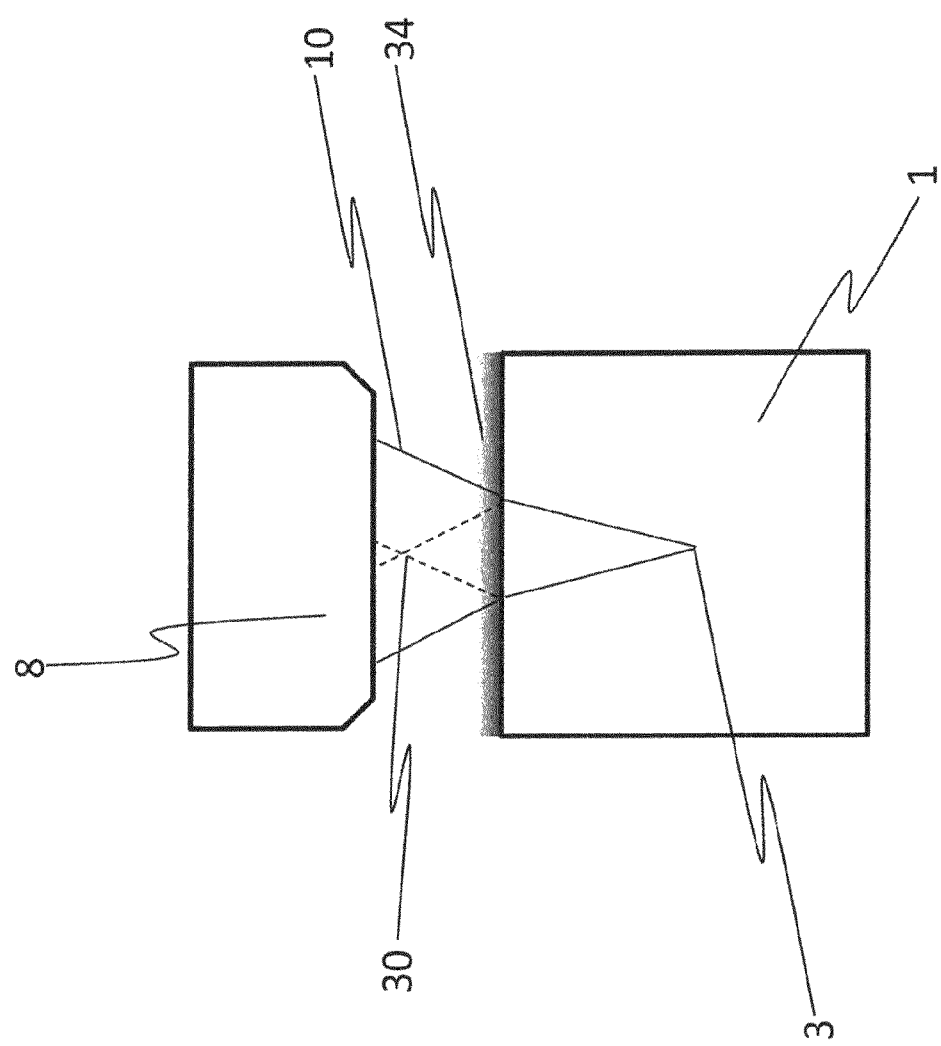
FIG. 5 shows schematically an arrangement according to which one or more coatings are arranged on the solid body, wherein the coating/s preferably has or have at least one different optical property from the solid body.

FIG. 5 shows a schematic arrangement according to which the solid body 1 is provided with at least one coating 34. The coating 34 here can be single- or multilayer. Preferably the coating has a refractive index difference from the refractive index of the material of the solid body 1, in particular the refractive index of the material of the solid body 1 is preferably higher than that of the coating 34. It is also feasible that the coating 34 is constructed of several layers, wherein preferably two of the several layers have a refractive index difference. Preferably here the refractive index of the respective layer, which is arranged closest to the solid body is greater than the refractive index of a layer which is spaced further apart from the solid body 1.

This schematic structure therefore makes it possible to provide a method according to the invention for detaching at least one solid body layer, in particular a solid body wafer 14 from a solid body or donor substrate 1. Preferably this method here comprises at least the steps mentioned hereinafter: providing a solid body 1, wherein the solid body 1 has at least one coating 34 whose refractive index is different from the refractive index of the surface of the solid body 1 on which the coating 34 is arranged, or wherein a coating 34 is produced on the solid body 1 whose refractive index is different from the refractive index of the surface of the solid body 1 on which the coating 34 is arranged, producing modifications 2 inside the solid body 1 by means of laser beams 10 of a laser application device 8, wherein a crack guiding region 4 (cf. similarly FIG. 1) is predefined by the modifications 2 along which a detachment of the solid body layer 14 from the solid body 1 is accomplished.

The coating can be accomplished, for example, by means of spin coating. Thus, for example a solvent, mixed nanoparticles of materials having a high refractive index applies one or more thin (sub-wavelength) layers having a somewhat higher refractive index to the solid body 1 or the workpiece 1—this results in an intermediate surface having reduced refractive index difference, lower reflection at the surface, lower contamination, more power in the material for more efficient material processing. Spin coating is advantageous since it is fast and favourable, cheap and fast, possible nanoparticles along with others or in addition to others are, for example silicon ($n=3.55$), silicon carb ide ($n=2.6$), titanium oxide ($n=1.8$), glass ($n=1.5$), $Al_2O_3$ ($n=1.72$). In the case of several layers with gradually increasing refractive index, a multilayer process is feasible for even more efficient refractive index matching and antireflection effect. Purely as an example, a layer arrangement could then be produced which consists of the layers mentioned hereinafter: 1st layer: Si, 2nd layer: SiC, 3rd layer: $TiO_2$, each layer preferably 50-400 nanometres thick. This method is furthermore advantageous since by means of spin coating of such layers, extremely small roughnesses on the material surface can also be compensated (better material coupling-in), by less scattering at the interface, better wavefront overlapping at the focus in the depth and therefore a lower laser power is required, this results in more effective processing since a higher multiphoton transition probability is obtained. The spin coating layer or the production of a coating 34 can be applied in the course of the step for surface conditioning and re-preparation of the surface on the ingot or solid body 1 after splitting or detachment of the solid body layer 14. Therefore firstly a grinding/lapping/etching or polishing step can be accomplished and then or combined with one of the preceding steps, the spin coating step or the coating step which applies the thin layer or coating 34.

Figures 6A, 6B:
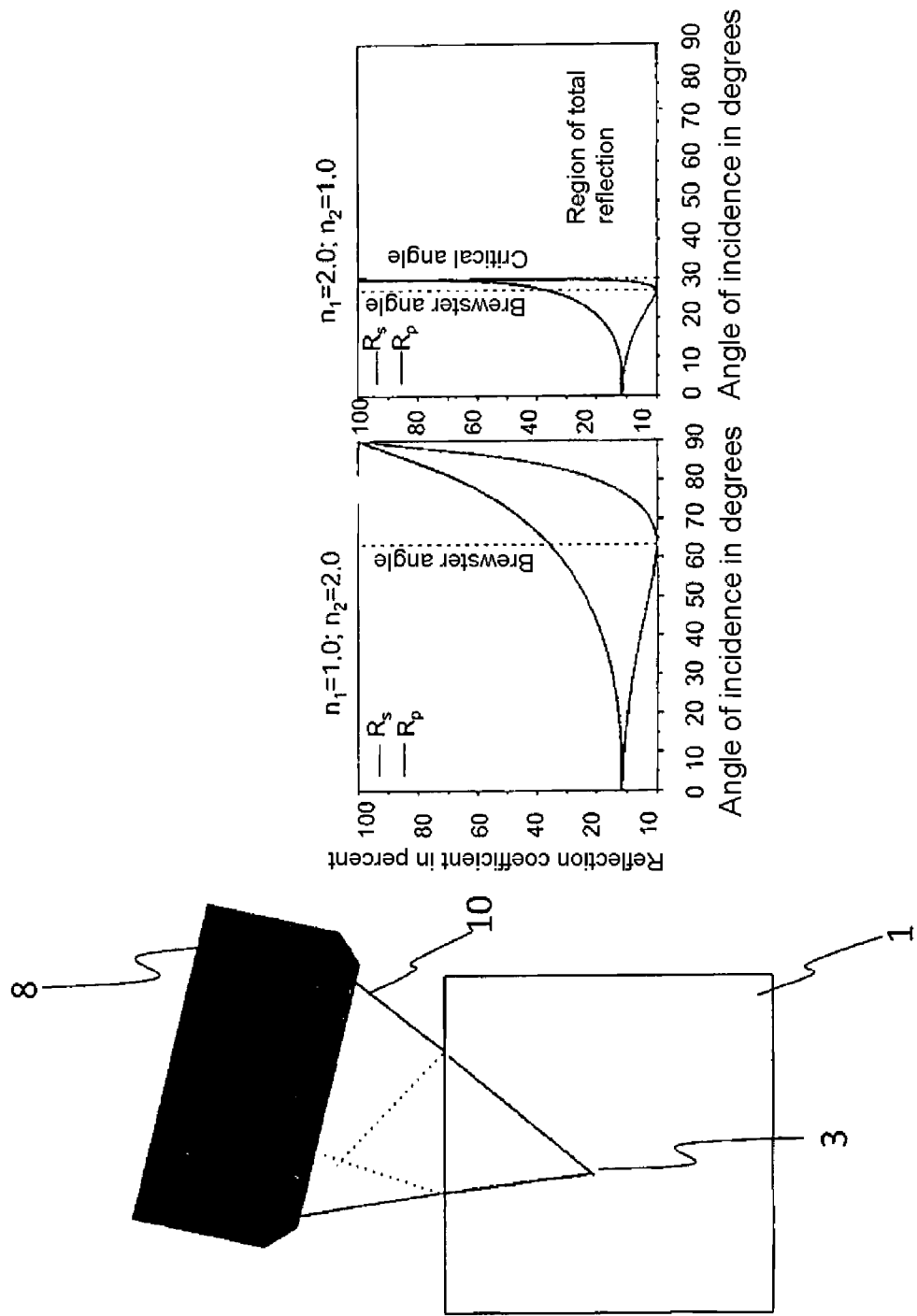
FIG. 6a shows schematically the emission of laser beams at the Brewster angle.
FIG. 6b shows profiles to illustrate the relationship between angle of incidence and reflection.

FIG. 6 shows schematically an arrangement for coupling-in laser beams 10, wherein the reflection is reduced in this arrangement. Preferably the laser beams 10 are coupled in at the Brewster angle. The Brewster angle is an angle of incidence for light of a specific polarization (the E vector points into the material not along the surface) at which no reflection occurs. The requirements for this are that the light is incident at an angle depending on the refractive index difference between air and the material. Furthermore, the light must be polarized (usually given in the case of laser light, requires single-mode lasers and no photonic crystal fibres). Coupling-in at the Brewster angle is therefore used to minimize back reflections. If irradiation takes place at the Brewster angle, the 30% surface reflection can be used almost completely for material processing in the depth of the material.

Irradiation at the Brewster angle is complex since the different beam components cover paths of different lengths in the highly refracting medium. The focus must be adapted accordingly by higher energy and/or by beam shaping. The beam shaping is preferably accomplished here, for example via one or more diffractive optical element/s (DOE) which compensate for this difference depending on the laser beam profile. The Brewster angle is relatively large, which in the case of high numerical aperture imposes requirements on the optics and their dimensions as well as working distance. Nevertheless this solution is advantageous since reduced reflections at the surface contribute to reduced surface damage since the light intensity is better coupled into the material. In the sense of this invention, laser beams 10 can also be emitted in all the other embodiments disclosed in this document at the Brewster angle or substantially at the Brewster angle. For coupling-in at the Brewster angle reference is herewith made to the document "Optical Properties of Spin-Coated TiO2 Antireflection Films on Textured Single-Crystalline Silicon Substrates" (Hindawi Publishing Corporation International Journal of Photoenergy, Volume 2015, Article ID 147836, 8 pages, http://dx.doi.org/10.1155/2015/147836). This document is made the subject of the present patent application in its full scope by reference. The aforementioned and included document discloses in particular calculations for the optimal angle of incidence for different materials and therefore refractive indices. The energy of the laser or the laser application device 8 is adapted not so much depending on the material but rather on the possible transmission at a specific angle. If therefore the optimal transmission is, for example, 93%, these losses must then be taken into account compared to experiments with perpendicular irradiation and losses of then, for example 17%, and the laser power adapted accordingly.

An example: 83% transmission perpendicular compared to 93% at an angle means that in order to achieve the same energy in the depth, only 89% of the laser power used for perpendicular irradiation is required (0.83/0.93=0.89). In the sense of the invention, the portion of the oblique irradiation therefore preferably serves to lose less light due to surface reflection and bring more into the depth. A possible subsequent problem which can occur as a result in certain arrangements is that the focus can acquire a "skew" profile in the depth and thus the intensities achieved—the key quantity for multiphoton processing—are again lower, possibly even lower than in the case of perpendicular irradiation, where all the beam components cover the same optical path in the material. This can then preferably be accomplished by a diffractive optical element or by several diffractive elements or a continuous wedge or several continuous wedges—and/or other optical elements—in the beam path, which compensate for these additional paths and/or the influence on the individual beams—in particular different spherical aberrations over the beam profile. These DOEs can be calculated numerically using suitable software solutions (e.g. Virtuallab from Lighttrans, Jena) and then fabricated or prepared.

The present invention thus provides a method for detaching at least one solid body layer, in particular a solid body wafer 14 from a solid body or donor substrate 1. The method according to the invention here preferably comprises at least the steps: providing a solid body 1, producing modifications 2 inside the solid body 1 by means of laser beams 10 of a laser application device 8, wherein a crack guiding region is predefined by the modifications 2 along which a detachment of the solid body layer 14 from the solid body 1 is accomplished, wherein the laser radiation is incident on the solid body 1 at the Brewster angle or with a deviation in the range from −10° to +10° from the Brewster angle. The method further comprises the step of detaching the solid body layer 14 from the solid body 1.

It was thus identified in the course of the present invention that a high refractive index difference between air/material means power losses of up to 30% with perpendicular irradiation. In the case of a 100 W laser, therefore 30 W is not available for the material processing or has other effects. Thus, it was further identified, for example, that contaminants can be formed on the optics, such as for example in the case of so-called "optical pincers". In this case, extremely small particles both in air and in liquids always migrate to the focus of the laser beam (highest intensity)—reflected power at the surface has the focus in the air or near the optics, the dust is driven/drawn to the optics. It was further identified that at the same time at 100 MW laser power and 97% transmission at the objective, significant heat (3 W) can enter into the objective, which must be removed/compensated to avoid thermal damage/modifications to the process. It was further identified that high powers bring with it the risk of surface damage. This is because the absorption of material can be increased due to surface states on the surface, extremely small dust particles can therefore only burn in the laser beam 10 and then form absorption nuclei which can then result in further damage due to absorption. It was further identified that high powers are distributed to several foci in the focal plane with diffractive optical elements (DOEs). DOEs show interference effects even before the focal plane, and it was identified that interference on the surface before the focal plane can produce local interference maxima which can result in damage to the surface and can result in a reduced transmissivity for laser radiation for processing in the depth. Furthermore, it was identified that some materials (for example: SiC) have local refractive index and other material property differences (e.g. absorption, transmission, scattering) e.g. due to the material doping (frequent occurrence: doping spot). It was further identified that depending on the surface roughness of the material on the laser coupling-in surface, the wavefront of the laser can be significantly impaired in the depth of the material so that the focus has reduced intensity (lower multiphoton transition probability) which in turn would involve higher intensities with the aforesaid problems.

Individual, several or all of these problems can be treated by individual ones or combinations of the methods disclosed here. Thus, the present invention can preferably be understood as a method for detaching at least one solid body layer from a solid body, wherein in this method by means of the modifications 2 a crack guiding region 4 is preferably provided for guiding a crack in order to detach a solid body portion 6, in particular a solid body layer, from the solid body 1. The method according to the invention preferably comprises at least the steps: moving the solid body 1 relative to a laser application device 8, successively producing laser beams 10 by means of the laser application device 8 in order to produce respectively at least one modification 2, detaching the solid body layer from the solid body.

According to the invention, a spalling process is thus described which in particular scales favourably for large-area semiconductor substrates having a diameter up to 300 mm or more than 300 mm. In order to eliminate the Wallner line pattern, a laser conditioning process is used, in particular with a high numerical aperture, with photon energies preferably below the material band gap energy. This process results in multiphoton interactions in the material and after the spalling process delivers a surface roughness of preferably Ra <1 µm.

Preferably individual one or several of the aforesaid solutions according to the invention can be combined since as a result an even better solid body layer manufacture or solid body layer detachment can be brought about. Thus, according to the method according to the invention, the laser application device 8 is adjusted for the defined production of modifications depending on at least one parameter, i.e. the transmission of the solid body at defined points and for a defined solid body depth, and/or the modifications bring about a pressure rise in the solid body, wherein the solid body layer is detached from the solid body as a result of a pressure rise along the crack guiding region due to crack propagation, wherein preferably at least a portion of the modifications is detached from the solid body as part of the solid body layer and wherein the solid body layer is preferably converted into a curved or domed form as a result of the modifications, wherein the further surface portion of the solid body layer 14 resulting from the crack guiding region 4 is therefore convexly shaped at least in sections and/or wherein the solid body 1 has at least one coating 34 whose refractive index is different from the refractive index of the surface of the solid body on which the coating 34 is arranged or a coating 34 is produced on the solid body, whose refractive index is different from the refractive index of the surface of the solid body on which the coating is arranged and/or the laser radiation is incident on the solid body at the Brewster angle or with a deviation in the range from −5° to +5° from the Brewster angle, in particular with a deviation in the range from −4° to +4° or with a deviation in the range from −3° to +3° or with a deviation in the range from −2° to +2° or with a deviation in the range from −1° to +1° from the Brewster angle and/or the method additionally or alternatively comprises one or more of the steps: removing material of the solid body 1, in particular to produce a circumferential recess 12, wherein the material is removed in the longitudinal direction of the solid body, wherein the crack guiding region 4 is exposed as a result of the removal of material or adjusting a flow behaviour of a gas, in particular air, located between the solid body 1 and the laser application device 8, in particular in the region of the radiation course, to prevent accumulations of dust in the region of the laser radiation 10.

FIGS. 7-18 show examples for calculation of the optimal angle of incidence for a $1/e^2$ Gaussian profile and different numerical apertures taking into account the refractive index dependence of the surface reflection.

FIGS. 7-10 show the profiles when using silicon carbide (n=2.7).

Aim: to maximize the laser power coupled into the sample, ideally by using the Brewster angle for minimal surface reflection with p-polarized light. Result: for NA=0.8 Brewster coupling-in is not worthwhile (radiation cone couples in externally almost at the Brewster angle), smaller NA can benefit from this, in particular NA=0.2, higher NA have an intermediate ideal angle.

Figure 7:
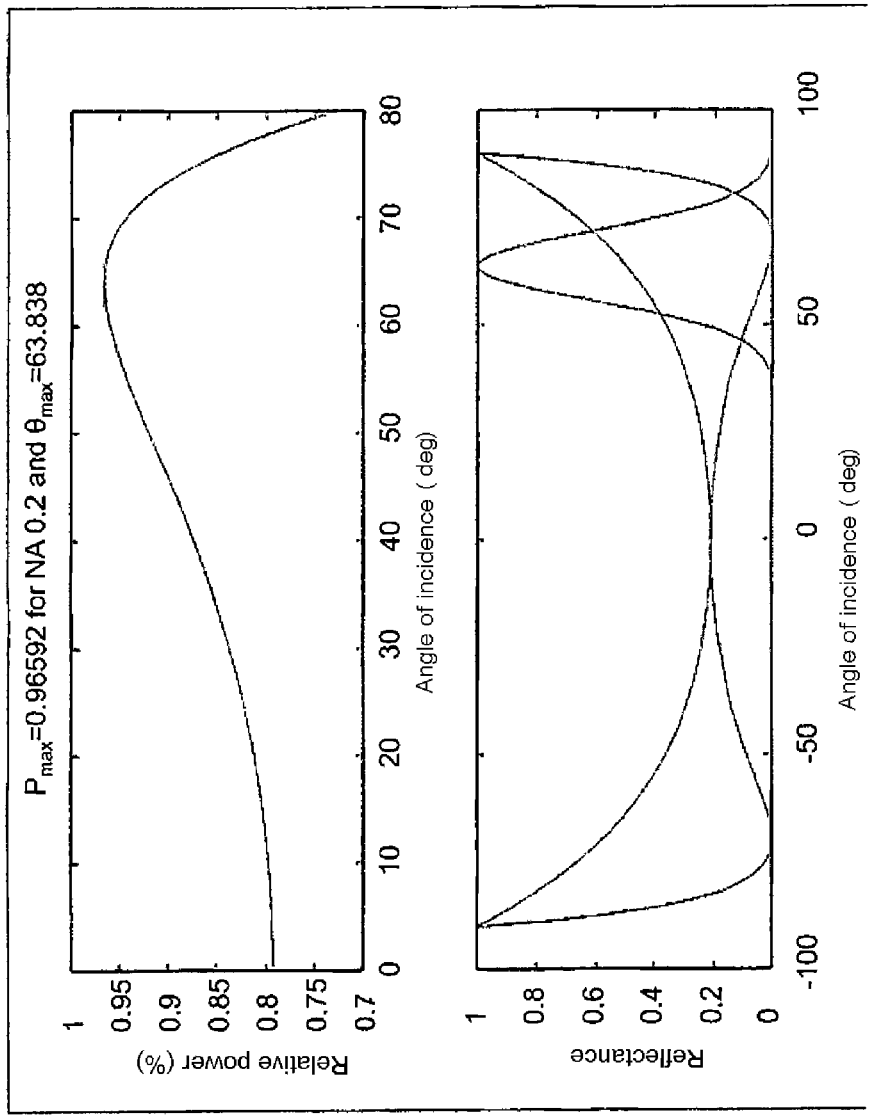
FIGS. 7-18 each show examples for calculation of the optimal angle of incidence for a $1/e^2$ Gaussian profile and different numerical apertures taking into account the refractive index dependence of the surface reflection.

FIG. 7 shows in the upper diagram: relative coupled-in power over angle of incidence for a Gaussian profile and in the lower diagram: reflection coefficient for p-(red) and s-(blue) polarized light and angular Gaussian profile for mapped NA=0.2 (green), optimal angle of incidence 63.8°.

Figure 8:
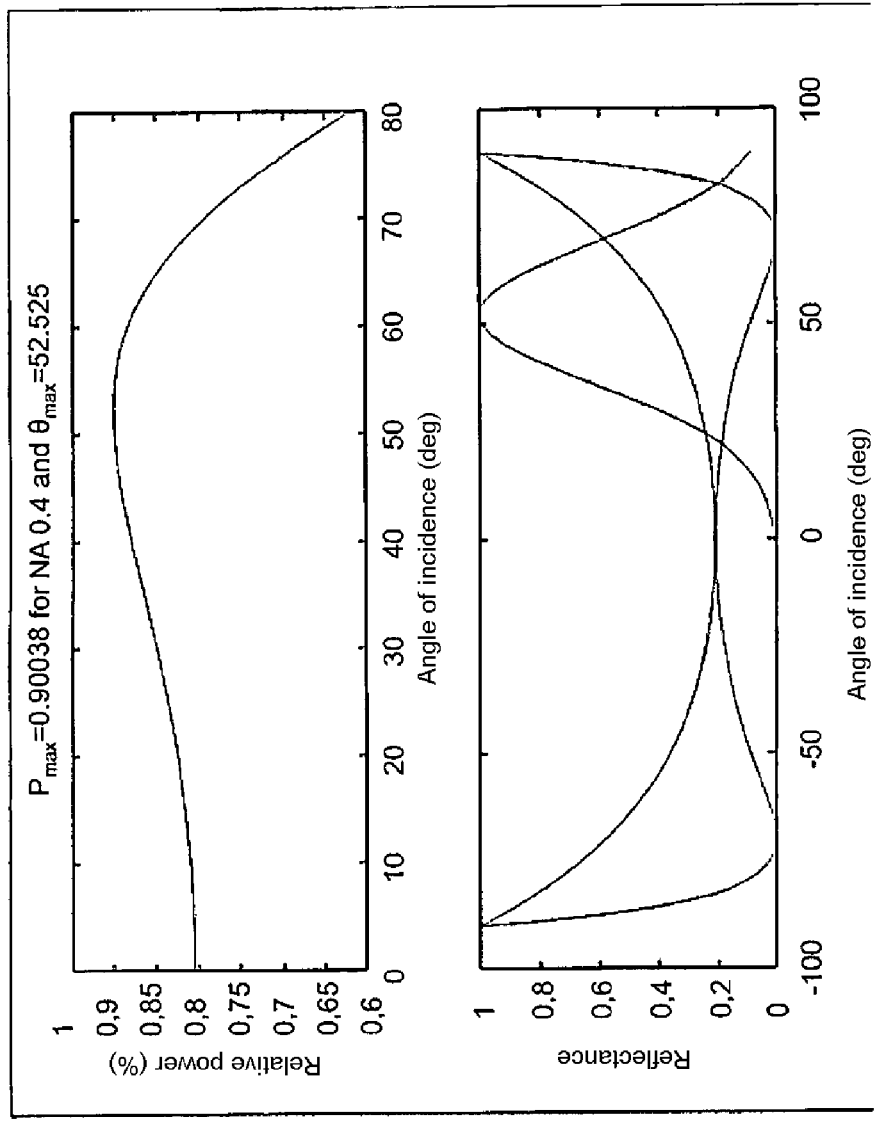

FIG. 8 shows in the upper diagram: relative coupled-in power over angle of incidence for a Gaussian profile and in the lower diagram: reflection coefficient for p-(red) and s-(blue) polarized light and angular Gaussian profile for mapped NA=0.4 (green), optimal angle of incidence 52.5°.

Figure 9:
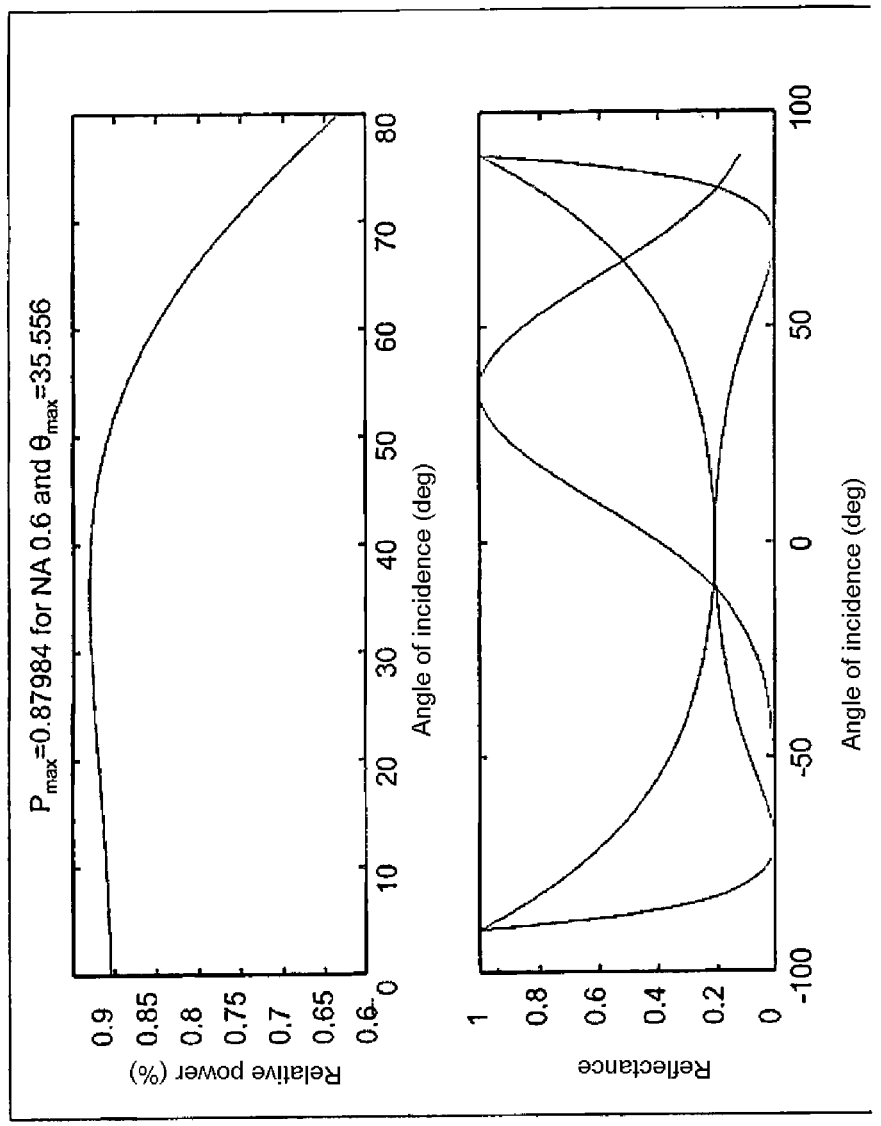

FIG. 9 shows in the upper diagram: relative coupled-in power over angle of incidence for a Gaussian profile and in the lower diagram: reflection coefficient for p-(red) and s-(blue) polarized light and angular Gaussian profile for mapped NA=0.6 (green), optimal angle of incidence here 35.6°.

Figure 10:
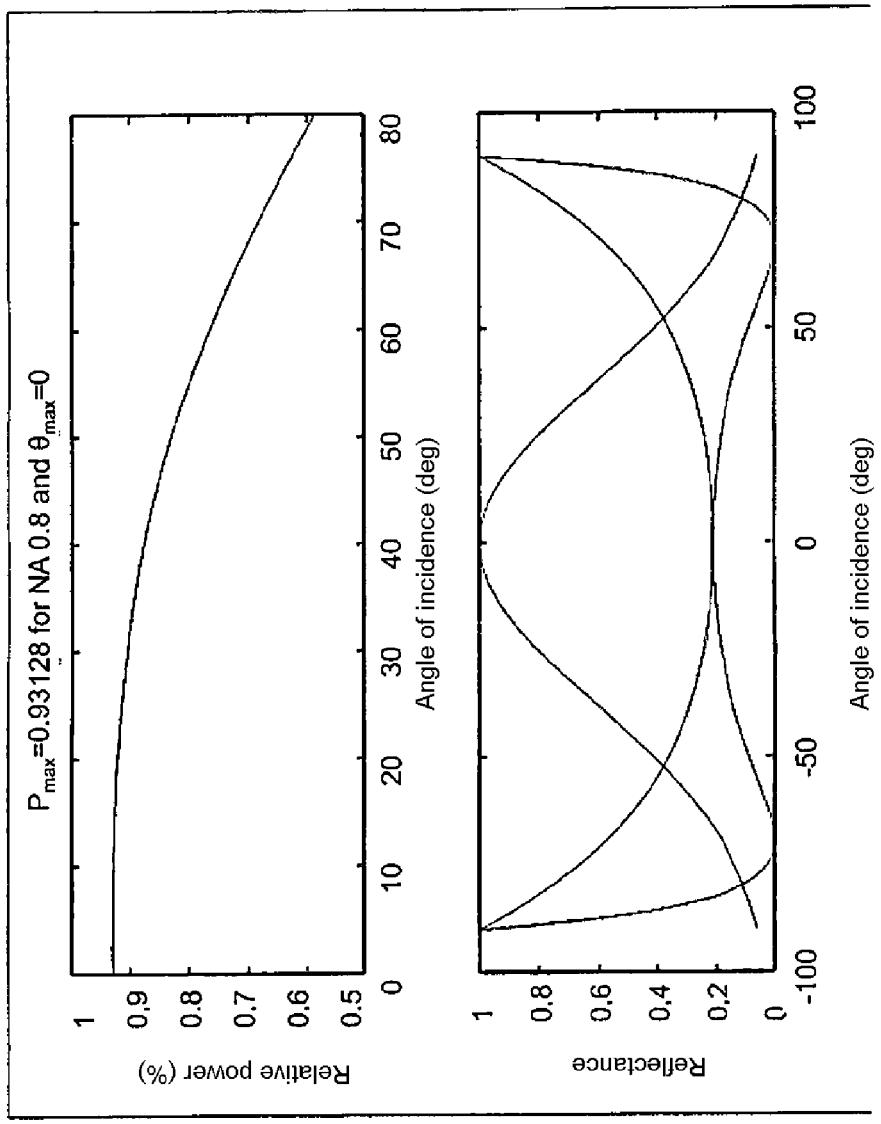

FIG. 10 shows in the upper diagram: relative coupled-in power over angle of incidence for a Gaussian profile and in the lower diagram: reflection coefficient for p-(red) and s-(blue) polarized light and angular Gaussian profile for mapped NA=0.8 (green), optimal angle of incidence here 0°.

FIGS. 11-14 show the profiles when using silicon (n=3.6).

The aim here is to maximize the laser power coupled into the sample, ideally by using the Brewster angle for minimal surface reflection with p-polarized light. Result: for NA=0.8 Brewster coupling-in is not worthwhile (radiation cone couples in externally almost at the Brewster angle), smaller NA can benefit from this, in particular NA=0.2, higher NA have an intermediate ideal angle.

Figure 11:
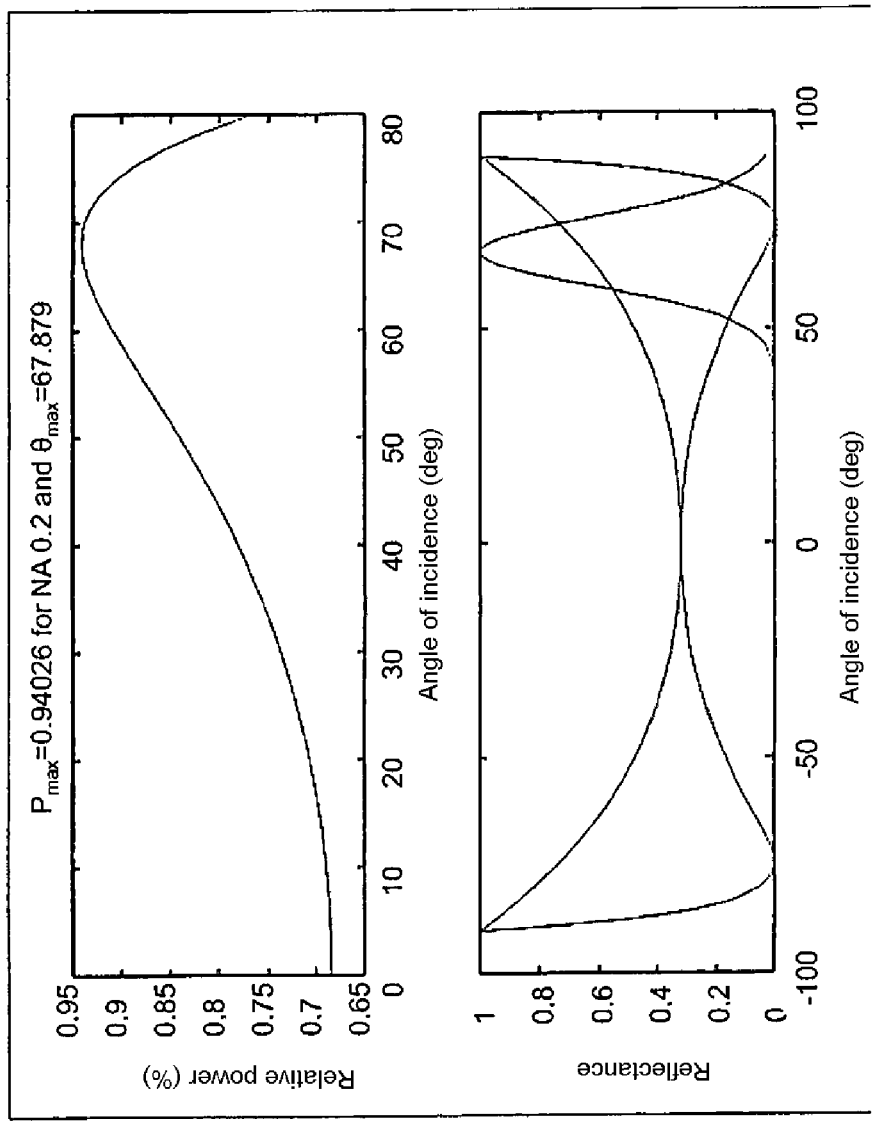

FIG. 11 shows in the upper diagram: relative coupled-in power over angle of incidence for a Gaussian profile for silicon and in the lower diagram: reflection coefficient for p-(red) and s-(blue) polarized light and angular Gaussian profile for mapped NA=0.2 (green), optimal angle of incidence here 67.9°.

Figure 12:
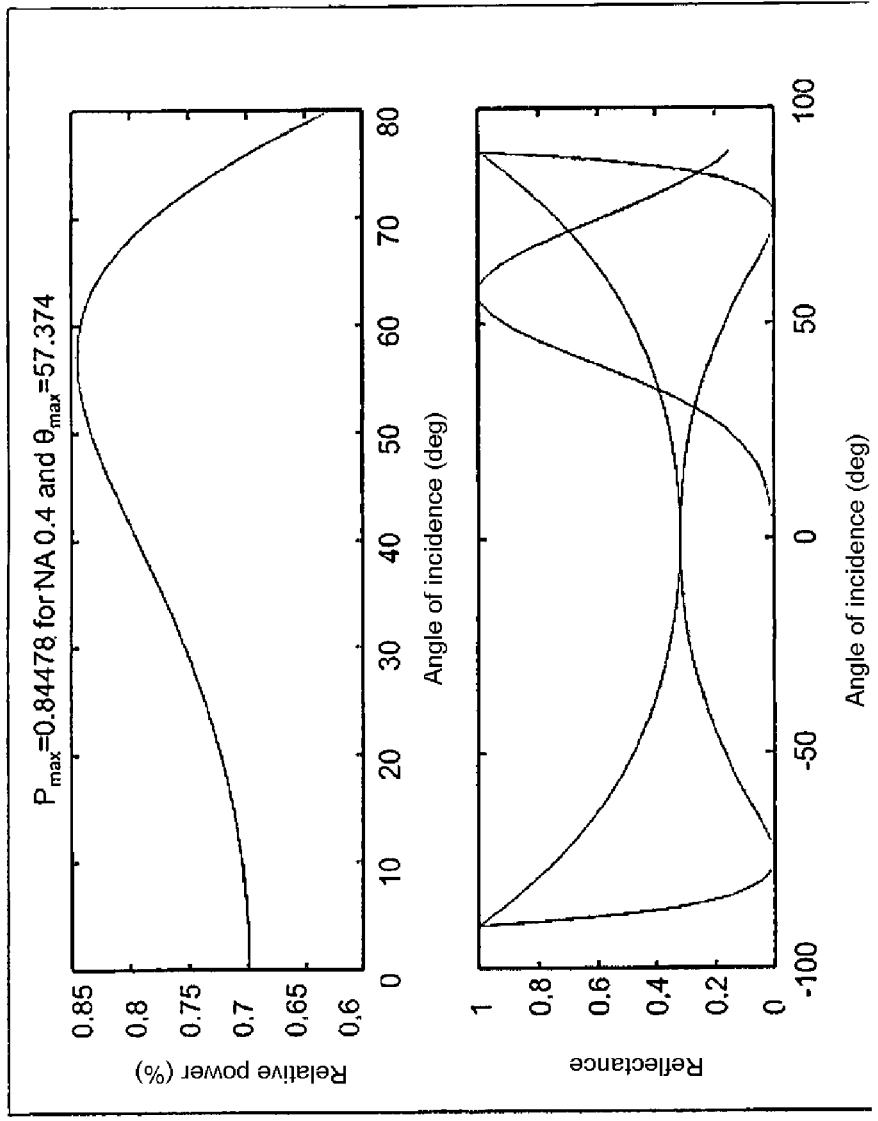

FIG. 12 shows in the upper diagram: relative coupled-in power over angle of incidence for a Gaussian profile for silicon and in the lower diagram: reflection coefficient for p-(red) and s-(blue) polarized light and angular Gaussian profile for mapped NA=0.4 (green), optimal angle of incidence 57.4°.

Figure 13:
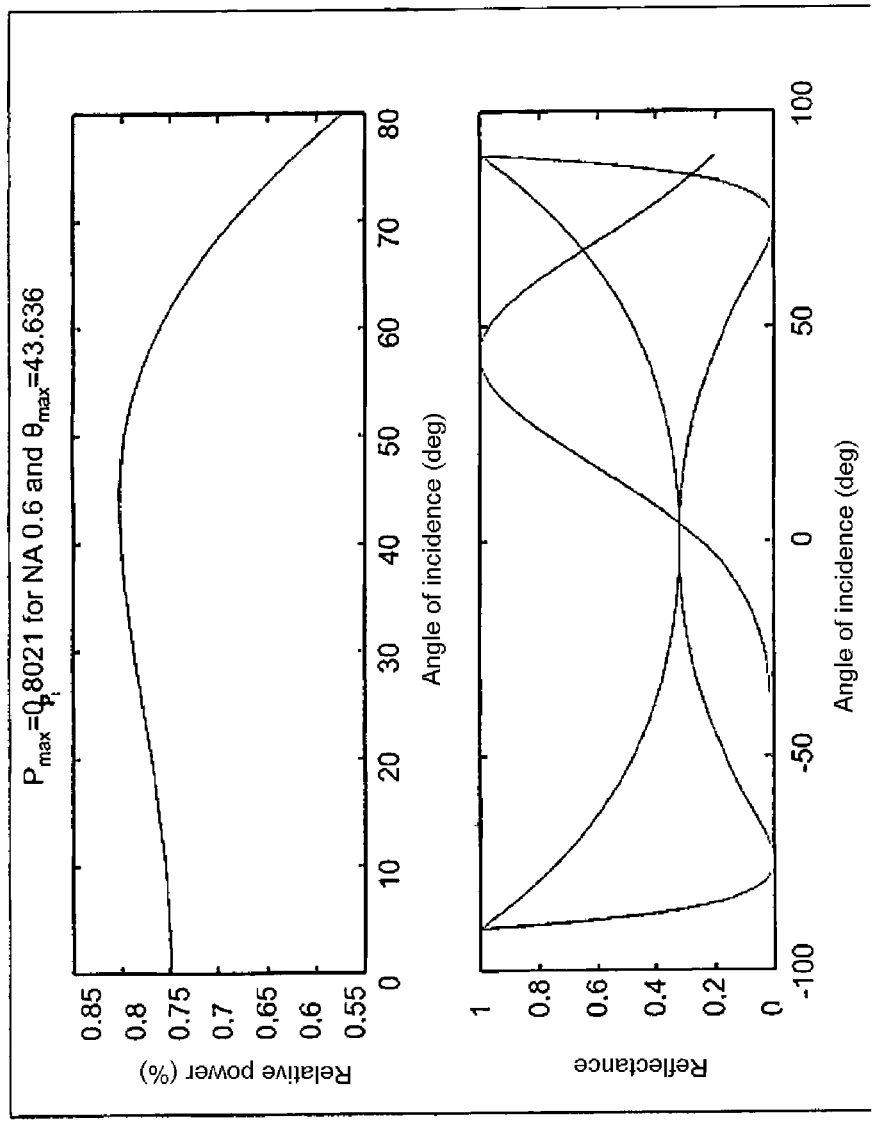

FIG. 13 shows in the upper diagram: relative coupled-in power over angle of incidence for a Gaussian profile for silicon and in the lower diagram: reflection coefficient for p-(red) and s-(blue) polarized light and angular Gaussian profile for mapped NA=0.6 (green), optimal angle of incidence here 43.6°.

Figure 14:
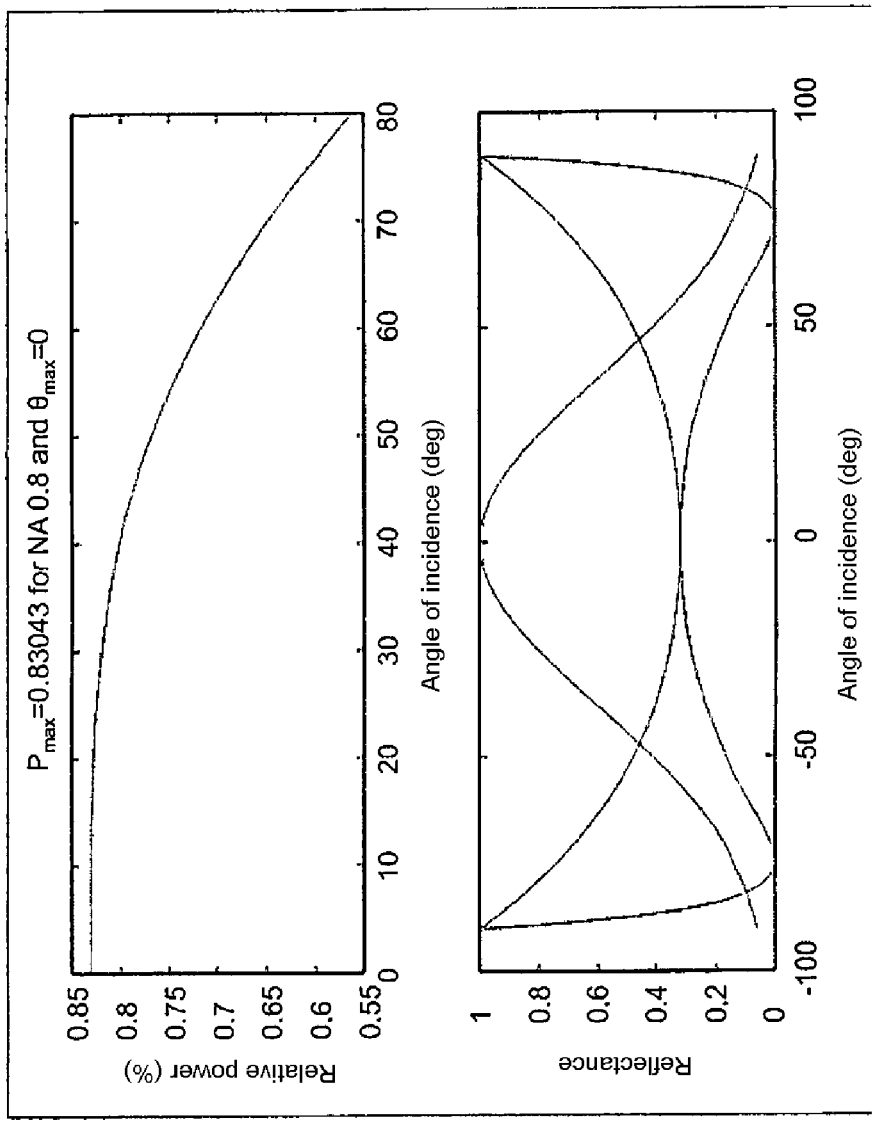

FIG. 14 shows in the upper diagram: relative coupled-in power over angle of incidence for a Gaussian profile for silicon and in the lower diagram: reflection coefficient for p-(red) and s-(blue) polarized light and angular Gaussian profile for mapped NA=0.8 (green), optimal angle of incidence here 0°.

FIGS. 15-18 show the profiles when using sapphire/ALO (n=1.72).

The aim here is to maximize the laser power coupled into the sample, ideally by using the Brewster angle for minimal surface reflection with p-polarized light. Result: for NA=0.8 Brewster coupling-in is not worthwhile (radiation cone couples in externally almost at the Brewster angle), smaller NA can benefit from this, in particular NA=0.2, higher NA have an intermediate ideal angle, wherein NA=0.6 requires almost no angle for irradiation.

Figure 15:
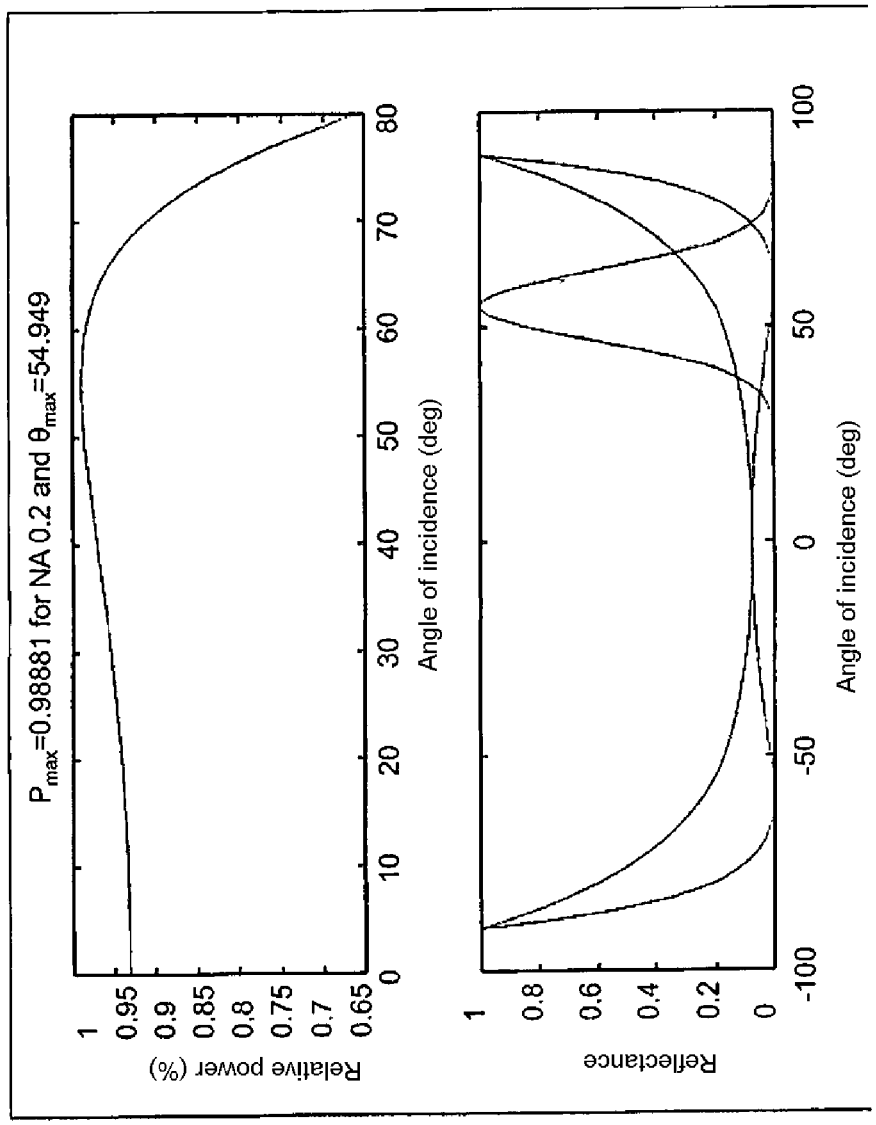

FIG. 15 shows in the upper diagram: relative coupled-in power over angle of incidence for a Gaussian profile for ALO and in the lower diagram: reflection coefficient for p-(red) and s-(blue) polarized light and angular Gaussian profile for mapped NA=0.2 (green), optimal angle of incidence here 54.9°.

Figure 16:
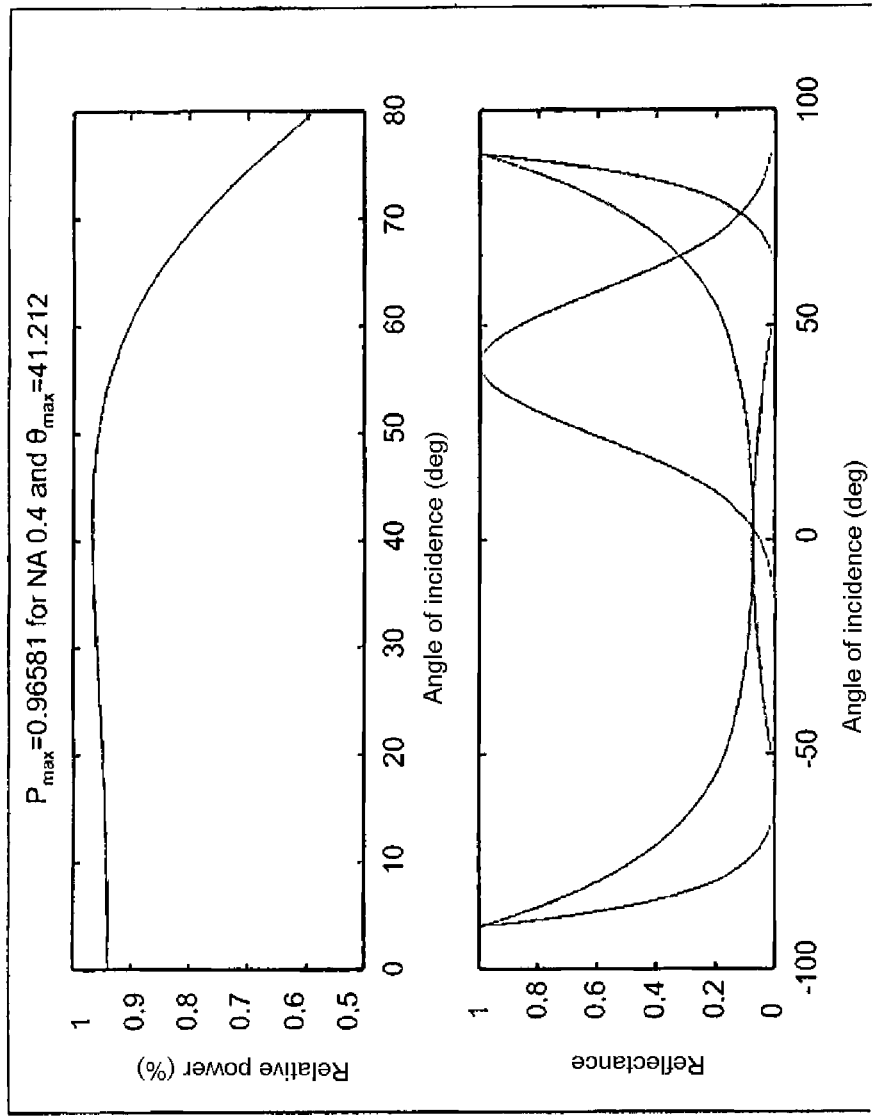

FIG. 16 shows in the upper diagram: relative coupled-in power over angle of incidence for a Gaussian profile for ALO and in the lower diagram: reflection coefficient for p-(red) and s-(blue) polarized light and angular Gaussian profile for mapped NA=0.4 (green), optimal angle of incidence here 41.2°.

Figure 17:
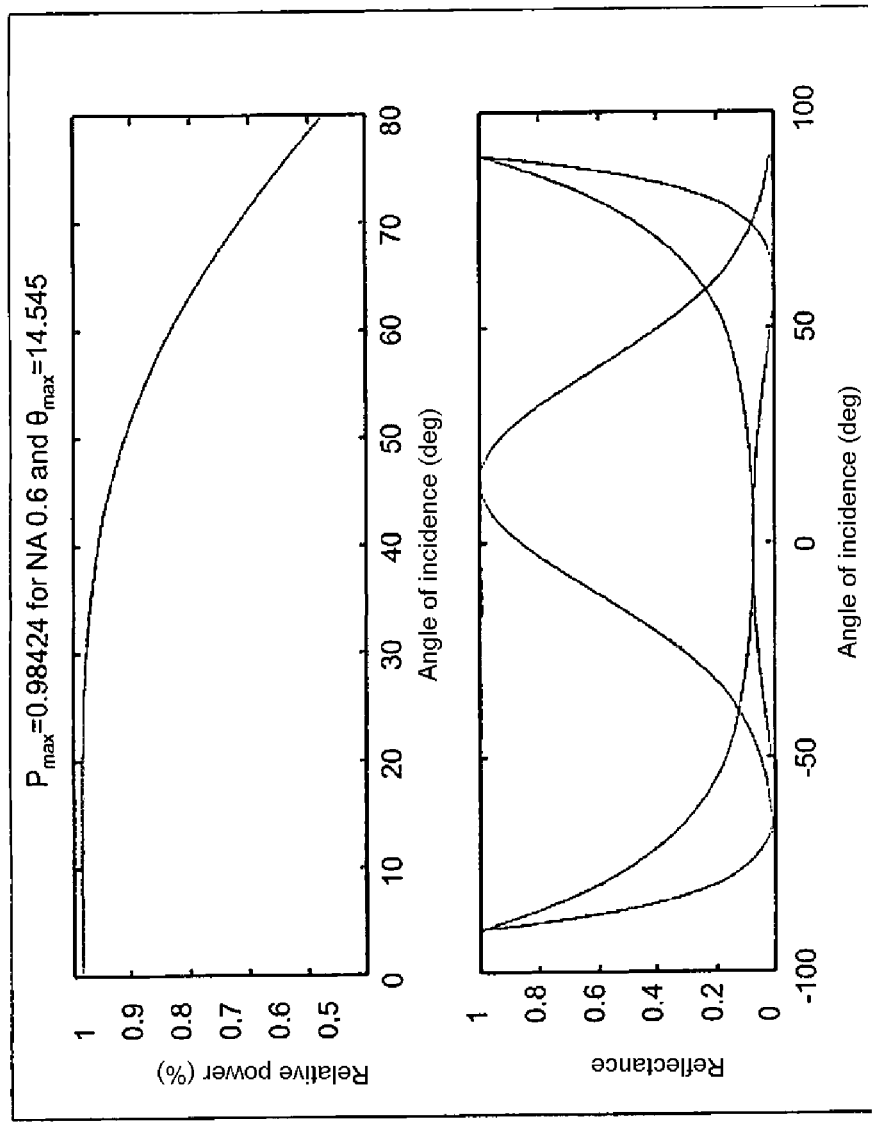

FIG. 17 shows in the upper diagram: relative coupled-in power over angle of incidence for a Gaussian profile for silicon and in the lower diagram: reflection coefficient for p-(red) and s-(blue) polarized light and angular Gaussian profile for mapped NA=0.6 (green), optimal angle of incidence here 14.5°.

Figure 18:
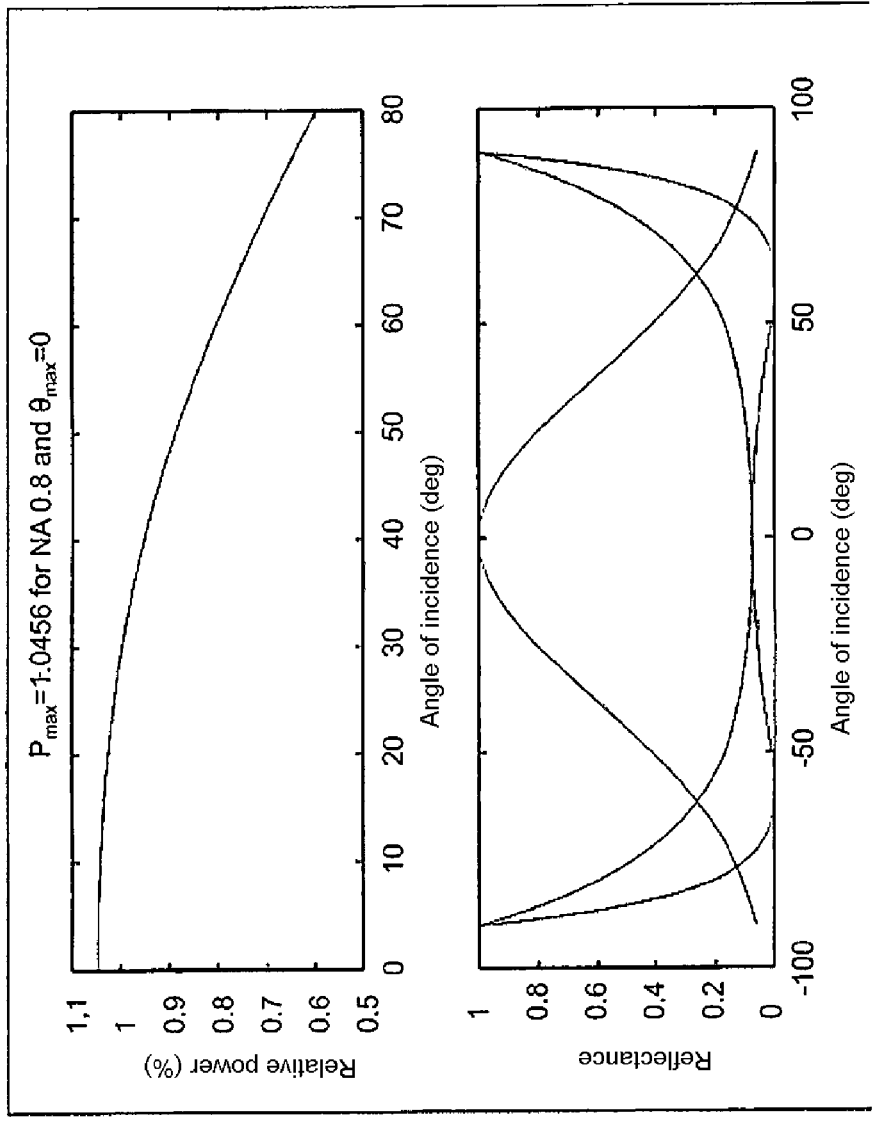

FIG. 18 shows in the upper diagram: relative coupled-in power over angle of incidence for a Gaussian profile for ALO and in the lower diagram: reflection coefficient for p-(red) and s-(blue) polarized light and angular Gaussian profile for mapped NA=0.8 (green), optimal angle of incidence here 0°.

FIG. 19a outlines a standard method for laser-free spalling of large-area substrates. The wafer samples, which are usually used have sharp edges to avoid complications due to rounded edges. Rounded edges are used in conventional wafers to prevent the occurrence of cracks at the wafer edges, which can run inwards and then disturb the substrate and fabrication processes on this.

The process preferably proceeds as follows: after a standard cleaning process the wafers are coated with a primary layer to improve the surface adhesion and a sacrificial layer to improve the polymer-wafer separation at the end. The wafer is then coated with a PDMS (polydimethyl siloxane) polymer film of different thickness and a PDMS adhesive—with platinum polymerization catalyst.

The samples are then pre-cooled to a temperature just above the polymer glass transition temperature before they are dipped in liquid nitrogen. Depending on the size of the sample, the sample will have reached the temperature of liquid nitrogen up to 20 seconds later. At this time the system is in thermal equilibrium. The semiconductor layers are then separated in a spontaneously occurring spalling event. The spalling method is induced by the polymer glass transition and as a result, the Young's modulus in the polymer increases substantially. The additional difference in coefficients of thermal expansion (CTE) between semiconductor and polymer then induces sufficient stresses to horizontally separate the crystal. It is important that the method requires a relative contraction of the polymer in relation to the semiconductor. The next step is the dipping of the semiconductor parts with fastened PDMS films into a separating bath which finally dissolves the sacrificial layer and thereby enables recycling of the polymer as well as the preparation of the semiconductor wafers for further process steps.

FIG. 19a therefore shows a diagram of conventional spalling of substrates with an ensemble of preferably two stress layers, i.e. polymer films. The films are fastened to both sides of the substrate, followed by a rapid cooling step in order to induce temperature change stressing followed by crack formation and detachment of the substrate.

The laser-assisted spalling process shown in FIG. 19b is noticeably similar. The main difference is an additional laser processing step in which a laser beam is focussed on a defined plane or on a defined profile in the sample and then scans the sample. The laser layer produced in this way then defines the crack formation plane and therefore also the separation in the subsequent spalling process.

FIG. 19b therefore shows the laser-assisted spalling process. In addition to the process steps shown in FIG. 19a, by means of a modification layer produced by means of laser beams or laser system, in a further process step a structurally weakened layer is produced in the material which defines a preferred plane for spalling crack propagation.

A typical resulting wafer surface from laser-free spalling is shown in FIG. 19c. A pattern of Wallner lines is obtained from the crack propagation inside the material. Grooves can be made out on the surface of the material which reproduce the crack behaviour along the separating plane in the material. Cracks form at the edges of the sample and migrate inwards, with the result that a detailed pattern as in FIG. 19c is formed. The fourfold symmetry of the pattern is a consequence of the fourfold crystal symmetry in the silicon, with a singularity or a centre point of the crack waves in the centre of the sample. In order to technologically compete with wire sawing processes, however the surface quality after separation is of decisive importance for each spalling process. However, the resulting total thickness variation (TTV) of spalling surfaces without a laser process is usually far beyond the sector requirements. The typical TTV of spalling processes is of the order of magnitude of 50 μm, wherein grinding steps would be required here before the further processing, which would make the costs too high. Instead, the use of LAS processes results in surface roughness values of Sa<1 μm. Sa is the arithmetic mean of the absolute values of the surface coordinates z(x, y).

FIG. 19c thus shows a photograph of a half of a 30 mm silicon wafer after separation using conventional spalling. Wallner lines are clearly visible as crack grooves and indicative of high surface height variation (TTV).

FIG. 19d shows a photograph of a half of a 300 mm silicon wafer after laser-assisted spalling. The surface is homogeneous with a surface roughness of less than 1 μm and without visible strips from the crack propagation. The vertical line on the left side of the substrate originates from a limitation of the travel of the substrate holding table of the laser system.

FIGS. 20a-f show an overview of the material surfaces after laser-assisted spalling. FIG. 20a shows a silicon surface of the sample shown in FIG. 19b with a surface roughness of Sa=0.79 μm. FIG. 20b shows a sapphire ($Al_2O_3$) substrate surface (C plane) after laser-assisted spalling with a surface roughness of Sa=1.96 μm. FIG. 20c and FIG. 20d show surfaces of silicon carbide polymorphs 4H and 6H (both with N doping) after laser-assisted spalling with surface roughnesses Sa=1.85 μm and Sa=1.29 μm. FIG. 20e shows an example for spalling of non-crystalline material, surface of polycrystalline $Al_2O_3$, with a surface roughness Sa=3.89 μm. FIG. 20f shows quartz glass, principle study, laser-assisted spalling experiment with surface roughness Sa=6.89 μm.

Figure 21A:
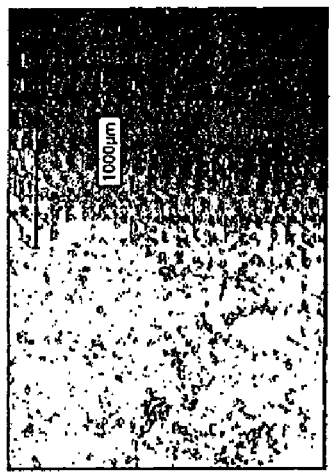
FIG. 21a shows a microscope photograph of a surface after spalling.
Figure 21B:
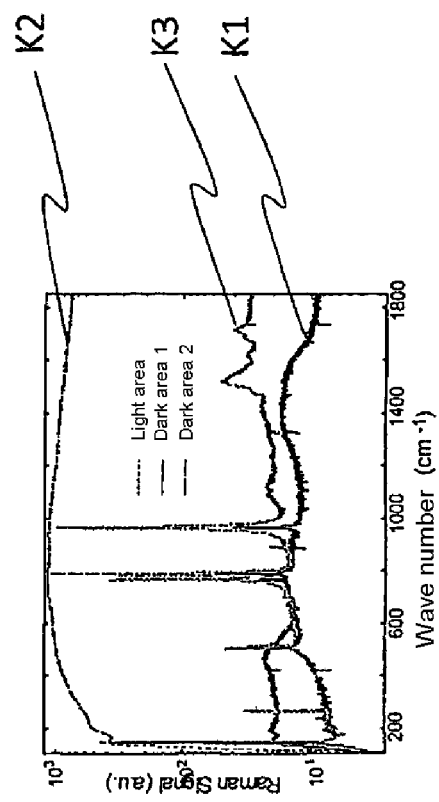
FIG. 21b shows Raman spectra of three different positions in 6H-silicon carbide.

FIG. 21a shows a microscopic photograph of a surface after spalling. FIG. 21b shows Raman spectra of three different points in 6H silicon carbide. The Raman spectra of the darker area (on the right-hand side of FIG. 21a) are curve K1 and curve K2, with curve K3 as the Raman spectrum of the lighter area on the left side in FIG. 21a. The peak height for the darker areas is reduced for almost all peaks and at position 2 in the darker area no more Raman peaks can be seen.

Figure 22:
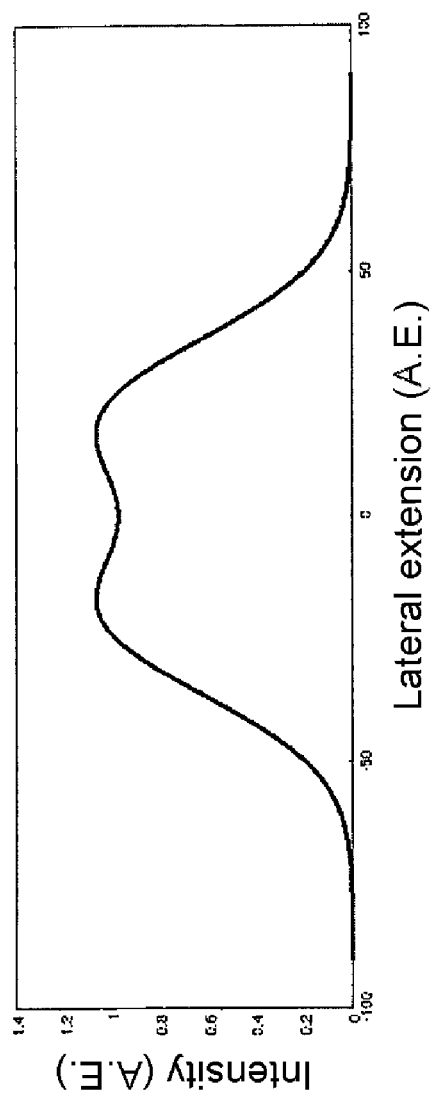
FIG. 22 shows an example for a laser beam profile.

FIG. 22 shows a further additional or alternative beam profile. In the case of a Brewster application with high numerical apertures, the beam profile of the laser can be adapted according to the invention. Thus, at high NA this can result in a higher intensity in the flanks of the emitted laser beam profile. In extreme cases this is a type of doughnut profile with a clear intensity minimum in the centre. However, it is also feasible that the laser beam profile is configured as a Gaussian profile which is flattened in the centre. Preferably the circumstance is used that at high NA the edge zones of the laser profile can already enter into the vicinity of the Brewster angle. The example profile shown by FIG. 22 could thus be produced preferably with a relatively higher intensity fraction (compared with the other embodiments) in the flanks.

Figures 23A, 23B:
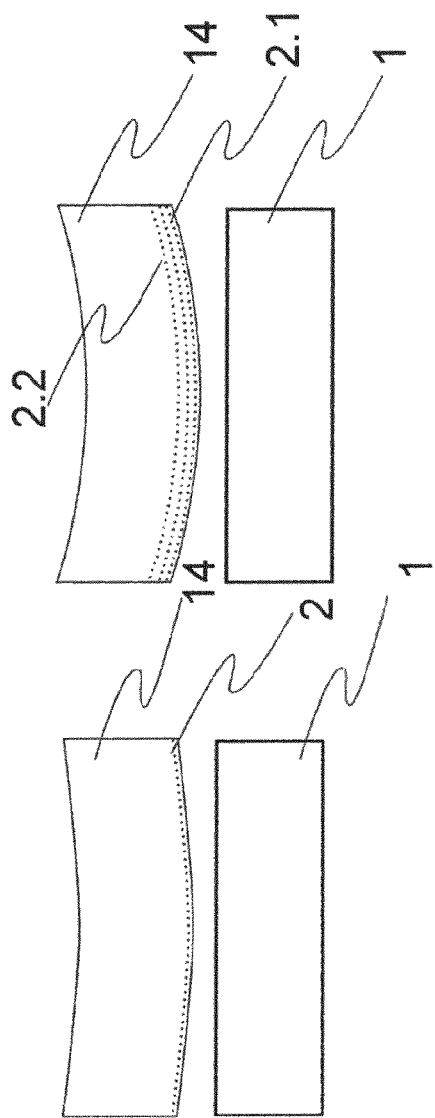
FIG. 23a shows schematically an example for the bending of the solid body layer produced as a result of a first number of modifications and/or modification layers.
FIG. 23b shows schematically a further example for the bending of the solid body layer produced as a result of a second number of modifications and/or modification layers, wherein the second number is greater than the first number

FIG. 23a describes a first solid body producing configuration. According to this configuration, it is possible to detach the solid body layer 14 from the solid body 1. According to this configuration, a first number of modifications 2 is produced in the solid body. The modifications 2 here preferably bring about a sagging of the cleaved solid body layer 14.

FIG. 23b shows a second solid body producing configuration. According to this configuration, it is also possible to detach the solid body layer 14 from the solid body 1. According to this configuration, however a second number of modifications 2 is produced in the solid body 1. Here the second number of modifications 2 is preferably greater than the first number of modifications. Additionally or alternatively it is possible that the configuration has several modification layers 2.1, 2.2 or more modification layers 2.1, 2.2 than the first configuration in which several modification layers can also be provided. Additionally or alternatively it is also feasible that individual ones or the majority of the modifications 2 according to the second configuration are configured to be stronger than in the first configuration. Configured to be stronger here preferably means that the individual modifications in each case extend over a larger volume than in the first configuration. The laser beams 10 here preferably penetrate into the solid body 1 in the longitudinal direction of the solid body 1 or inclined at an angle of up to 60° to the longitudinal direction L of the solid body over an, in particular flat, surface which is preferably part of the solid body layer and the crack guiding region 4 is then preferably formed of several layers of modifications 2. The layers are preferably produced spaced apart from one another or offset in the longitudinal direction L. Preferably at least several of the modifications 2 have an extension in the longitudinal direction L which is between 1 and 50 μm and/or the laser beams 20 are preferably introduced into the solid body 1 to produce modifications 2 in such a manner that the numerical aperture is less than 1, preferably less than 0.9 or less than 0.7 or less than 0.6 or less than 0.5.

The invention thus describes a method for detaching at least one solid body layer from a solid body, wherein due to modifications a crack guiding region is predefined for guiding a crack for detaching a solid body portion, in particular a solid body layer, from the solid body, at least comprising the steps: moving the solid body relative to a laser application device, successively producing laser beams by means of the laser application device to produce respectively at least one modification, wherein the laser application device is adjusted for the defined generation of modifications depending on at least one parameter, namely the transmission of the solid body at defined points and for a defined solid body depth, wherein due to the adjustment of the laser application device, inhomogeneities of the solid body are compensated in the area of the affected surface and/or in the area of the affected volume of the solid body, detaching the solid body layer from the solid body.

Figure 24A:
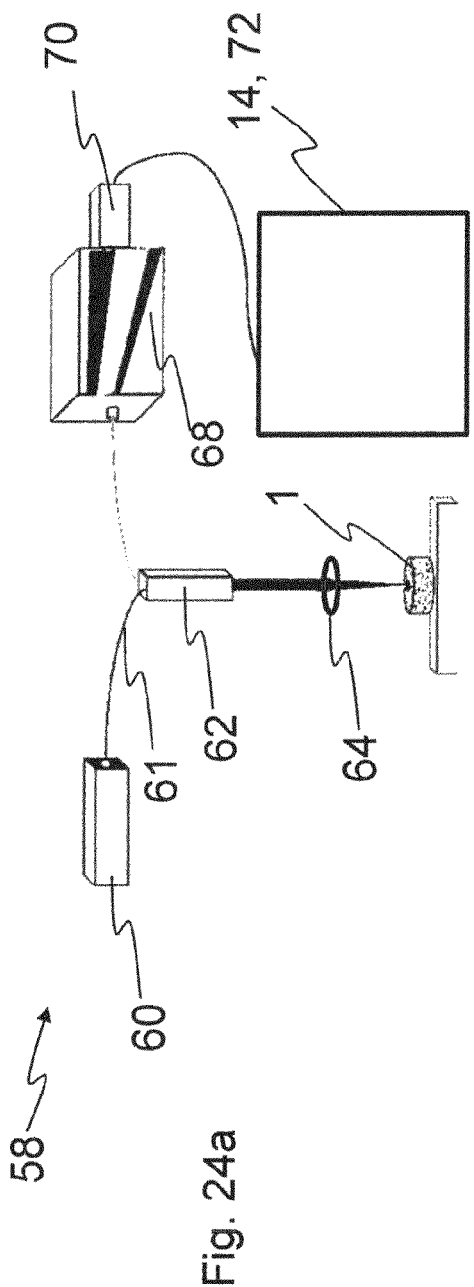
FIG. 24a shows a schematic structure of a Raman instrument as is preferably used according to the invention, in particular as is preferably part of the apparatus according to the invention.

FIG. 24a shows a Raman instrument 58. The Raman instrument 58 shown here has a laser 60 for emitting radiation. The radiation is preferably supplied by means of at least one optical fibre 61 for excitation preferably to an optical system and from this optical system, in particular a lens 64, is preferably focussed, in particular focussed into the solid body. This radiation is at least partially scattered, wherein preferably by means of a filter device or excitation filter 62, light components which have the same wavelength as the radiation emitted by the laser are filtered out. The other radiation components are then fed to a spectrograph 68 and recorded by means of a camera device, in particular a CCD detector 70 and evaluated or prepared by a control device 14, 72, in particular a computer.

Thus, atomic vibrations in the crystal are preferably excited by a preferably external or particularly preferably further laser. These vibrations are produced by light scattering at crystal atoms which results in observable scattered light, which has a photon energy changed by the amount of the vibration energy. In the case of several excitable vibrations, several peaks also appear in the spectrum of the scattered light. The resulting Raman scattering spectrum can then be investigated in detail using a spectrometer (lattice spectrometer) (so-called Raman spectroscopy). In this method the local conditions in the crystal are impressed on the individual Raman lines in their shape and the degree of doping can be concluded from an analysis of the shape of the Raman line.

Figure 24B:
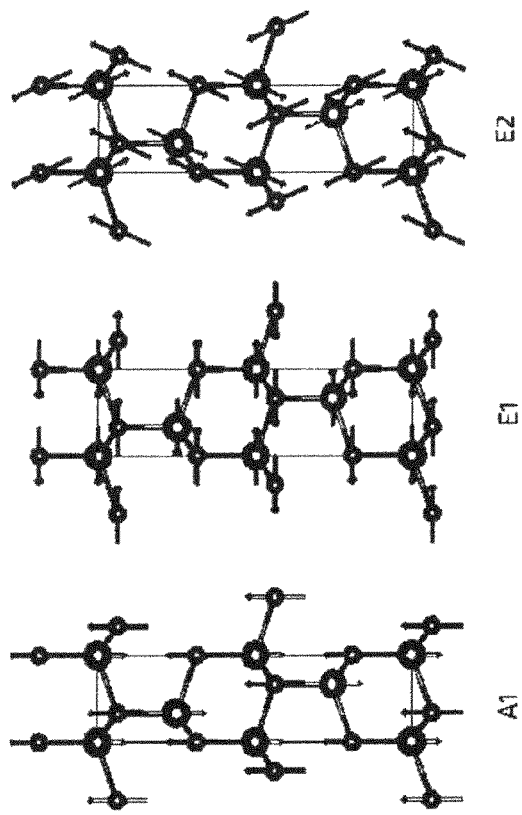
FIG. 24b shows various exemplary vibration states of the lattice vibrations of SiC.

FIG. 24b shows how possible lattice vibrations appear in SiC, wherein these modes are predefined by crystal symmetry and directions and can also be excited simultaneously. The views shown have an extension along the crystal axis A. In this case, vibrations of the atoms are only possible in certain directions, wherein the directions are predefined by the symmetry of the crystal.

Figure 25A:
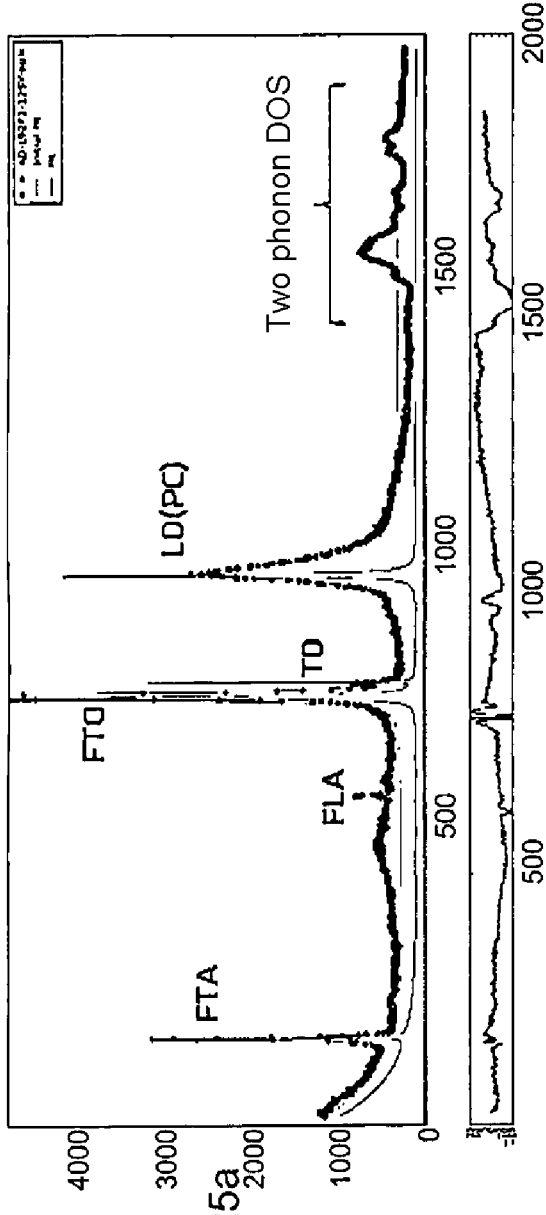
FIGS. 25a and 25b show two diagrams which show doping concentrations in a solid.

FIG. 25a shows a section of a Raman profile of a 4H silicon carbide solid body doped with nitrogen (example spectrum for Raman on doped SiC). Here the form of the LO(PC) mode is used for measurement of the doping concentration and fitted. Lower panel: fitting residual.

Figure 25B:
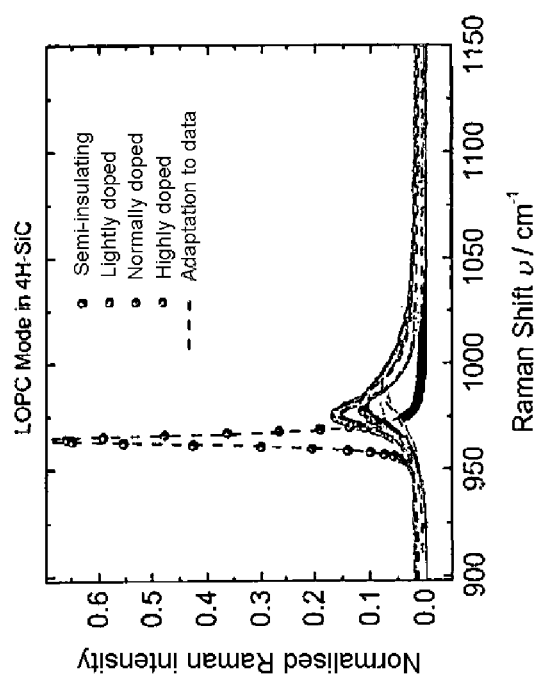

FIG. 25b shows a smaller section of the Raman profile.

As shown a direct method is obtained to determine the dopant concentration using Raman measurements from a measurement of the shape and following fit to the LO(PC) mode.

In general, the aim is therefore by adjusting the laser parameters, to adjust the optimal (smallest possible, shortest possible) crack profile in the material which still results in successful separation as a result of crack propagation by otherwise minimizes or reduces all material losses (even in grinding steps).

FIGS. 26a and 26b show two possibilities for configuring the lifting of individual wafers from the boule/ingot.

According to FIG. 26a this is configured as a feedforward loop and according to FIG. 26b as a feedback loop.

In the case of feedforward, the distribution is characterized before the laser process and from this a map or treatment instructions or parameter adaptations, in particular location-dependent is calculated for the laser process, in particular the production of modifications. Feedforward is preferably performed on the ingot/boule.

Alternatively, as shown in FIG. 26b, a feedback loop can be implemented according to which after each separation step the wafer formed is characterized and serves as a template for the next one.

Depending on the material and doping, different adaptations can thus be made during the laser process:

In the case of SiC material, different adaptations of the laser parameters can be made at different depths depending on the resulting doping. Under the boundary conditions mentioned hereinafter, this can result in the functions likewise mentioned hereinafter.

Depth 180 µm, pulse duration 3 ns, numerical aperture 0.4
Low doping: 7 µJ-21 mOhmcm
High doping: 8 µJ-16 mOhmcm
Depth 350 µm, pulse duration 3 ns, numerical aperture 0.4
Low doping: 9.5 µJ-21 mOhmcm
High doping: 12 µJ-16 mOhmcm
Formula for 180 µm depth:
E Energy in µJ
E0 Offset energy at lowest doping
K Energy scaling factor
R Measured degree of doping
B Base degree of doping (21 mOhmcm)

$$E=E0+(B-R)*K$$

Here
K=1/(21-16) µJ/mOhmcm=0.2 µJ/mOhmcm
E0=7 µJ
B=21 mOhmcm
Example: measured degree of doping of 19 mOhmcm: E=7.4 µJ
Formula for 350 µm depth:
E Energy in µJ
E0 Offset energy at lowest doping
K Energy scaling factor
R Measured degree of doping
B Base degree of doping (21 mOhmcm)

$$E=E0+(B-R)*K$$

Here
K=2.5/(21-16) µJ/mOhmcm=0.5 µJ/mOhmcm
E0=9.5 µJ
B=21 mOhmcm
Example: 19 mOhmcm: E=10.5 µJ FIGS. 27a to 27i show various arrangements which can be provided after producing the further material layers or components 150 for initiating the crack.

FIGS. 27a-27i show various solid body arrangements 176 such as are advantageous for initiating crack guiding and/or crack initiating stresses.

Figure 27A:
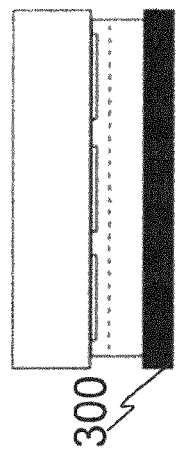

FIG. 27a here shows a processed solid body 1 or wafer with structures or components 150.

Figure 27B:
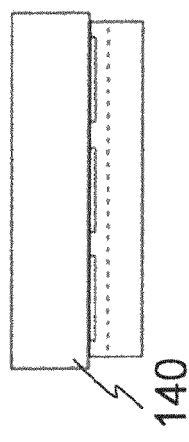

Compared to the solid body 1 shown in FIG. 27a, in the solid body 1 shown in FIG. 27b, a receiving layer 140 is arranged or produced on the component side, in particular on the components 150 or the further material layers 150. The receiving layer 140 is here preferably arranged on the solid body layer to be detached. The receiving layer 140 can in this case also be designated as split film and is therefore preferably laminated on the structure side. In the following step the entire arrangement is then cooled, with the result that the split or the crack initiation and/or the crack guidance is brought about.

Figure 27C:
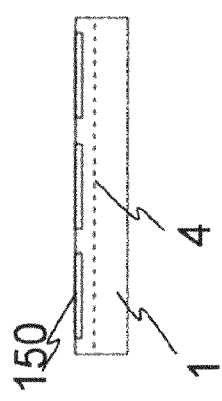

Compared to the diagram in FIG. 27b, according to FIG. 27c a retaining layer/bonded wafer is arranged on the underside of the solid body or on the exposed surface of the solid body. The retaining layer can also be a tool carrier or chuck 300. In a following step the entire arrangement is then cooled, with the result that the split or the crack initiation and/or the crack guidance is brought about.

Figure 27D:
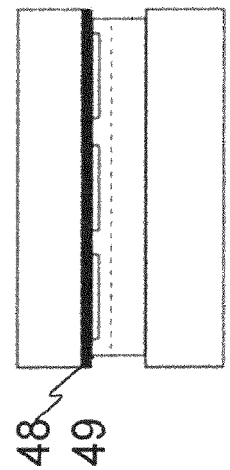

FIG. 27d shows an arrangement compared with FIG. 27b according to which the solid body is provided with double-sided receiving layers 140, 146. The further receiving layer 146 is in this case arranged on a surface of the subsequently remaining residual solid body, wherein an adhesion promotion layer 148 and/or sacrificial layer 149 and/or protective layer 142 can be arranged or produced between the further receiving layer 146 and the solid body 1. The two receiving layers 140 and 146 are preferably laminated on. In the following step the entire arrangement is then cooled, with the result that the split or the crack initiation and/or the crack guidance is brought about.

Figure 27E:
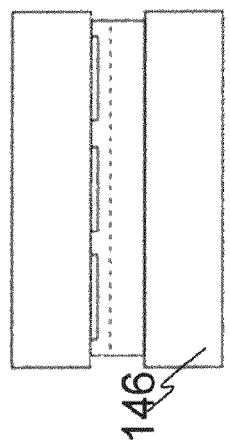

FIG. 27e shows an arrangement according to which, compared with the arrangement known from FIG. 27d, no adhesion promotion layer 146 and/or sacrificial layer 149 and/or protective layer 142 is arranged or produced between the further receiving layer 146 and the solid body 1. In the following step, the entire arrangement is then cooled, with the result that the split or the crack initiation and/or the crack guidance is brought about.

Figure 27F:
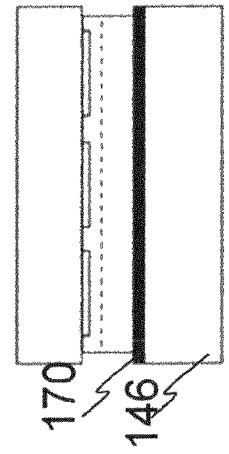

FIG. 27f shows an arrangement which is constructed inversely to the arrangement known from FIG. 27d, i.e. the adhesion promotion layer 146 and/or sacrificial layer 149 and/or protective layer 142 are not arranged or produced between the further receiving layer 146 and the solid body 1 but between the receiving layer 140 and the solid body 1 and thus is/are produced or arranged on the solid body layer to be detached. One or more layers can be produced here on the components 150 or the structures for example by means of spin coating. In the following step the entire arrangement is then cooled, with the result that the split or the crack initiation and/or the crack guidance is brought about.

Figure 27G:
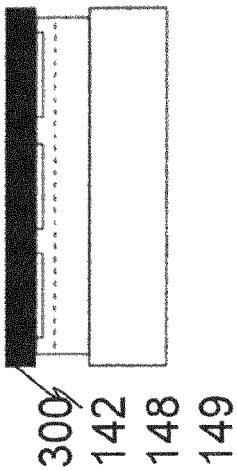

FIG. 27g shows an arrangement or implementation which corresponds to a combination of the arrangements from FIGS. 27d and 27f. The solid body is preferably laminated with split film on both sides, likewise a protective layer and/or adhesion promotion layer and/or sacrificial layer can be provided under the split film on both sides, furthermore, for example, spin coating is possible on the structures, In the following step the entire arrangement is then cooled, with the result that the split or the crack initiation and/or the crack guidance is brought about.

Figure 27H:
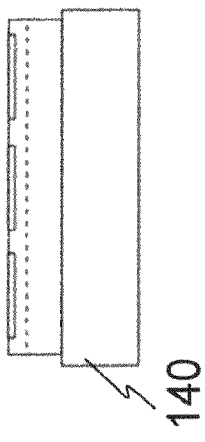

FIG. 27h shows an arrangement which is similar to the arrangement shown in FIG. 27b wherein the receiving layer is not arranged or laminated on one side on a surface of the solid body layer to be detached but on the residual solid body remaining after the detachment. The detachment then takes place as a result of cooling similar to the detachment from an ingot or as in an ingot process.

Figure 27I:
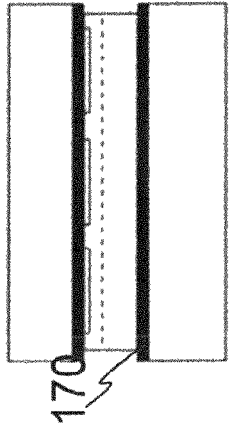

FIG. 27i shows an arrangement which is similar to the arrangement known from FIG. 27c wherein one or more of the layers or devices mentioned hereinafter is/are arranged or produced on the component side of the solid body or on or above the component 150. These layers or devices are preferably in this case: at least or precisely one adhesion promotion layer 148 and/or at least or precisely one sacrificial layer 149 and/or at least or precisely one protective layer 142 and/or at least one or precisely one stabilizing device 3, in particular a tool carrier or chuck 300 (preferably cooling device) or another wafer. In the following step the entire arrangement is then cooled, with the result that the split or the crack initiation and/or the crack guidance is brought about.

Figure 28:
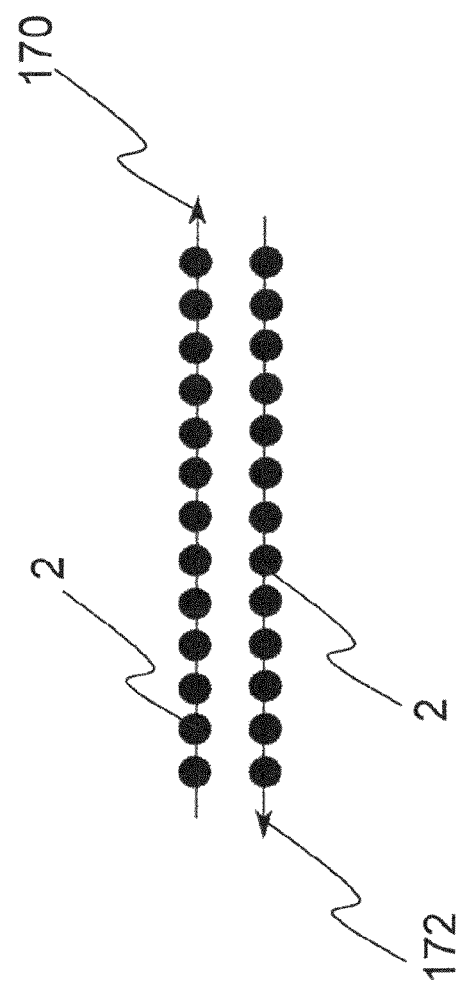

FIG. 28 shows an illustration of an example for a writing pattern with an X-Y processing:

Arrows 170, 172 represent the laser feed device, the black circles represent the different laser shots or modifications 9 which here do not overlap with their damaging effect in the material. It is preferred here if the laser initially travels in one direction and produces modifications 9 before it reverses and writes modifications 9 in the second (lower) direction.

FIGS. 29a to 29d show various cooling devices 174. The solid body arrangements 176 processed in these cooling devices 174 result from the different implementations or configurations of the solid body 1 provided with one or more receiving layers 140, 146 shown and described in FIGS. 27a to 27i. The cooling devices 174 shown herein all use a liquefied gas 178 as initial cooling medium for cooling. This initial cooling medium is either nebulized or vaporized depending on the embodiment.

Preferably the initial cooling medium is liquid nitrogen. Alternative cooling methods, e.g. by means of piezoelements are also conceivable and possible.

The cooling device 174 is preferably used here to cool the receiving layer 140, 146 to a temperature between −85° C. and −10° C., in particular to a temperature between −80° C. and −50° C.

According to FIG. 29a, the cooling device 174 comprises a nitrogen bath, wherein the receiving layer is positioned at a distance, in particular by means of an adjustable positioning device 180, to the liquid nitrogen held in the nitrogen bath. Thus, the solid body arrangement is preferably arranged on a positioning device or on a holder above a nitrogen bath. A temperature gradient over the chamber height thus results and the temperature at the solid body arrangement is adjustable via the filling level with the initial cooling medium of the position of the solid body arrangement 176 (distance from the base of the chamber).

According to the embodiments in FIGS. 29b to 29d the cooling device can preferably comprise a nebulizing means, in particular at least or precisely one perforated pipeline for nebulizing liquid nitrogen or a nebulizing means for nebulizing liquid nitrogen and the cooling effect can be produced by nebulized or vaporized nitrogen.

According to FIG. 29b, a homogeneous spray device/nebulizer is provided for spraying or nebulizing. The spraying or nebulizing is preferably accomplished above the solid body arrangement 176. Furthermore preferably temperature measurements are made for temperature monitoring, the initial data are output for regulating a valve, in particular a nitrogen valve. The temperature measurements are preferably made on the substrate or on the solid body 1 or on the receiving layer 140.

The substrate or the solid body 1 or the solid body arrangement 176 preferably rests above the chamber bottom in order to avoid nitrogen deposition on the bottom of the chamber.

According to FIG. 29c, preferably a perforated pipeline is used as homogeneous spray device. Furthermore preferably temperature measurements are made for temperature monitoring, the initial data are output for regulating a valve, in particular a nitrogen valve. The temperature measurements are preferably made on the substrate or on the solid body 1 or on the receiving layer 140.

The substrate or the solid body 1 or the solid body arrangement 176 preferably rests above the chamber bottom in order to avoid nitrogen deposition on the bottom of the chamber. According to FIG. 29d, this shows a cooling device 176 which comprises a homogeneous spray device/nebulizer 182 for cooling preferably several or each side. Furthermore preferably temperature measurements are made for temperature monitoring, the initial data are output for regulating a valve, in particular a nitrogen valve. The temperature measurements are preferably made on the substrate or on the solid body 1 or on the receiving layer 140.

The substrate or the solid body 1 or the solid body arrangement 176 preferably rests above the chamber bottom in order to avoid nitrogen deposition on the bottom of the chamber.

The chamber 184 of the cooling device 174 is preferably closed to reduce a temperature gradient as far as possible by insulation.

FIG. 30 shows three examples for preferred relationships between the crystal lattice orientation and the production of modifications. This method is particularly appropriate for the detachment of solid body layers from a solid body consisting of SiC or comprising SiC. These relationships result in a further method according to the invention. This further method according to the invention is preferably used for detaching at least one solid body layer from at least one solid body 1, in particular of a wafer from an ingot or for thinning a wafer. The further method according to the invention preferably comprises at least the steps: producing a plurality of modifications 2 by means of laser beams inside the solid body 1 to form a detachment plane 4, and introducing an external force into the solid body 1 to produce stresses in the solid body 1, wherein the external force is so strong that the stresses bring about a crack propagation along the detachment plane 4.

According to the invention, the modifications are produced successively in at least one line or row or line, wherein the modifications 2 produced in a line or row or line are preferably produced at a distance X and with a height H so that a crack propagating between two successive modifications, in particular a crack propagating in the crystal lattice direction, the direction of propagation of which is aligned at an angle W with respect to the detachment plane, interconnects the two modifications. The angle W here preferably lies between 2° and 6°, in particular at 4°. Preferably the crack propagates from a region below the centre of a first modification to a region above the centre of a second modification. The essential relationship here is therefore that the size of the modification can or must be varied depending on the distance of the modifications and the angle W.

Furthermore this method can also comprise the step of producing a composite structure by arranging or producing layers and/or components 150 on or above an initially exposed surface of the substrate 1, wherein the exposed surface is preferably part of the solid body layer to be detached. Particularly preferably the modifications for forming the detachment plane 4 are formed before producing the composite structure.

In order to introduce the external force, for example by analogy with the previously described method a receiving layer 140 can be arranged on an exposed surface of the composite structure or the solid body.

The three diagrams 30a to 30c are intended to illustrate how the size of the damage/modification zone amorphized/phase-converted by the laser influences the height covered by the sawtooth pattern of the crack. In general, the crack therefore runs along the crystal planes between individual atoms of the crystal. In the modified zone these clear planes are no longer existent, the . . . therefore comes to a halt.

The damage zone along the beam direction and also laterally in the focal plane can be reduced by a numerical aperture which is preferably as high as possible. Since only the threshold intensity must be reached, a smaller pulse energy is then sufficient here.

If the damage zone is now configured to be suitably smaller, the laser modifications can be set more densely, which makes the sawtooth run shorter and overall causes a smaller height extension of the modified plane (first diagram).

If on the other hand, the damage zone is configured to be larger (higher energy and/or lower numerical aperture—FIG. 30b), a larger microcrack is initiated by the increased pressure of the amorphized zone which can be intercepted (i.e. stopped in a controlled manner) by a damage zone of greater extension at a greater distance.

Figures 30A, 30B, 30C:
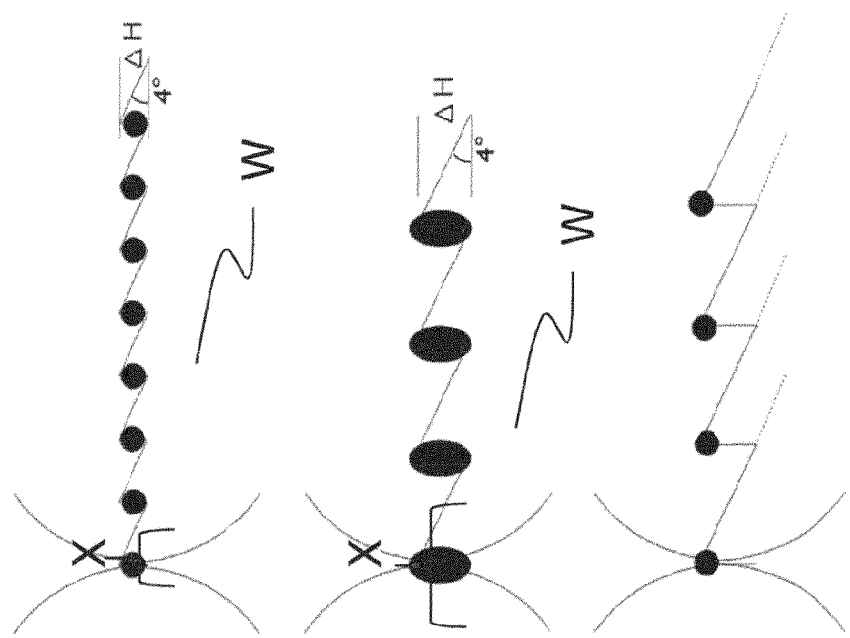

FIG. 30c finally shows the risk if the damage zone is not sufficiently large and cracks which run too widely are triggered by the laser modification, that the cracks on the one hand run too widely—i.e. the height difference produced by the cracks is greater than desired—and on the other hand the cracks are driven through under the further damage zones and not stopped by the amorphized material. This then again results in material losses since all the cracked material layers must be removed for the end product or renewed laser processing.

Figure 31:
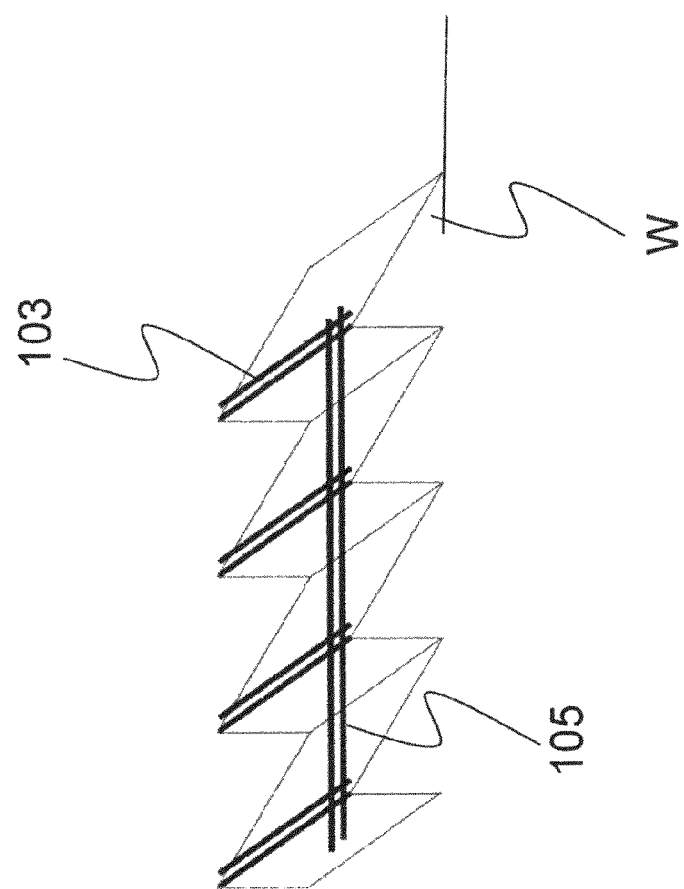

FIG. 31 shows a schematically depicted snapshot from a further method according to the invention. This further method is preferably used to detach at least one solid body layer from at least one solid body 1, in particular a wafer from an ingot or for thinning a wafer. The further method according to the invention preferably comprises at least the steps: producing a plurality of modifications 2 by means of laser beams inside the solid body 1 to form a detachment plane 4 and introducing an external force into the solid body 1 to produce stresses in the solid body 1, wherein the external force is so strong that the stresses bring about a crack propagation along the detachment plane 4.

According to the invention, in a first step the modifications are produced on a line 103 and preferably at the same distance from one another. Furthermore, it is conceivable that a plurality of these lines produced in the first step are produced. These first lines are particularly preferably produced parallel to the crack propagation direction and preferably rectilinearly or in a circular arc shape, in particular in the same plane. After producing these first lines, preferably second lines 105 are produced to trigger and/or drive preferably subcritical cracks. The second lines are also preferably produced rectilinearly. Particularly preferably the second lines are inclined with respect to the first lines, in particular aligned orthogonally. The second lines preferably extend in the same plane as the first lines or particularly preferably in a plane which is parallel to the plane in which the first lines extend. Preferably third lines are then produced to connect the subcritical cracks.

This method is particularly appropriate for detaching solid body layers from a solid body consisting of SiC or comprising SiC.

Furthermore the modifications can be produced successively in at least one line or row or line, wherein the modifications 2 produced in a line or row or line are preferably produced at a distance X and with a height H, so that a crack propagating between two successive modifications, in particular a crack propagating in the crystal lattice direction, the direction of propagation of which is aligned at an angle W to the detachment plane interconnects the two modifications. The angle W here lies preferably between 2° and 6°, in particular 4°. Preferably the crack propagates from a region below the centre of a first modification to a region above the centre of a second modification. The essential relationship here is therefore that the size of the modification can or must be varied depending on the distance of the modifications and the angle W.

Furthermore this method can also comprise the step of producing a composite structure by arranging or producing layers and/or components 150 on or above an initially exposed surface of the substrate 1, wherein the exposed surface is preferably part of the solid body layer to be detached. Particularly preferably the modifications for forming the detachment plane are formed before producing the composite structure.

In order to introduce the external force, for example by analogy with the previously described method a receiving layer 140 can be arranged on an exposed surface of the composite structure or the solid body.

Thus, in the further laser method according to the invention, lines parallel to the crack propagation direction (preferably called transverse lines) are preferably produced on SiC (but also other materials) in order to initially define a plane for the preferred crack initiation (crack initialization) before longitudinal lines drive the cracks. In this case, the cracks are firstly initialized transversely, then longitudinally before a final step sets lines between the longitudinal lines of the second step to initiate the cracks extensively. This enables shorter crack paths which minimizes the final surface roughness.

Example diagram for transverse lines (with the sawtooth) and crack initiation lines (on the wave crests of the sawtooth).

REFERENCE LIST

1 Solid body
2 Modification
3 Location where modification produced
4 Crack guiding region
6 Solid body portion
8 Laser application device
9 Objektive
10 Laser beams
11 Modified laser beams
12 Recess
14 Solid body layer
16 Surface of solid body layer
17 Irradiated surface
18 Stress generating layer or receiving layer 140
19 Adhesive or further stress generating layer
24 Local property variation of the solid body (e.g. the transmission)
26 Trench
28 Frame
30 Point of intersection of reflected beams
32 Flushing
34 Coating
300 Chuck
L Longitudinal direction of solid body

The invention claimed is:

1. A method for producing at least one solid body layer which is domed or curved at least in sections, the method comprising:
   moving the solid body relative to a laser application device,
   successively producing laser beams by means of the laser application device in order to produce respectively at least one modification inside the solid body, wherein as a result of the modifications a detachment plane is provided for guiding a crack in order to detach a solid body portion from the solid body, wherein the laser beams penetrate into the solid body via a surface of the solid body layer which will be detached from the solid body, wherein the modifications bring about a pressure rise in the solid body, wherein the solid body layer is detached from the solid body due to the propagation of a crack as a result of the pressure rise along the detachment plane, wherein at least a portion of the modifications as part of the solid body layer is separated from the solid body, wherein the solid body layer is converted into a curved or domed shape as a result of the modifications, wherein the further surface portion of the solid body layer resulting from the detachment plane is therefore convexly shaped at least in sections.

2. The method according to claim 1, wherein:

the laser beams penetrate into the solid body in the longitudinal direction of the solid body or inclined at an angle of up to 60° with respect to the longitudinal direction of the solid body over a surface which is part of the solid body layer and the detachment plane is formed from several layers of modifications, the layers are produced spaced apart from one another or offset in the longitudinal direction, and/or at least a plurality of the modifications have an extension in the longitudinal direction which is between 1 and 50 µm, and/or the laser beams for producing the modifications are introduced into the solid body in such a manner than the numerical aperture is less than 0.8.

3. The method according to claim 1, wherein:

wherein the solid body is weakened by the modifications in the detachment plane in such a manner that the solid body layer becomes detached from the solid body as a result of the removal of material, after the removal of material such a number of modifications is produced that the solid body is weakened in the detachment plane in such a manner that the solid body layer becomes detached from the solid body, a stress generating layer is produced or arranged on an surface of the solid body aligned at an inclination to the circumferential surface and as a result of a thermal action on the solid body layer, mechanical stresses are generated in the solid body, wherein a crack for detaching a solid body layer is produced as a result of the mechanical stresses, which crack propagates along the modifications starting from the surface of the solid body exposed by the removal of material, or the solid body is acted upon thermally after the production of the modifications and as a result of the thermal action, the solid body layer is detached from the solid body along the detachment plane.

4. The method according to claim 3, wherein:

the removal of material takes place starting from an exposed surface of the solid body, in the longitudinal direction of the solid body and spaced apart from the circumferential surface of the solid body at least in sections and/or the removal of material takes place in the form of a trench running continuously at least in sections, wherein the trench is spaced apart from the circumferential surface by at least 30 µm.

5. The method according to claim 4, wherein after detachment of the solid body layer, at least the solid body portion of the solid body formed between the trench and the circumferential surface, is removed at least in sections.

6. The method according to claim 1, wherein adjusting a flow behaviour of a gas located between the solid body and the laser application device in order to prevent accumulations of dust in the region of the laser radiation.

7. The method according to claim 6, wherein the adjustment of the flow behaviour is made by supplying a fluid in the region of the beam course between an objective and the solid body or the adjustment of the flow behaviour is made by producing a negative pressure, in particular a vacuum in the region of the beam course between an objective and the solid body.

8. The method according to claim 6, wherein:

the modifications are produced by means of multiphoton excitation, initially at least a plurality of base modifications are produced on an line, running homogeneously at least in sections wherein these base modifications are produced with predefined process parameters, the predefined process parameters comprise the energy per shot and/or the shot density, at least one value of these process parameters is specified depending on the crystal lattice stability of the solid body, the value is selected so that the crystal lattice remains intact around the respective base modifications, further trigger modifications are produced to trigger subcritical cracks, and at least one process parameter for generating trigger modifications is different from at least one process parameter for generating base modifications, and/or the trigger modifications are produced in a direction which is inclined to or spaced apart from the course direction of the line along which the base modifications are generated, wherein the subcritical cracks propagate less than 5 mm.

9. The method according to claim 8, wherein the subcritical cracks propagate between 5 µm and 200 µm in the solid or tear sections between the regions of several lines in which the subcritical cracks have propagated as a result of the stresses that are produced by the glass transition.

10. A method for detaching at least one solid body layer from a solid body or donor substrate, the method comprising:

providing a solid body, wherein the solid body:

i) has at least one coating whose refractive index is different from the refractive index of the surface of the solid body on which the coating is arranged, or ii) a coating is produced on the solid body whose refractive index is different from the refractive index of the surface of the solid body on which the coating is arranged, and producing modifications inside the solid body by means of laser beams of a laser application device, wherein a crack guiding region is predefined by the modifications along which a detachment of the solid body layer from the solid body is accomplished.

11. The method according to claim 10, wherein:

the coating will be or is produced by means of spin coating, wherein the coating comprises nanoparticles and/or a plurality of coatings are arranged or produced above one another, wherein the refractive indices differ from one another, and/or a first coating which is arranged or produced on the solid body has a larger refractive index than an additional coating which is produced on the first coating.

12. The method according to claim 10, wherein the laser beams are incident on the solid body at the Brewster angle or with a deviation in the range from −5° to +5° from the Brewster angle.

13. The method according to claim 12, wherein a compensating device is provided to compensate for a spherical aberration in the laser application device resulting from the Brewster angle irradiation.

14. A method for detaching at least one solid body layer from a solid body, wherein due to modifications a detachment plane is predefined for guiding a crack for detaching a solid body portion from the solid body, the method comprising:
    moving the solid body relative to a laser application device,
    successively producing laser beams by means of the laser application device to produce respectively at least one modification inside the solid body, wherein the laser beams penetrate into the solid body via a surface of the solid body layer which will be detached from the solid body, and
    detaching the solid body layer from the solid body,
    wherein the laser application device is adjusted for the defined generation of modifications depending on at least one parameter, namely the transmission of the solid body at defined points and for a defined solid body depth, and/or
    wherein the modifications bring about a pressure rise in the solid body, wherein the solid body layer is detached from the solid body as a result of the pressure rise along the detachment plane due to a propagation, wherein at least one portion of the modifications as part of the solid body layer is detached from the solid body and wherein the solid body layer is converted into a curved or domed form as a result of the modifications, wherein the further surface portion of the solid body layer resulting from the detachment plane is therefore convexly shaped at least in sections, and/or
    wherein the solid body has at least one coating whose refractive index is different from the refractive index of the surface of the solid on which the coating is arranged or wherein a coating is produced on the solid, whose refractive index is different from the refractive index of the surface of the solid on which the coating is arranged, and/or
    wherein the laser radiation is incident on the solid body at the Brewster angle or with a deviation in the range from −10° to +10° from the Brewster angle,
    further comprising removing material of the solid body, wherein the material is removed in the longitudinal direction of the solid body, and
    wherein the detachment plane is exposed as a result of the removal of material or adjusting a flow behaviour of a gas located between the solid body and the laser application device to prevent accumulations of dust in the region of the laser radiation.

15. The method according to claim 14, wherein:
    a parameter is the degree of doping of the solid body at a predetermined location or in a predetermined region,
    the degree of doping is determined by the analysis of backscattered light having an inelastic scattering or Raman scattering,
    the back-scattered light has a different wavelength or a different wavelength range from emitted light defined for triggering the back-scattering,
    the back-scattered light is back-scattered from the predefined location or from the predefined region, or
    the degree of doping is determined by means of an eddy current measurement, wherein conductivity differences in the solid body material are determined.

16. The method according to claim 14, wherein the solid body material is silicon, wherein the numerical aperture lies between 0.5 and 0.8, or the solid body material is SiC, wherein the numerical aperture lies between 0.5 and 0.8.

17. The method according to claim 14, further comprising producing a composite structure by arranging or producing layers and/or components on or above an initially exposed surface of the solid body, wherein the exposed surface is part of the solid body layer to be detached, wherein the modifications are produced to form the detachment plane before producing the composite structure.

18. The method according to claim 17, wherein:
    before producing the detachment plane the solid body is treated using at least one high-temperature method,
    the high-temperature method is executed with a temperature between 70° C. and the melting point or evaporation temperature of the material of the solid body,
    the at least one high-temperature method is an epitaxy method, a doping method or a method using plasma, wherein at least one layer is produced on the solid body by the high-temperature method,
    the at least one generated layer has predefined parameters,
    at least one predefined parameter specifies a maximum degree of refraction and/or absorption and/or reflection of laser light waves, and
    the degree of refraction and/or absorption and/or reflection is less than 5%.

19. A method for producing at least one solid body layer which is domed or curved at least in sections, the method comprising:
    moving the solid body relative to a laser application device,
    successively producing laser beams by means of the laser application device in order to produce respectively at least one modification inside the solid body,
    wherein as a result of the modifications a detachment plane is provided for guiding a crack in order to detach a solid body portion from the solid body,
    wherein the laser beams penetrate into the solid body via a surface of the solid body layer which will be detached from the solid body,
    wherein the modifications bring about a pressure rise in the solid body,
    wherein the solid body layer is detached from the solid body due to the propagation of a crack as a result of the pressure rise along the detachment plane,
    wherein at least a portion of the modifications as part of the solid body layer is separated from the solid body,
    wherein the laser beams penetrate into the solid body in the longitudinal direction of the solid body or inclined at an angle of up to 60° with respect to the longitudinal direction of the solid body over a surface which is part of the solid body layer and the detachment plane is formed from several layers of modifications,
    wherein the layers are produced spaced apart from one another or offset in the longitudinal direction, and/or at least a plurality of the modifications have an extension in the longitudinal direction which is between 1 and 50 μm, and/or the laser beams for producing the modifications are introduced into the solid body in such a manner than the numerical aperture is less than 0.8.

20. A method for producing at least one solid body layer which is domed or curved at least in sections, the method comprising:

moving the solid body relative to a laser application device, successively producing laser beams by means of the laser application device in order to produce respectively at least one modification inside the solid body, wherein as a result of the modifications a detachment plane is provided for guiding a crack in order to detach a solid body portion from the solid body, wherein the laser beams penetrate into the solid body via a surface of the solid body layer which will be detached from the solid body, wherein the modifications bring about a pressure rise in the solid body, wherein the solid body layer is detached from the solid body due to the propagation of a crack as a result of the pressure rise along the detachment plane, wherein at least a portion of the modifications as part of the solid body layer is separated from the solid body, wherein the solid body is weakened by the modifications in the detachment plane in such a manner that the solid body layer becomes detached from the solid body as a result of the removal of material, wherein after the removal of material such a number of modifications is produced that the solid body is weakened in the detachment plane in such a manner that the solid body layer becomes detached from the solid body, wherein a stress generating layer is produced or arranged on an surface of the solid body aligned at an inclination to the circumferential surface and as a result of a thermal action on the solid body layer, mechanical stresses are generated in the solid body, wherein a crack for detaching a solid body layer is produced as a result of the mechanical stresses, which crack propagates along the modifications starting from the surface of the solid body exposed by the removal of material, or the solid body is acted upon thermally after the production of the modifications and as a result of the thermal action, the solid body layer is detached from the solid body along the detachment plane.

21. The method according to claim 20, wherein:

the removal of material takes place starting from an exposed surface of the solid body, in the longitudinal direction of the solid body and spaced apart from the circumferential surface of the solid body at least in sections, and/or the removal of material takes place in the form of a trench running continuously at least in sections, wherein the trench is spaced apart from the circumferential surface by at least 30 µm.

22. The method according to claim 21, wherein after detachment of the solid body layer, at least the solid body portion of the solid body formed between the trench and the circumferential surface, is removed at least in sections.

* * * * *

UNITED STATES PATENT AND TRADEMARK OFFICE
CERTIFICATE OF CORRECTION

PATENT NO. : 11,130,200 B2  
APPLICATION NO. : 16/086533  
DATED : September 28, 2021  
INVENTOR(S) : R. Rieske et al.

Page 1 of 1

It is certified that error appears in the above-identified patent and that said Letters Patent is hereby corrected as shown below:

In the Claims

Column 45, Line 43 (Claim 3, Line 10) please change "on an" to -- on a --
Column 46, Line 19 (Claim 8, Line 5) please change "on an" to -- on a --
Column 50, Line 4 (Claim 20, Line 31) please change "on an" to -- on a --

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*